US011252282B2

(12) United States Patent
Fujimoto

(10) Patent No.: US 11,252,282 B2
(45) Date of Patent: *Feb. 15, 2022

(54) DATA PLAYBACK SYSTEM, DATA PLAYBACK METHOD, DATA PLAYBACK TERMINAL, PRINTER, AND SERVER

(71) Applicant: FUJIFILM Corporation, Tokyo (JP)

(72) Inventor: Shinichi Fujimoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,054

(22) Filed: Aug. 20, 2019

(65) Prior Publication Data
US 2020/0090015 A1 Mar. 19, 2020

(30) Foreign Application Priority Data

Sep. 13, 2018 (JP) .............................. JP2018-171742

(51) Int. Cl.
H04N 1/00 (2006.01)
G06K 19/06 (2006.01)
H04N 1/32 (2006.01)
(52) U.S. Cl.
CPC ... H04N 1/00119 (2013.01); G06K 19/06037 (2013.01); G06K 19/06131 (2013.01);
(Continued)
(58) Field of Classification Search
CPC ........... H04N 1/32128; H04N 1/32138; H04N 1/00334; H04N 1/00119
See application file for complete search history.

(56) References Cited

U.S. PATENT DOCUMENTS 7,634,065 B2 * 12/2009 Fukunaga ............. H04M 3/533
358/1.13
2005/0162699 A1 * 7/2005 Fukunaga .......... H04N 1/00342
358/1.18
(Continued)

FOREIGN PATENT DOCUMENTS

JP 2001-324757 A 11/2001
JP 2005-208324 A 8/2005
(Continued)

OTHER PUBLICATIONS

The extended European search report issued by the European Patent Office dated Feb. 5, 2020, which corresponds to European Patent Application No. 19193082.5-1209 and is related to U.S. Appl. No. 16/546,054.
(Continued)

Primary Examiner — Christle I Marshall
(74) Attorney, Agent, or Firm — Studebaker & Brackett PC

(57) ABSTRACT

There are provided a data playback system, a data playback method, a data playback terminal, a printer, and a server which are capable of playing sound from a printout and viewing a favorable image.
Image data of an image printed on an instant film and sound data associated with the image data are stored in a data storage server. In a case where a two-dimensional code printed with the image on the instant film is read by a data playback terminal, access information to the image data of the printed image and the sound data associated with the image data is obtained. The data playback terminal accesses the data storage server based on the obtained access information, and downloads and plays the image data of the printed image and the sound data.

15 Claims, 41 Drawing Sheets

(52) U.S. Cl.
CPC ..... *H04N 1/00334* (2013.01); *H04N 1/32128* (2013.01); *H04N 1/32138* (2013.01)

(56) References Cited

U.S. PATENT DOCUMENTS

| | | | |
|---|---|---|---|
| 2005/0286463 | A1 | 12/2005 | Matsumoto |
| 2006/0012832 | A1* | 1/2006 | Kayanuma ............... B41J 3/445 358/296 |
| 2006/0066903 | A1* | 3/2006 | Shiimori ............ H04N 1/00347 358/1.16 |
| 2012/0293521 | A1* | 11/2012 | Rothschild ........... H04N 1/2187 345/501 |

FOREIGN PATENT DOCUMENTS

| | | | |
|---|---|---|---|
| JP | 2005-208499 A | | 8/2005 |
| JP | 2005-345632 A | | 12/2005 |
| JP | 2006-092268 A | | 4/2006 |
| JP | 2006-293580 A | | 10/2006 |
| JP | 2006293580 A | * | 10/2006 |
| JP | 2007-104109 A | | 4/2007 |
| JP | 2015-207114 A | | 11/2015 |
| JP | 2017-117010 A | | 6/2017 |

OTHER PUBLICATIONS

An Office Action; "Notice of Reasons for Refusal", mailed by the Japanese Patent Office dated Jun. 21, 2021, which corresponds to Japanese Patent Application No. 2018-171742 and is related to U.S. Appl. No. 16/546,054; with English language translation.
Communication pursuant to Article 94(3) EPC issued by the European Patent Office dated Dec. 20, 2021, which corresponds to European Patent Application No. 19 193 082.5-1209 and is related to U.S. Appl. No. 16/546,054.

* cited by examiner

FIG. 36
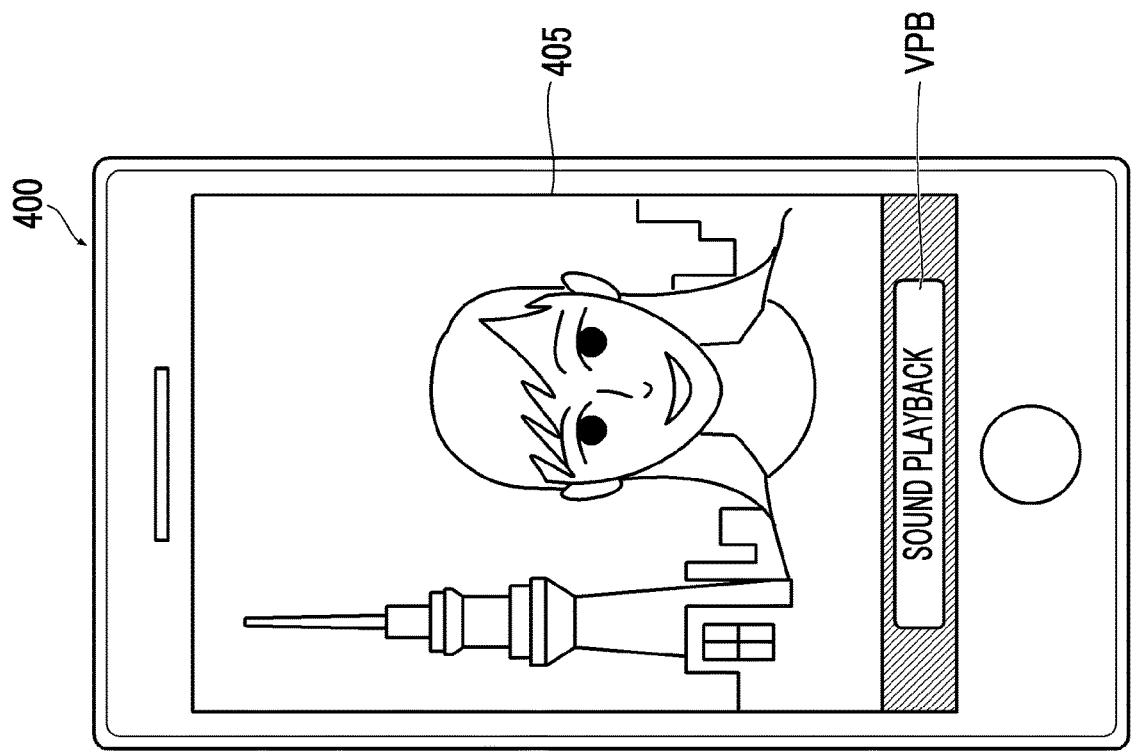
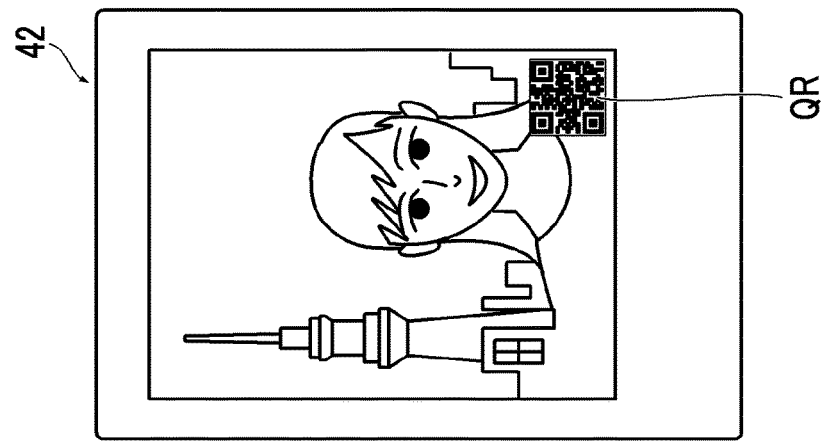

DATA PLAYBACK SYSTEM, DATA PLAYBACK METHOD, DATA PLAYBACK TERMINAL, PRINTER, AND SERVER

CROSS-REFERENCE TO RELATED APPLICATIONS

The present application claims priority under 35 U.S.C. § 119 to Japanese Patent Application No. 2018-171742, filed on Sep. 13, 2018. Each of the above application is hereby expressly incorporated by reference, in its entirety, into the present application.

BACKGROUND OF THE INVENTION

1. Field of the Invention

The present invention relates to a data playback system, a data playback method, a data playback terminal, a printer, and a server.

2. Description of the Related Art

A technology in which sound can be played from a printout by encoding sound data by a two-dimensional code and printing an image and the two-dimensional code in a case where image data associated with sound data is printed has been known (For example, JP2001-324757A and JP2007-104109A).

Meanwhile, a technology in which sound can be played from a printout by uploading sound data to a server, encoding access information to the sound data by a two-dimensional code, and printing the two-dimensional code and an image in a case where the image data associated with the sound data is printed has also been known (For example, JP2005-345632A and JP2006-293580A).

SUMMARY OF THE INVENTION

However, in a case where the image and the two-dimensional code are printed, there is a disadvantage that the display of the two-dimensional code is a hindrance to viewing the image. Particularly, in a case where the two-dimensional code is printed so as to be overlapped with the image, there is a disadvantage that a part of the image is not seen due to the two-dimensional code.

The present invention has been made in view of circumstances, and an object of the present invention is to provide a data playback system, a data playback method, a data playback terminal, a printer, and a server which are capable of playing sound from a printout and viewing a favorable image.

(1) There is provided a data playback system comprising: a server that stores image data of an image printed on a medium and sound data associated with the image data; and a data playback terminal that downloads the image data and the sound data associated with the image data from the server and plays the downloaded image data and sound data. The data playback terminal comprises a display unit that displays an image, a sound output unit that outputs sound, a recording information reading unit that reads recording information, an access information obtaining unit that obtains access information to the image data of the image printed on the medium by reading the recording information printed with the image on the medium by the recording information reading unit, the access information to the image data of the image printed on the medium being recorded in the recording information, a download unit that downloads the image data of the image printed on the medium and the sound data associated with the image data from the server based on the access information obtained by the access information obtaining unit, a display controller that displays the image data downloaded by the download unit on the display unit, and a sound output controller that outputs and plays the sound data downloaded by the download unit through the sound output unit.

According to the present aspect, in a case where the recording information printed with the image on the medium is read by the data playback terminal, it is possible to obtain the access information to the image data of the image printed on the medium and the sound data associated with the image data, and it is possible to download and play the image data and the sound data from the server as a storage destination.

(2) In the data playback system according to (1), image data without including the recording information in the image is stored in the server.

(3) In the data playback system according to (1), image data including the recording information in the image is stored in the server, and the display controller masks the recording information, and displays the image data on the display unit.

(4) The data playback system according to any one of (1) to (3) further comprises: a printer that comprises an upload unit that uploads image data to be printed and sound data associated with the image data to the server in a case where the image data associated with the sound data is printed, a recording information generation unit that generates recording information in which access information to the image data uploaded to the server is recorded, and a print controller that prints the recording information generated by the recording information generation unit and the image in a case where the image data associated with the sound data is printed.

(5) In the data playback system according to (4), the printer further comprises an imaging unit that electronically captures an image to be printed, and a sound collection unit that collects sound associated with the image to be printed.

(6) The data playback system according to (4) or (5) further comprises: an upload terminal that uploads received data to the server. The upload unit uploads image data to be printed and the sound data associated with the image data to the server through the upload terminal.

(7) In the data playback system according to any one of (1) to (6), the data playback terminal further comprises a sound collection unit that collects sound, a sound data rewrite instructing unit that instructs rewriting of the sound data associated with the image data displayed on the display unit, a sound collection controller that controls the sound collection unit to obtain sound data for rewriting in a case where the rewriting of the sound data is instructed by the sound data rewrite instructing unit, and a rewrite data upload unit that adds information on the image data for which the rewriting is instructed, and uploads the sound data for rewriting to the server, and the server further comprises a sound data rewrite controller that rewrites the sound data of the image data for which the rewriting is instructed with received sound data in a case where the sound data for rewriting is received.

According to the present aspect, it is possible to rewrite the sound data stored in the server later.

(8) In the data playback system according to any one of (1) to (7), information to be specified at the time of printing is added, as unique identification information, to the image data stored in the server.

(9) In the data playback system according to (8), the identification information includes information on the cumulative number of times of printing in a printer that prints the image data.

(10) In the data playback system according to (9), the identification information further includes information on a unique identification number of the printer that prints the image data.

(11) In the data playback system according to (9) or (10), the identification information further includes information on a device model of the printer at the time of printing the image data.

(12) In the data playback system according to any one of (1) to (11), a trimmed image is printed on the medium.

(13) In the data playback system according to any one of (1) to (12), the medium is an instant film.

(14) In the data playback system according to any one of (1) to (13), the recording information is a two-dimensional code, a barcode, or a radio tag.

(15) There is provided a data playback terminal comprising: a display unit that displays an image; a sound output unit that outputs sound; a recording information reading unit that reads recording information; an access information obtaining unit that obtains access information to image data of an image printed on a medium by reading the recording information printed with the image on the medium by the recording information reading unit, the access information to the image data of the image printed on the medium being recorded in the recording information; a download unit that downloads the image data of the image printed on the medium and the sound data associated with the image data from a storage destination based on the access information obtained by the access information obtaining unit; a display controller that displays the image data downloaded by the download unit on the display unit, and a sound output controller that outputs and plays the sound data downloaded by the download unit through the sound output unit.

(16) There is provided a printer constituting the data playback system according to any one of (4) to (6).

(17) There is provided a server constituting the data playback system according to any one of (1) to (13).

(18) There is provided a data playback method comprising: obtaining image data to be printed and sound data associated with the image data; uploading the obtained image data and the sound data associated with the image data to a server; generating recording information in which access information to the image data uploaded to the server is recorded; printing the generated recording information with an image on a medium; obtaining the access information to the image data of the image printed on the medium by reading the recording information printed with the image on the medium; downloading the image data of the image printed on the medium and the sound data associated with the image data from the server based on the obtained access information; displaying the downloaded image data; and playing the downloaded sound data.

According to the present invention, it is possible to play sound from a printout, and it is possible to view a favorable image.

BRIEF DESCRIPTION OF THE DRAWINGS

FIG. 36 is a diagram showing comparison of the image printed on the instant film with the image played on the data playback terminal.

DESCRIPTION OF THE PREFERRED EMBODIMENTS

Hereinafter, preferred embodiments of the present invention will be described with reference to the accompanying drawings.

[Configuration of Systems]

Figure 1:
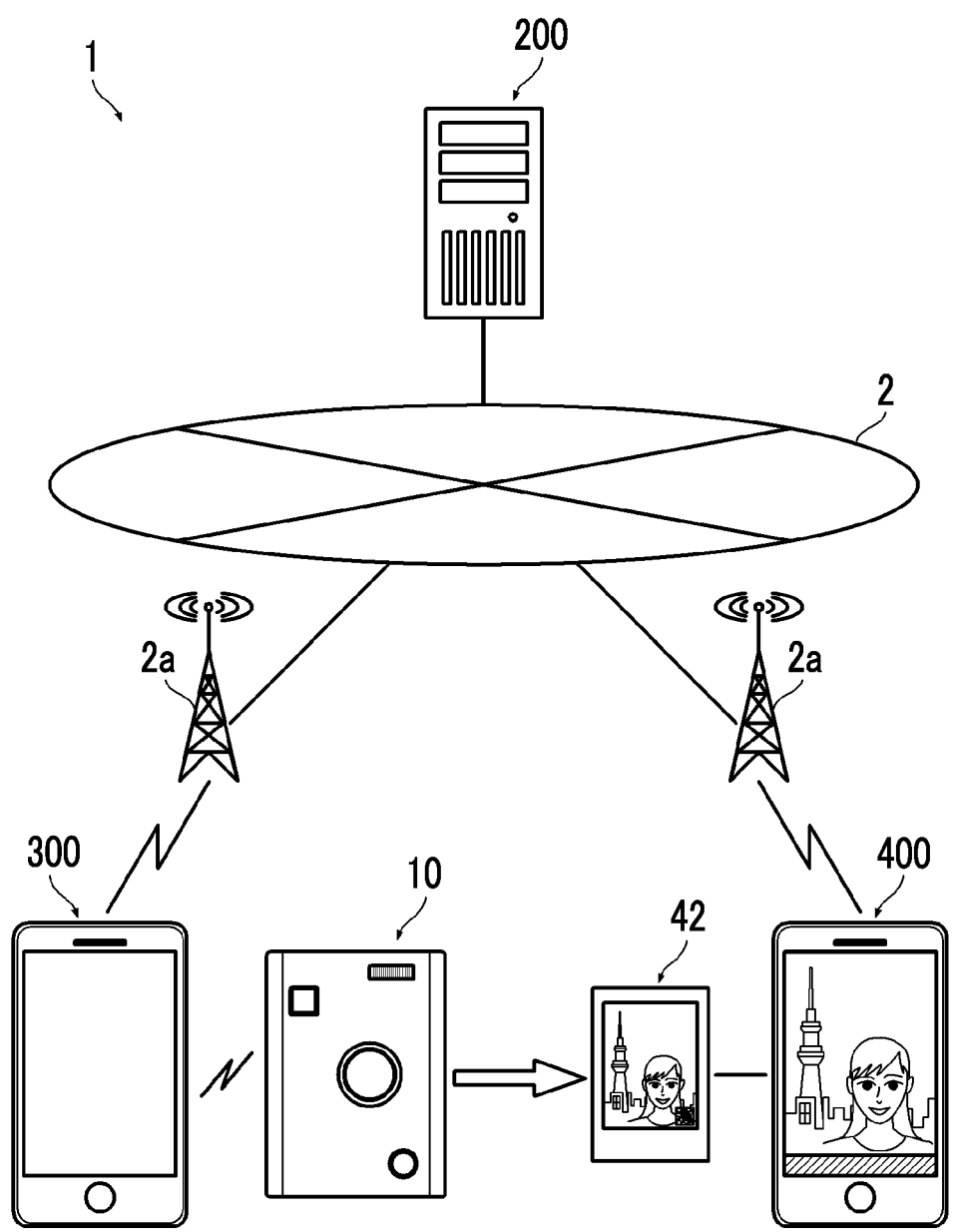
FIG. 1 is a system configuration diagram showing an embodiment of a data storage and playback system to which the present invention is applied.

FIG. 1 is a system configuration diagram showing an embodiment of a data storage and playback system to which the present invention is applied.

In a case where image data with sound is printed by a digital camera with a printer, a data storage and playback system 1 of the present embodiment is a system that uploads the image data and sound data to a data storage server, and enables playback on a terminal such as a smartphone as needed. The digital camera with a printer adds access information to a storage destination of data, and prints the image data at the time of printing the image data with sound. A user reads the access information on the terminal such as the smartphone, downloads target data from the data storage server, and plays the downloaded target data.

As shown in FIG. 1, the data storage and playback system 1 comprises a digital camera 10 with a printer, a data storage server 200 that stores image data of an image printed by the digital camera 10 with a printer and sound data associated with the image data, an upload terminal 300 for uploading data from the digital camera 10 with a printer to the data storage server 200, and a data playback terminal 400 that downloads the image data stored in the data storage server 200 and the sound data associated with the image data and plays the image data and sound data.

The upload terminal 300 is a computer having a communication function, particularly, a mobile computer such as a smartphone, a tablet terminal, a laptop computer, or personal data assistant (PDA). For example, communication a short-range wireless communication standard such as a near-field communication (NFC) standard, Bluetooth (registered trademark), or Wireless Fidelity (WiFi) is performed as communication between the digital camera 10 with a printer and the upload terminal 300.

The data playback terminal 400 is a computer having an imaging function and a communication function, particularly, a mobile computer with a camera such as a smartphone, a tablet terminal, a laptop computer, or personal data assistant (PDA).

Communication between the data storage server 200, the upload terminal 300, and the data playback terminal 400 is performed via a communication network 2. The communication network 2 is established by, for example, a wireless communication network such as 3rd Generation (3G), Worldwide Interoperability for Microwave Access (WiMAX), or Long-Term Evolution (LTE), base stations 2a, and the Internet.

A communication protocol between the data storage server 200, the upload terminal 300, and the data playback terminal 400 is, for example, HTTP communication using the Hyper Text Transfer Protocol (HTTP). The upload terminal 300 and the data playback terminal 400 correspond to HTTP clients, and the data storage server 200 corresponds to an HTTP server.

In the data storage and playback system 1 of the present embodiment, the digital camera 10 with a printer, the data storage server 200, and the upload terminal 300 constitute a data storage system, and the data storage server and the data playback terminal 400 constitute a data playback system.

<<Digital Camera with Printer>>

The digital camera 10 with a printer is a digital camera with a built-in printer, and has a function of printing a captured image at an imaging site. The digital camera 10 with a printer of the present embodiment prints an image on an instant film by using an instant film pack. The digital camera 10 with a printer of the present embodiment has a sound recording function, and has a function of recording sound in association with the captured image.

<Appearance Configuration>

Figure 2:
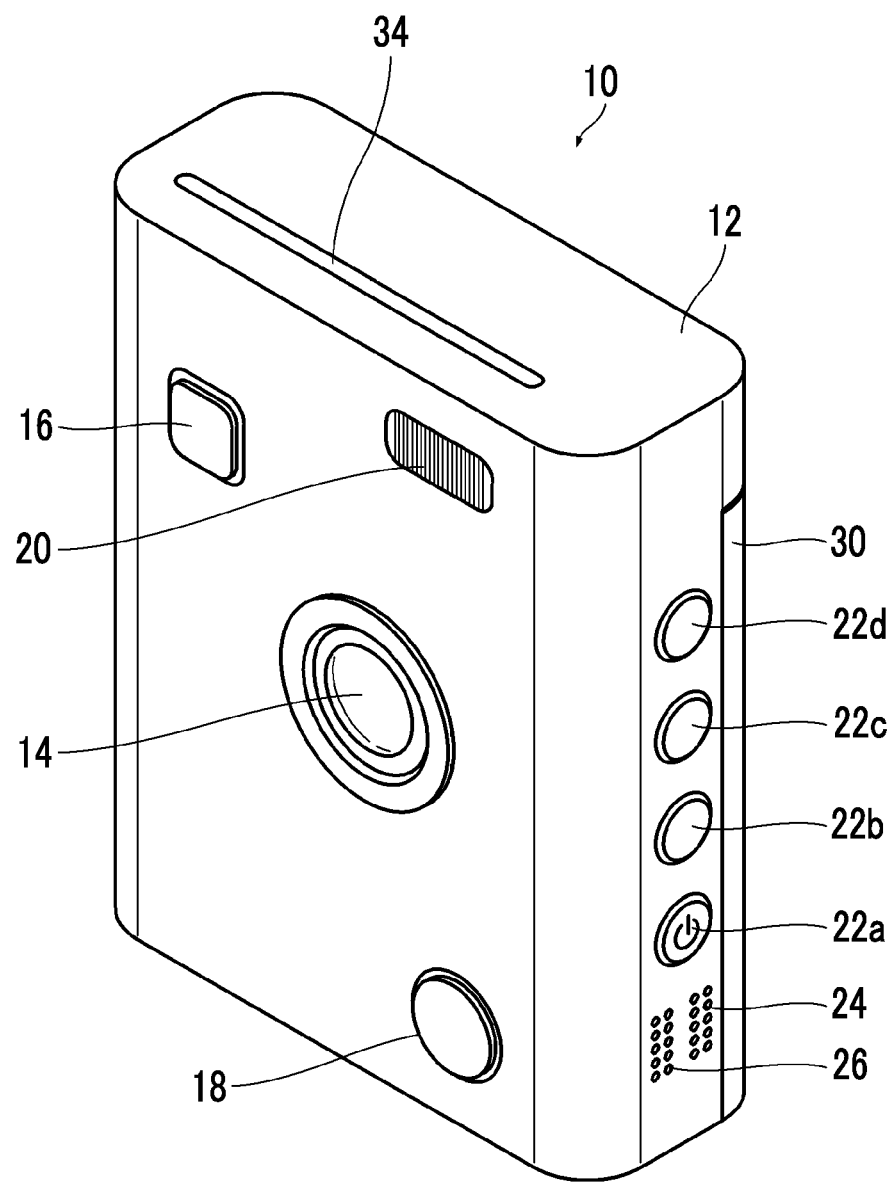
FIG. 2 is a front perspective view showing an example of a digital camera with a printer.
Figure 3:
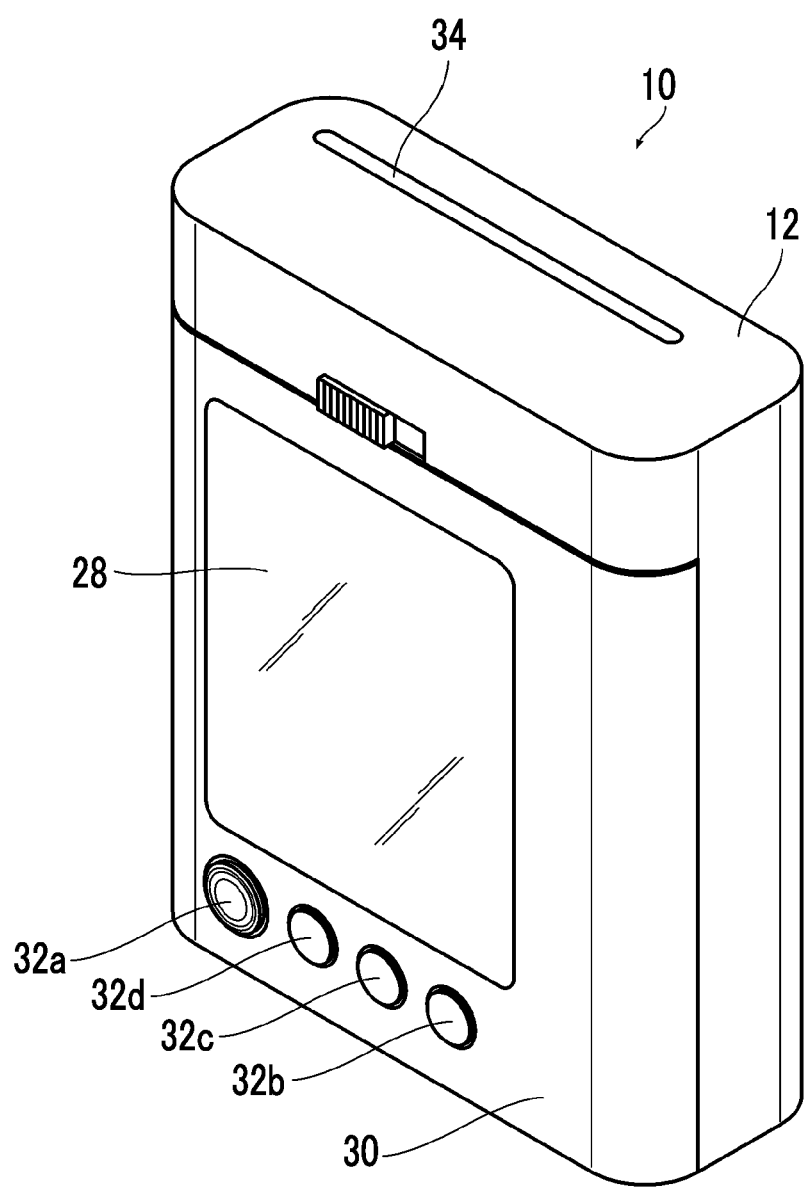
FIG. 3 is a rear perspective view of the digital camera with a printer shown in FIG. 2.

FIG. 2 is a front perspective view showing an example of the digital camera with a printer. FIG. 3 is a rear perspective view of the digital camera with a printer shown in FIG. 2.

As shown in FIGS. 2 and 3, the digital camera 10 with a printer includes a portable camera body 12. The camera body 12 has a vertically long rectangular shape in which a thickness in a forward-backward direction is thin and a dimension in a vertical direction is longer than a dimension in a horizontal direction.

As shown in FIG. 2, an imaging lens 14, a release button 16, a sound recording button 18, and a strobe emitting window 20 are provided on a front surface of the camera body 12. A power button 22a, a menu button 22b, an OK button 22c, a mode switching button 22d, microphone holes 24, and speaker holes 26 are provided on one side surface of the camera body 12. The release button 16 is a button for instructing the recording of the image. The sound recording button 18 is a button for switching a sound recording mode. The power button 22a is a button for turning on and off a power of the digital camera 10 with a printer. The menu button 22b is a button for calling a menu screen. The OK button is a button for instructing OK. The mode switching button 22d is a button for switching between an auto print mode and a manual print mode in an imaging mode.

As shown in FIG. 3, a display 28, a film lid cover 30, and various operation buttons are provided on a rear surface of the camera body 12. The film lid cover 30 is a cover that opens and closes a film loading chamber. A joystick 32a, a print button 32*b*, a playback button 32*c*, a cancel button 32*d* are included in the operation buttons. The print button 32*b* is a button for instructing printing. The playback button 32*c* is a button for instructing switching to a playback mode. The cancel button 32*d* is a button for instructing canceling of the operation.

As shown in FIGS. 2 and 3, a film discharge port 34 is provided on an upper surface of the camera body 12. The printed instant film is discharged through the film discharge port 34.

<Configuration of Printer Portion of Digital Camera with Printer>

Figure 4:
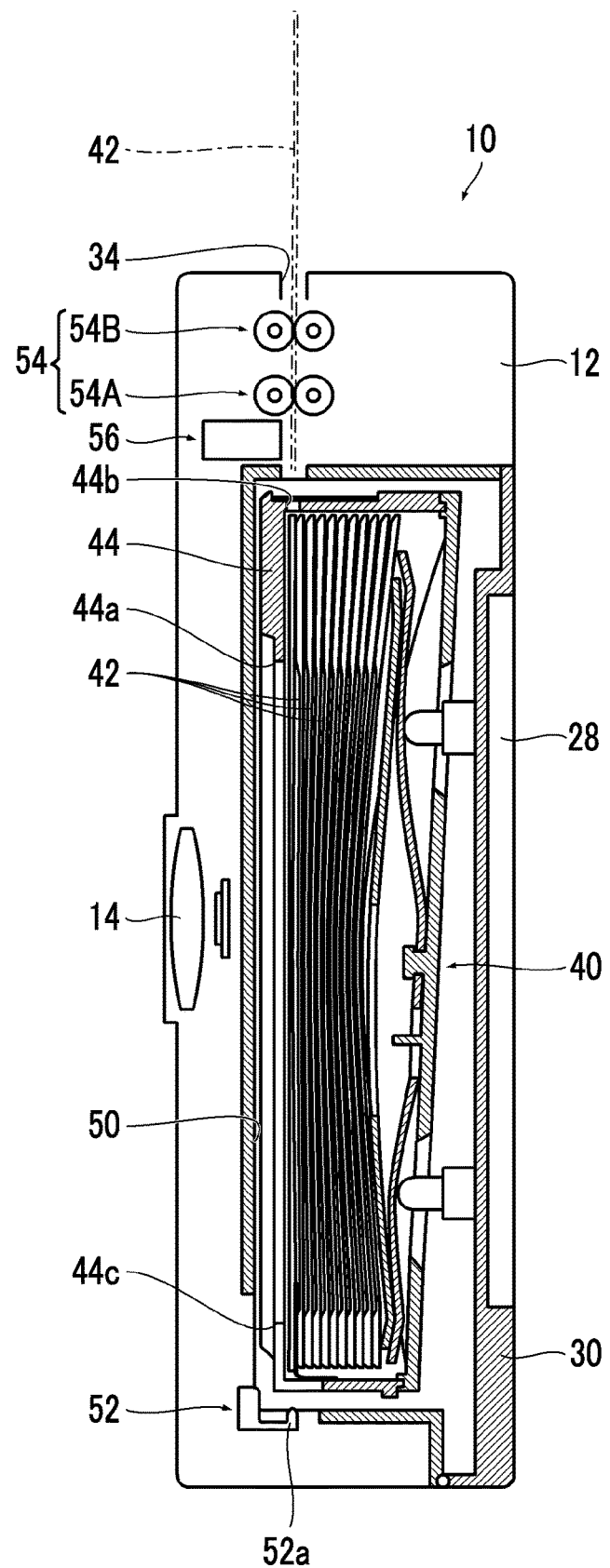
FIG. 4 is a cross-sectional view showing a schematic configuration of a printer portion.

FIG. 4 is a cross-sectional view showing a schematic configuration of a printer portion.

As shown in FIG. 4, the digital camera 10 with a printer comprises, as components of the printer portion which a print unit, a film loading chamber 50, a film delivery mechanism 52, a film transport mechanism 54, and a print head 56.

The film loading chamber 50 is a loading portion of the instant film pack 40. The film loading chamber 50 includes a recess portion into which the instant film pack 40 is fitted, and is opened and closed by the film lid cover 30. The film lid cover 30 is closed, and thus, the film loading chamber 50 is sealed in a darkroom state.

The instant film pack 40 has a structure in which a plurality of instant films 42 is accommodated in a case 44.

Figure 5:
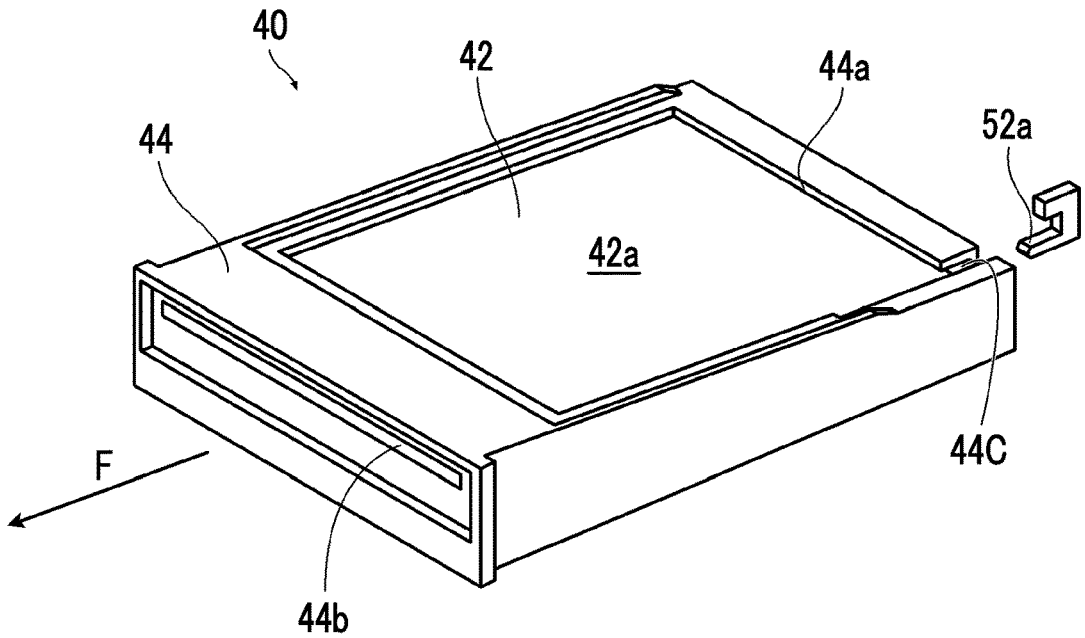
FIG. 5 is a perspective view of an instant film pack.
Figure 6:
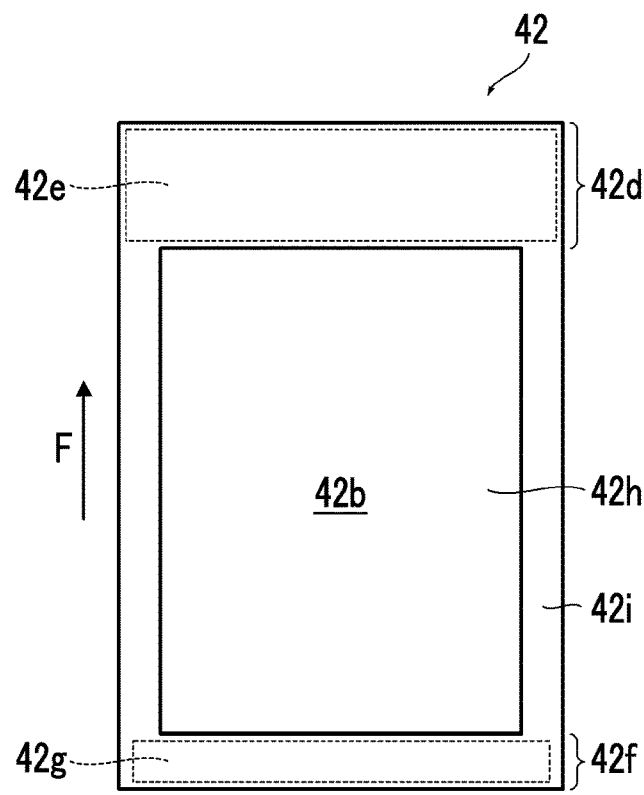
FIG. 6 is a front view of an instant film.
Figure 7:
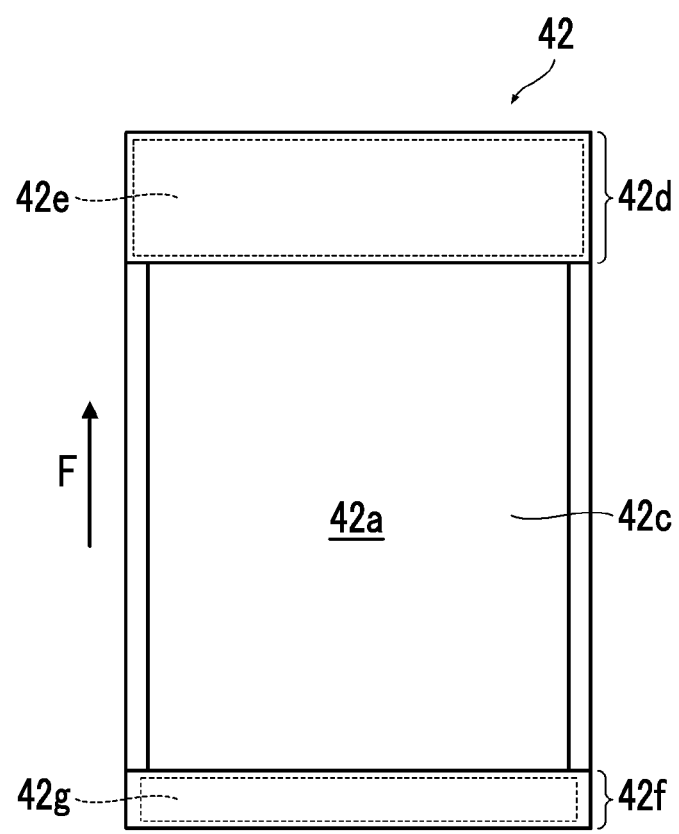
FIG. 7 is a rear view of the instant film.

FIG. 5 is a perspective view of the instant film pack. FIG. 6 is a front view of the instant film, and FIG. 7 is a rear view of the instant film. In FIGS. 5 to 7, a direction indicated by an arrow F is a delivery direction of the instant film 42. The instant film 42 is delivered in the direction indicated by the arrow F, and is discharged from the case 44.

The instant film 42 is an example of a medium for printing. The instant film 42 is an instant film of a so-called "mono-sheet type" (also referred to as a sheet film type or an integral film), and is an instant film of a type in which an image appears on a back side of an exposure surface. The instant film 42 has a rectangular card shape. The instant film 42 is configured such that one surface is an exposure surface 42*a* and the other surface is an observation surface 42*b*. The exposure surface 42*a* is a surface on which an image is recorded through exposing, and the observation surface 42*b* is a surface on which the recorded image is observed.

As shown in FIG. 7, an exposure region 42*c*, a pod portion 42*d*, and a trap portion 42*f* are provided on the exposure surface 42*a* of the instant film 42.

The exposure region 42*c* is a region in which the image is recorded through exposing. The exposure region 42*c* is a region in which the instant film 42 can be printed. The pod portion 42*d* and the trap portion 42*f* are arranged in front and back in the delivery direction F with the exposure region 42*c* interposed therebetween.

The pod portion 42*d* is disposed in front of the exposure region 42*c* in the delivery direction F. A developing solution pod 42*e* that contains a developing solution is provided within the pod portion 42*d*.

The trap portion 42*f* is disposed in the back of the exposure region 42*c* in the delivery direction F. An absorbent 42*g* is provided within the trap portion 42*f*.

As shown in FIG. 6, an observation region 42*h* is provided on the observation surface 42*b* of the instant film 42. The observation region 42*h* is a region in which the image is displayed. The image is displayed on the observation region 42*h* by developing the exposure region 42*c*. The observation region 42*h* is disposed so as to correspond to the exposure region 42*c*. A frame 42*i* is provided near the observation region 42*h*. Accordingly, the image is displayed within the frame. The observation region 42*h* is set so as to be slightly narrower (set so as to be one size smaller) than the exposure region 42*c*. Accordingly, in a case where the image is recorded in the entire region of the exposure region 42*c*, the image of which the surrounding is trimmed is printed.

The instant film 42 is viewed in an orientation in which the trap portion 42*f* is at the top and the pod portion 42*d* is at the bottom. Accordingly, the image is printed in an orientation in which the trap portion 42*f* is at the top and the pod portion 42*d* is at the bottom.

The instant film 42 is developed by spreading the developing solution of the pod portion 42*d* to the exposure region 42*c* after exposing. The developing solution of the pod portion 42*d* is squeezed out of the pod portion 42*d*, and is spread to the exposure region 42*c* by causing the instant film 42 to pass between a spreading roller pair 54B. The developing solution remaining at the time of spreading is captured in the trap portion 42*f*.

The case 44 has a rectangular box shape. The case 44 has a rectangular exposure opening 44*a* formed in a front portion. The case 44 has a slit-like discharge port 44*b* formed in a top portion. The instant films 42 are accommodated so as to be stacked such that the exposure surface 42*a* faces a front surface (exposure opening 44*a*) of the case 44 and the pod portion 42*d* faces a top surface (discharge port 44*b*) of the case 44. The case 44 has a slit-like claw opening portion 44*c* formed in a bottom portion. A claw 52*a* enters through the claw opening portion 44*c*, and thus, the instant films 42 accommodated in the case 44 are delivered toward the discharge port 44*b* one by one and are discharged through the discharge port 44*b*.

A plurality (for example, ten) of instant films 42 is accommodated in one instant film pack 40.

The film delivery mechanism 52 delivers the instant films 42 one by one from the instant film pack 40 loaded in the film loading chamber 50. The film delivery mechanism 52 comprises the claw 52*a* that moves back and forth along the delivery direction of the instant film 42, scrapes the instant films 42 within the case one by one by the claw 52*a*, and delivers the instant film 42 from the instant film pack 40.

The film transport mechanism 54 transports the instant film 42 delivered from the instant film pack 40 by the film delivery mechanism 52 at a predetermined speed. The film transport mechanism 54 comprises a transport roller pair 54A and the spreading roller pair 54B. The transport roller pair 54A is rotated by being driven by a motor (not shown), and transports the instant film 42 while holding both sides of the instant film. The spreading roller pair 54B is rotated by being driven by a motor (not shown), and transports the instant film 42 while holding the entire instant film. The pod portion 42*d* is crushed while the instant film is transported by the spreading roller pair 54B, and the instant film 42 is developed.

The print head 56 records the image on the instant film 42 delivered from the instant film pack 40. The print head 56 is a line-type exposure head. The print head 56 irradiates the exposure surface 42*a* of the instant film 42 transported by the film transport mechanism 54 with print light line by line, and records the image on the instant film 42 in a single pass.

<Electric Configuration of Digital Camera with Printer>

Figure 8:
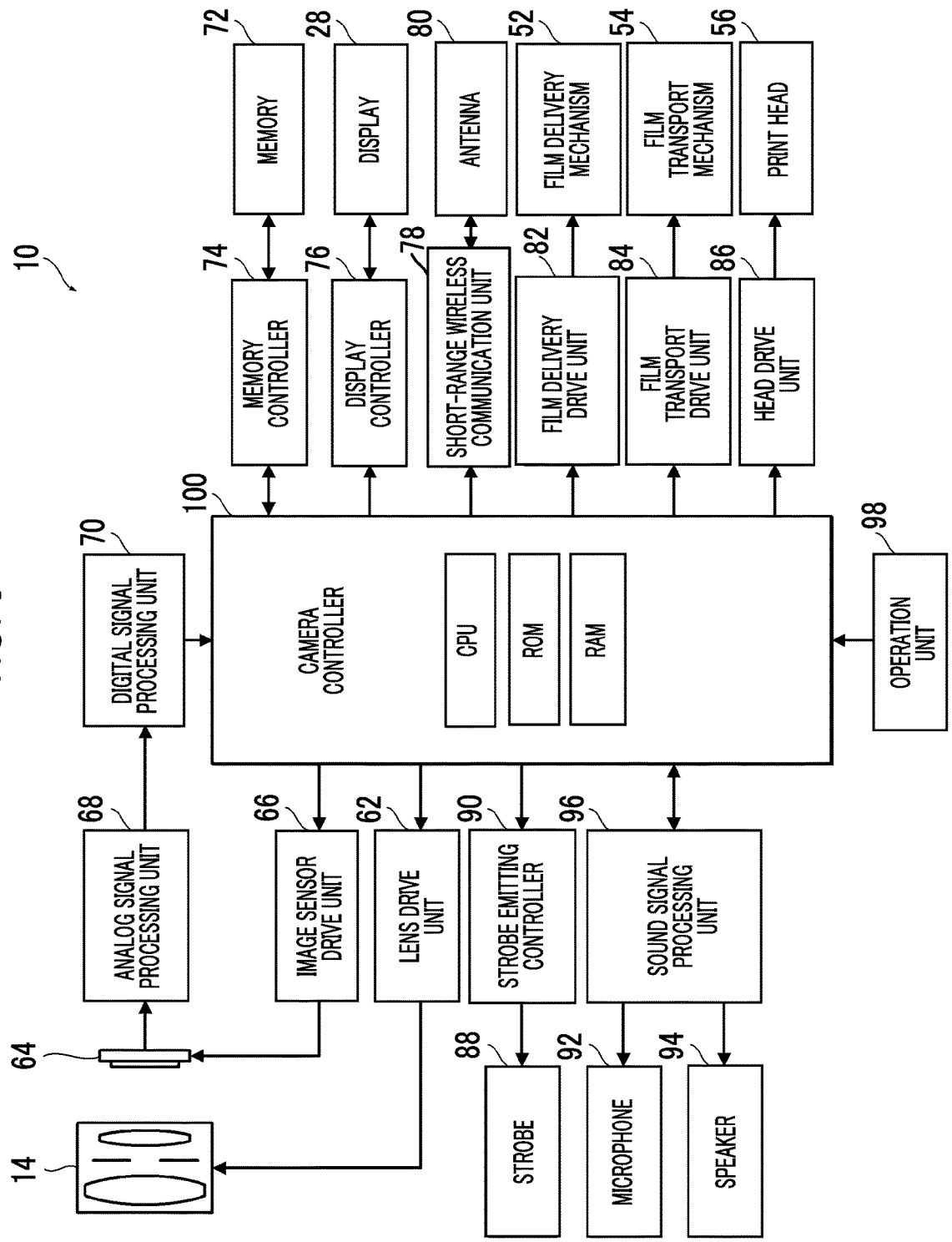
FIG. 8 is a block diagram showing an electric configuration of the digital camera with a printer.

FIG. 8 is a block diagram showing an electric configuration of the digital camera with a printer.

As shown in FIG. 8, the digital camera 10 with a printer comprises the imaging lens 14, a lens drive unit 62, an image sensor 64, an image sensor drive unit 66, an analog signal processing unit 68, a digital signal processing unit 70, a memory 72, a memory controller 74, the display 28, a display controller 76, a short-range wireless communication unit 78, an antenna 80, a film delivery drive unit 82, a film transport drive unit 84, a head drive unit 86, a strobe 88, a strobe emitting controller 90, a microphone 92, a speaker 94, a sound signal processing unit 96, an operation unit 98, and a camera controller 100.

The imaging lens 14 forms an optical image of a subject on a light receiving surface of the image sensor 64. The imaging lens 14 has a focus adjustment function, and comprises a stop and a shutter (all not shown). The lens drive unit 62 includes a motor that drives a focus adjustment mechanism of the imaging lens 14 and a drive circuit thereof, a motor that drives the stop and a drive circuit thereof, and a motor that drives the shutter and a drive circuit thereof, and operates the focus adjustment mechanism, the stop, and the shutter according to a command from the camera controller 100.

For example, the image sensor 64 is a two-dimensional solid-state imaging device such as a charge coupled device (CCD) image sensor or a complementary metal-oxide semiconductor (CMOS) image sensor. The image sensor 64 has an imaging region having an aspect ratio corresponding to a printable region of the instant film to be used. The image sensor drive unit 66 includes the drive circuit of the image sensor 64, and operates the image sensor 64 according to a command from the camera controller 100.

In the digital camera 10 with a printer of the present embodiment, the imaging lens 14 and the image sensor 64 constitute an imaging unit.

The analog signal processing unit 68 acquires analog image signal for each pixel output from the image sensor 64, converts the analog signal into a digital image signal by performing predetermined signal processing (for example, sampling two correlation pile or amplification processing), and outputs the digital image signal.

The digital signal processing unit 70 acquires the digital image signal output from the analog signal processing unit 68, and generates image data by performing predetermined signal processing (for example, gradation transformation processing, white balance correction processing, gamma-correction processing, demosaicing, or YC conversion processing).

The memory 72 stores the image data and sound data obtained through imaging. The memory 72 is an example of a storage unit. The memory controller 74 reads and writes the data from and in the memory 72 under the control using the camera controller 100.

The display 28 is, for example, a liquid crystal display (LCD), an organic electro-luminescence display (OLED), a plasma display, a field emission display (FED), or electronic paper. The display controller 76 displays a video on the display 28 under the control using the camera controller 100.

The short-range wireless communication unit 78 communicates with an external device through the antenna 80 in a wireless manner under the control using the camera controller 100. For example, short-range wireless communication such as NFC standard, BlueTooth, or WiFi is performed as the communication.

The film delivery drive unit 82 includes a motor that drives the claw 52a of the film delivery mechanism 52 and a drive circuit thereof, and operates the claw 52a by driving the motor of the claw 52a under the control using the camera controller 100.

The film transport drive unit 84 includes a motor that drives the transport roller pair 54A of the film transport mechanism 54 and a drive circuit thereof, and a motor that drives the spreading roller pair 54B and a drive circuit thereof, and operates the transport roller pair 54A and the spreading roller pair 54B by driving the motor of the transport roller pair 54A and the motor of the spreading roller pair 54B under the control using the camera controller 100.

The head drive unit 86 includes a drive circuit of the print head 56, and drives the print head 56 under the control using the camera controller 100.

For example, the strobe 88 comprises, as a light source, a xenon tube or a light emitting diode (LED). The strobe emits the light source, and irradiates the subject with strobe light. The strobe light is irradiated from the strobe emitting window 20 (see FIG. 2) provided on the front surface of the camera body 12. The strobe emitting controller 90 includes a drive circuit of the strobe 88, and emits the strobe 88 according to a command from the camera controller 100.

The microphone 92 collects external sound through the microphone holes 24 (see FIG. 2) provided at the camera body 12. The microphone 92 is an example of a sound collection unit. The speaker 94 outputs sound to the outside through the speaker holes 26 provided at the camera body 12. The sound signal processing unit 96 converts a sound signal input from the microphone 92 into a digital sound signal by performing predetermined signal processing on the sound signal, and outputs the digital sound signal. The sound signal processing unit 96 performs predetermined signal processing on the sound data given from the camera controller 100, and outputs the sound data through the speaker 94.

The operation unit 98 includes various operation members such as the release button 16, the sound recording button 18, the power button 22a, the menu button 22b, the OK button 22c, the joystick 32a, the print button 32b, the playback button 32c, and the cancel button 32d and a signal processing circuit, and outputs a signal based on an operation of each operation member to the camera controller 100.

The camera controller 100 is a controller that generally controls the entire operation of the digital camera 10 with a printer, and is a computer comprising a central processing unit (CPU), a read only memory (ROM), and a random access memory (RAM). The computer realizes various functions as the camera controller 100 by executing a predetermined control program.

Figure 9:
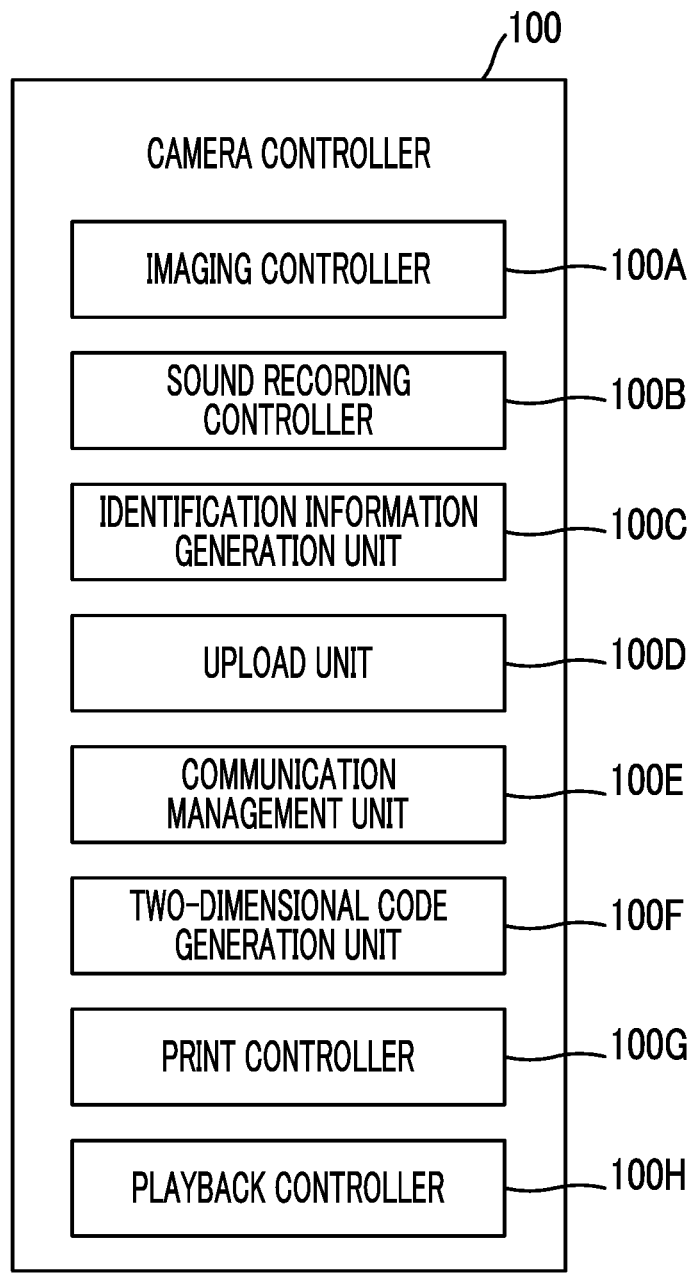
FIG. 9 is a block diagram of main functions realized by a camera controller.

FIG. 9 is a block diagram of main functions realized by the camera controller.

As shown in FIG. 9, the camera controller 100 functions as an imaging controller 100A, a sound recording controller 100B, an identification information generation unit 100C, an upload unit 100D, a communication management unit 100E, a two-dimensional code generation unit 100F, a print controller 100G, and a playback controller 100H by executing the predetermined control program.

The imaging controller 100a controls imaging. That is, the imaging controller captures the image by controlling the imaging lens 14 and the image sensor 64 which constitute the imaging unit, and performs processing for recording the image data obtained through the imaging in the memory 72. Live preview processing is performed at the time of imaging. That is, the video captured by the image sensor 64 is displayed on the display 28 in real time. Accordingly, imaging can be performed while using the display 28 as a live preview monitor. The imaging for recording is performed by pressing the release button 16.

The sound recording controller 100B controls the sound recording. In a case where the image with sound is captured, the sound recording controller 100B obtains the sound data through the microphone 92, and performs processing for recording the obtained sound data in association with the image data obtained through the imaging in the memory 72. In a case where the sound is added to the captured image, the sound recording controller 100B obtains the sound data through the microphone 92, and performs processing for recording the obtained sound data in association with target image data in the memory 72. In a case where rewriting of the sound on the captured image with sound is instructed, the sound recording controller 100B obtains the sound data through the microphone 92, and performs processing for rewriting the sound data of the target image data with the obtained sound data.

In a case where the image data with sound (the image data associated with the sound data) is printed, the identification information generation unit 100C performs processing for generating predetermined identification information. As will be described below, in a case where the image data with sound is printed, the image data and the sound data are stored in the data storage server 200. The identification information is used at the time of storing the image data and the sound data in the data storage server 200. That is, the identification information is used for specifying the data in the data storage server 200. The aforementioned points will be described in detail below.

The upload unit 100D performs processing for uploading the image data and the sound data in the data storage server 200. In the digital camera 10 with a printer of the present embodiment, the data is uploaded to the data storage server 200 through the upload terminal 300. Accordingly, the upload unit 100D transmits the data to the upload terminal 300.

The communication management unit 100E manages communication with the upload terminal 300. More specifically, the communication management unit manages a connection state of the communication with the upload terminal 300, and determines whether or not to transmit the data to the upload terminal 300.

In a case where the image data with sound is printed, the two-dimensional code generation unit 100F generates a two-dimensional code obtained by encoding predetermined information. As stated above, in a case where the image data with sound is printed, the image data and the sound data are stored in the data storage server 200. The two-dimensional code generation unit 100F generates a two-dimensional code obtained by encoding access information to the image data and the sound data stored in the data storage server 200. The two-dimensional code is an example of recording information, and the two-dimensional code generation unit 100F is an example of a recording information generation unit. For example, the two-dimensional code is a QR code (registered trademark).

The print controller 100G controls printing. Initially, in the printing, image data for printing is generated from the image data instructed to be printed. Subsequently, the print controller drives the print head 56 based on the generated image data for printing, and prints the image on the instant film 42. Accordingly, the print controller 100G has a function of a print image data generation unit and a print drive unit. The print image data generation unit performs processing for generating the image data for printing, and the print drive unit performs processing for driving the print head 56, the film delivery mechanism 52, and the film transport mechanism 54.

In a case where the image data with sound is printed, the print controller 100G adds the two-dimensional code, and prints the image. Specifically, the print controller generates, as the image data for printing, image data combined with the two-dimensional code, and prints the generated image data with the two-dimensional code. The two-dimensional code is combined so as to be overlapped with a part of the image. The aforementioned points will be described in detail below.

The playback controller 100H controls playing of the recorded image. That is, the reproduction controller reads out the image data from the memory 72, and performs processing for displaying the readout image data on the display 28. At this time, in a case where image data as a playback target is the image data with sound, the playback controller reads out the sound data, and outputs the readout sound through the speaker 94. Frame-by-frame advancing of the image is performed by an operation of the joystick 32a.

<<Data Storage Server>>

The data storage server 200 stores the image data captured by the digital camera 10 with a printer and the sound data associated with the image data. The data storage server 200 is an example of a server. The data storage server 200 is a general server computer.

Figure 10:
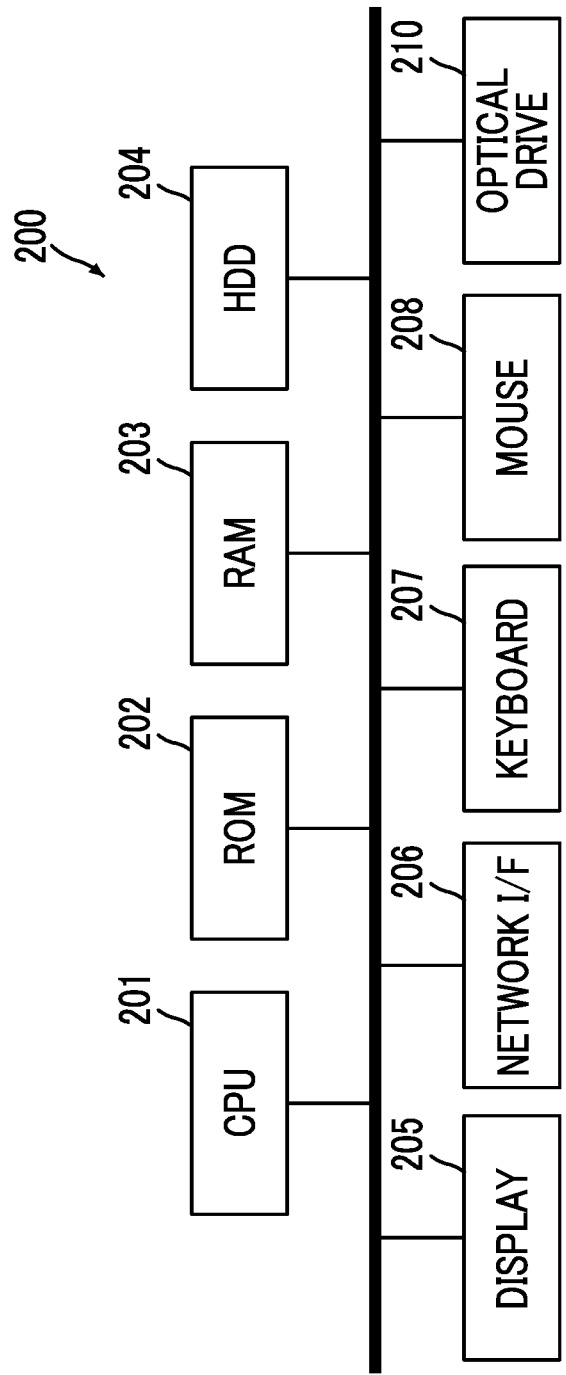
FIG. 10 is a block diagram showing an example of a hardware configuration of a data storage server.

FIG. 10 is a block diagram showing an example of a hardware configuration of the data storage server.

As shown in FIG. 10, the data storage server 200 comprises a CPU 201 that controls the entire operation, a ROM 202 that stores a program used for driving the CPU 201 such as an initial program loader (IPL), a RAM 203 that is used as a work area of the CPU 201, a hard disk drive (HDD) 204 that stores various programs and various data for the data storage server 200, a display 205, a network interface (I/F) 206 for performing data communication by using the communication network 2, a keyboard 207, a mouse 208, and an optical drive 210.

Figure 11:
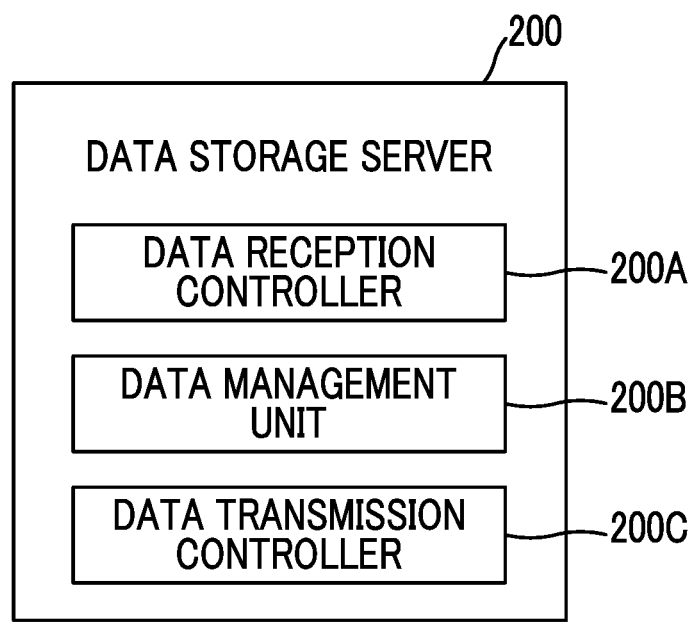
FIG. 11 is a block diagram of main functions provided by the data storage server.

FIG. 11 is a block diagram of main functions provided by the data storage server.

As shown in FIG. 11, the CPU 201 executes a predetermined program, and thus, the data storage server 200 functions as a data reception controller 200A, a data management unit 200B, and a data transmission controller 200C.

The data reception controller 200a communicates with the upload terminal 300 via the communication network 2, and receives data for storing from the upload terminal 300.

The data management unit 200B performs processing for recording the data received from the upload terminal 300 in a storage unit and performs readout processing the corresponding data from the storage unit according to a download request from the data playback terminal 400. The storage unit is the HDD 204. The data management unit 200B constructs a predetermined database, and stores the image data and the sound data associated with the image data in the HDD 204.

The data transmission controller 200C communicates with the data playback terminal 400 via the communication network 2, and transmits the data to the data playback terminal 400 according to a download request for the corresponding data from the data playback terminal 400.

<<Upload Terminal>>

The upload terminal 300 is a terminal that uploads the data to the data storage server 200, receives the data for storing (the image data of the printed image and the sound data associated with the image data) from the digital camera 10 with a printer, and transmits the received data to the data storage server 200.

As stated above, the upload terminal 300 is a computer having a communication function, particularly, a mobile computer such as a smartphone, a tablet terminal, a laptop computer, or a PDA, and communicates with the digital camera 10 with a printer through the short-range wireless communication (for example, NFC standard, BlueTooth, or WiFi). The upload terminal communicates with the data storage server 200 via the communication network 2.

Figure 12:
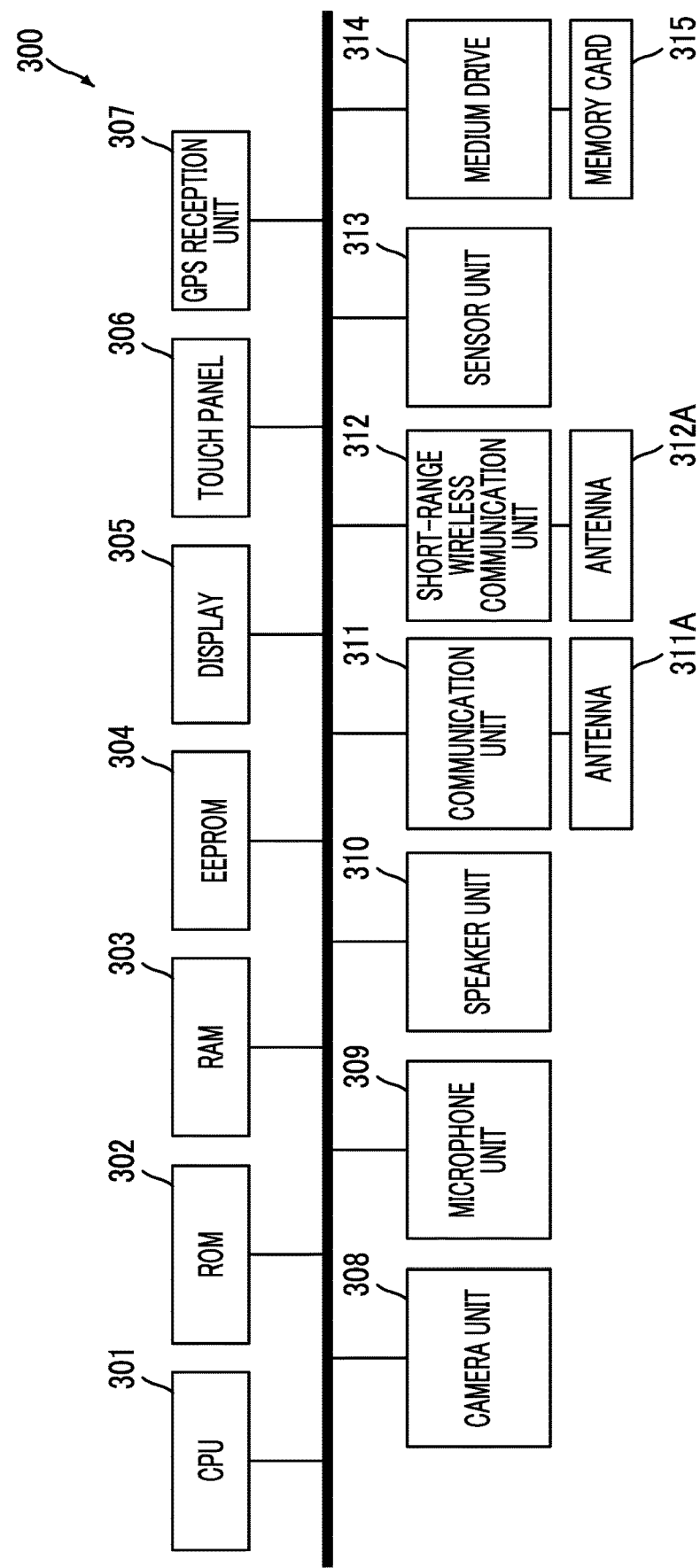
FIG. 12 is a block diagram showing an example of a hardware configuration of an upload terminal.

FIG. 12 is a block diagram showing an example of a hardware configuration of the upload terminal. FIG. 12 shows an example of a hardware configuration in a case where the upload terminal 300 is the smartphone.

As shown in FIG. 12, the upload terminal 300 comprises a CPU 301 that controls the entire operation, a ROM 302 that stores a basic input and output program, a RAM 303 that is used as a work area of the CPU 301, an electrically erasable and programmable ROM (EEPROM) 304 that stores various programs including an operating system executed by the CPU 301 and various data, a display 305, a touch panel 306 that detects a touch operation on a display screen, a Global Positioning Systems (GPS) reception unit 307 that receives a GPS signal including positional information (latitude, longitude, and altitude) of the upload terminal 300 by a GPS satellite or an Indoor Messaging System (IMES) as an indoor GPS, a camera unit 308 that includes an imaging lens and an image sensor and electronically captures an image, a microphone unit 309 that includes a microphone and receives sound, a speaker unit 310 that includes a speaker and outputs sound, a communication unit 311 that communicates with the nearest base station 2a in a wireless manner by using an antenna 311A, a short-range wireless communication unit 312 that communicates with an external device in a short-range wireless manner by using an antenna 312A, a sensor unit 313 that includes various sensors such as a geomagnetic sensor, a gyro compass, and an acceleration sensor, and a medium drive 314 that reads and writes the data from and in a memory card 315.

Figure 13:
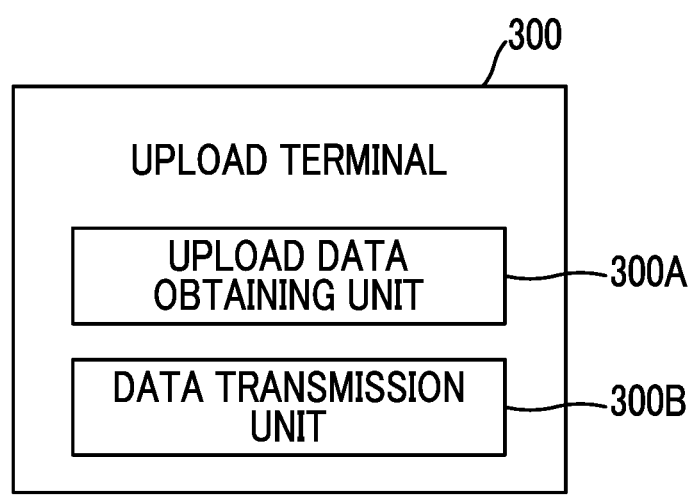
FIG. 13 is a block diagram of main functions provided by the upload terminal.

FIG. 13 is a block diagram of main functions provided by the upload terminal.

As shown in FIG. 13, the CPU 301 executes a predetermined program, and thus, the upload terminal 300 functions as an upload data obtaining unit 300A and a data transmission unit 300B.

The upload data obtaining unit 300A communicates with the digital camera 10 with a printer in a short-range wireless manner, and receives upload data (the image data and the sound data associated with the image data) from the digital camera 10 with a printer.

The data transmission unit 300B communicates with the data storage server 200 via the communication network 2, and transmits (uploads) the data received from the digital camera 10 with a printer to the data storage server 200.

<<Data Playback Terminal>>

The data playback terminal 400 is a terminal that downloads the image data and the sound data associated with the image data stored in the data storage server 200, and plays the downloaded data. Information for accessing the data to be downloaded is obtained from the instant film 42 on which the image to be downloaded is printed. That is, the two-dimensional code for downloading the image added to the instant film is printed on the instant film 42. The two-dimensional code is read, and the image data and the sound data associated with the image data are downloaded.

The data playback terminal 400 is a computer having a camera function and a communication function, particularly, a mobile computer with a camera such as a smartphone, a tablet terminal, a laptop computer, or a PDA, and communicates with the data storage server 200 via the communication network 2.

Figure 14:
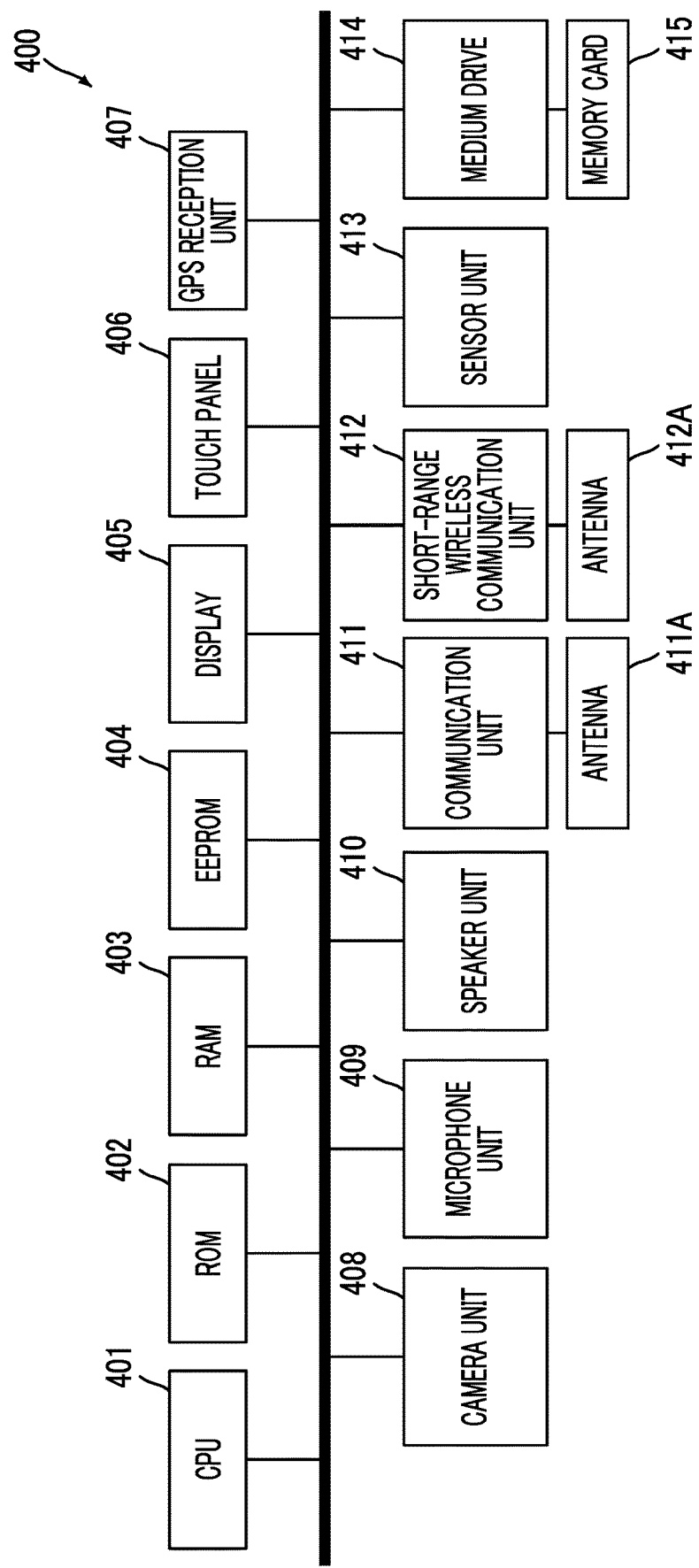
FIG. 14 is a block diagram showing an example of a hardware configuration of a data playback terminal.

FIG. 14 is a block diagram showing an example of a hardware configuration of the data playback terminal. FIG. 14 shows an example of a hardware configuration in a case where the data playback terminal 400 is the smartphone.

As shown in FIG. 14, the data playback terminal 400 comprises a CPU 401 that controls the entire operation, a ROM 402 that stores a basic input and output program, a RAM 403 that is used as a work area of the CPU 401, a EEPROM 404 that stores various programs including an operating system executed by the CPU 401 and various data, a display 405, a touch panel 406 that detects a touch operation on a display screen, a GPS reception unit 407, a camera unit 408 that includes an imaging lens and an image sensor and electronically captures an image, a microphone unit 409 that includes a microphone and receives sound, a speaker unit 410 that includes a speaker and outputs sound, a communication unit 411 that communicates with the nearest base station 2a in a wireless manner by using an antenna 411A, a short-range wireless communication unit 412 that communicates with an external device in a short-range wireless manner by using an antenna 412A, a sensor unit 413 that includes various sensors such as a geomagnetic sensor, a gyro compass, and an acceleration sensor, and a medium drive 414 that reads and writes data from and in a memory card 415.

Figure 15:
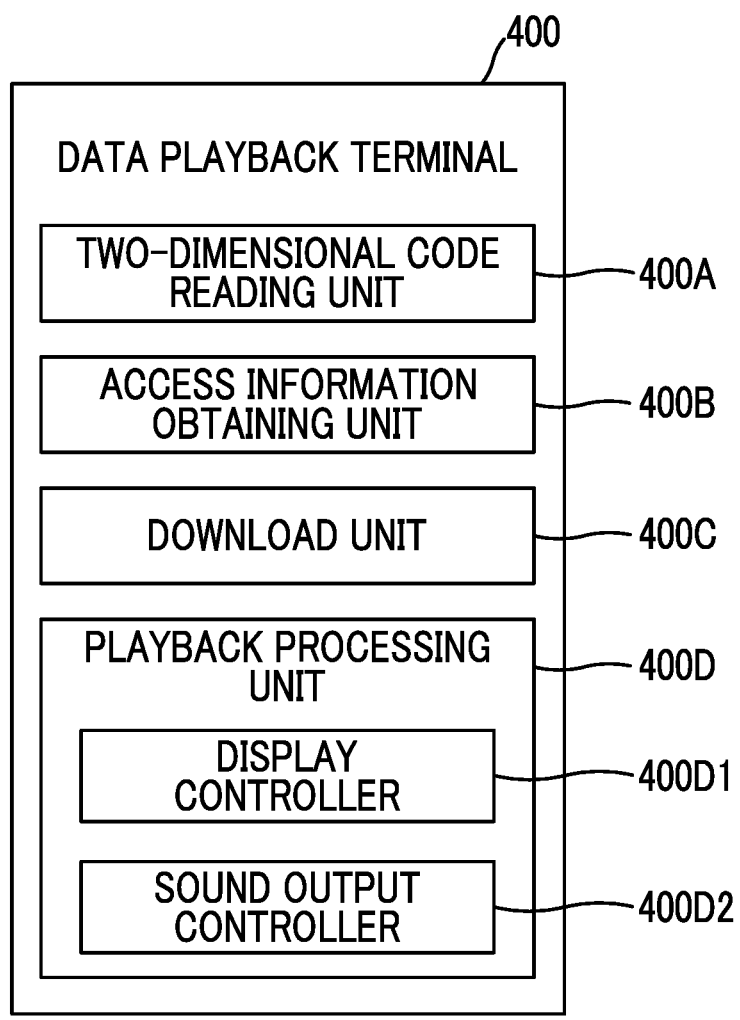
FIG. 15 is a block diagram of main functions provided by the data playback terminal.

FIG. 15 is a block diagram of main functions provided by the data playback terminal.

As shown in FIG. 15, the CPU 401 executes a predetermined program, and thus, the data playback terminal 400 functions as a two-dimensional code reading unit 400A, an access information obtaining unit 400B, a download unit 400C, and a playback processing unit 400D.

The two-dimensional code reading unit 400A is realized by the camera unit 408, and reads a two-dimensional code by imaging the two-dimensional code by the camera unit 408. The two-dimensional code reading unit 400A is an example of a recording information reading unit.

The access information obtaining unit 400B obtains access information to the image data and the sound data of the image printed on the instant film 42 by reading the two-dimensional code printed on the instant film 42 by using the two-dimensional code reading unit 400A.

The download unit 400C accesses the data storage server 200 based on the access information obtained by the access information obtaining unit 400B, and downloads the corresponding image data and sound data.

The playback processing unit 400D performs processing for playing the downloaded image data and sound data. The playback processing unit 400D comprises a display controller 400D1 that displays the downloaded image data on the display 405 which is a display unit and a sound output controller 400D2 that outputs the downloaded sound data from the speaker unit which is a sound output unit.

[Operation of System]

<<Operation of Digital Camera with Printer>>

The digital camera 10 with a printer has, as an operation mode, the imaging mode and the playback mode. The imaging mode is a mode in which an image is captured. The playback mode is a mode in which the captured image is played.

There are the auto print mode and the manual print mode in the imaging mode. The auto print mode is a mode in which the captured image is automatically printed. The manual print mode is a mode in which the captured image is printed according to a command of the user. Switching between the modes is performed by pressing the mode switching button 22d.

There is a mode (sound recording mode) in which the image with sound is captured in each mode of the imaging mode. There are a normal sound recording mode and an after recording mode in the sound recording mode. The normal sound recording mode is a mode in which sound for a predetermined time before and after releasing is recorded. The after recording mode is a mode in which sound is input after the imaging. Switching between the sound recording modes is performed by pressing the sound recording button 18. Specifically, whenever the sound recording button 18 is pressed, the normal sound recording mode, the after recording mode, and the sound recording mode are sequentially turned off.

Figure 16:
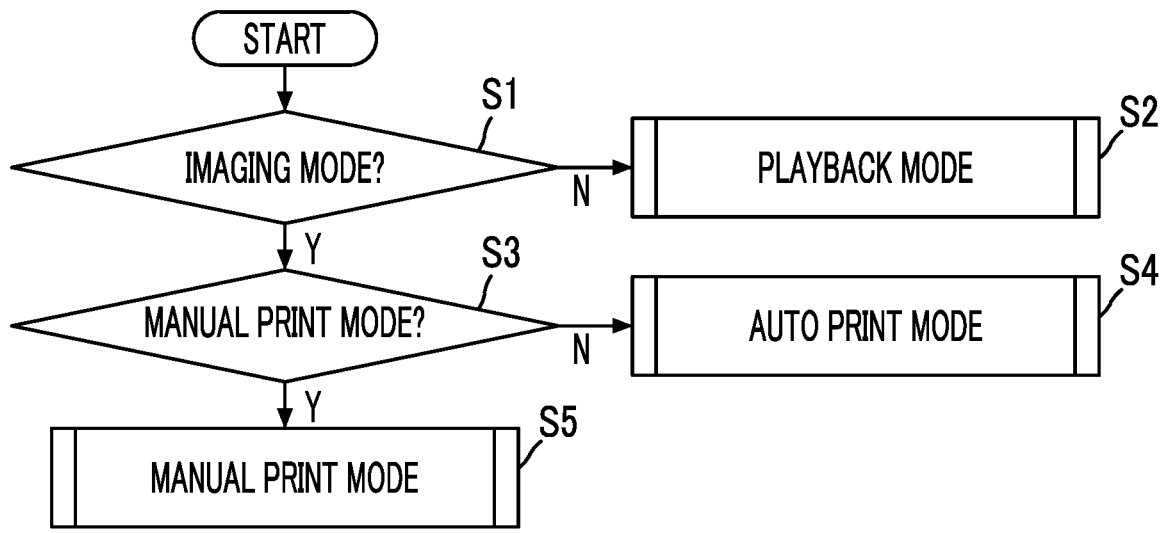
FIG. 16 is a flowchart showing a procedure of setting for each mode.

FIG. 16 is a flowchart showing a procedure of setting for each mode.

Initially, it is determined whether or not the digital camera with a printer is in the imaging mode (step S1). In a case where the digital camera with a printer is not in the imaging mode, it is determined that the digital camera with a printer is in the playback mode, and the processing in the playback mode is performed (step S2).

In a case where the digital camera with a printer is in the imaging mode, it is determined whether or not the digital camera with a printer is in the manual print mode (step S3). In a case where the digital camera with a printer is not in the manual print mode, it is determined that the digital camera with a printer is in the auto print mode, and the processing in the auto print mode is performed (step S4). In a case where the digital camera with a printer is in the manual print mode, the processing in the manual print mode is performed (step S5).

<Operation in Manual Print Mode>

As stated above, the manual print mode is a mode in which the captured image is printed according to a print command from the user after the imaging.

Figure 17:
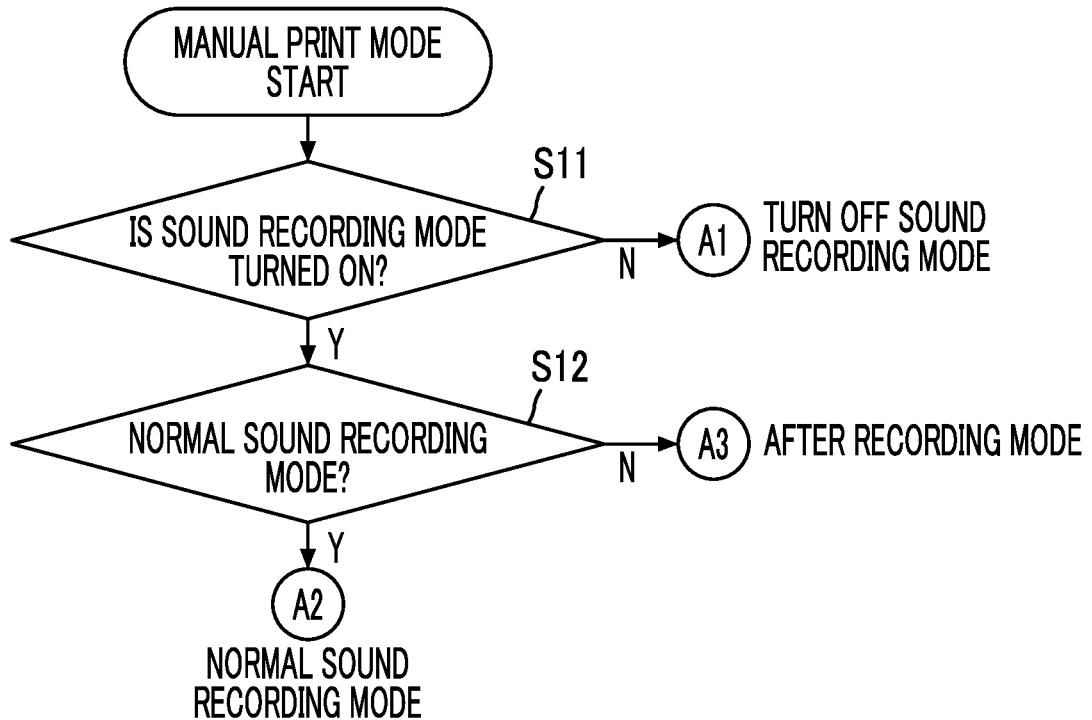
FIG. 17 is a flowchart showing an operation procedure in a manual print mode.

FIG. 17 is a flowchart showing an operation procedure in the manual print mode.

Initially, it is determined whether or not the sound recording mode is turned on (step S11). In a case where the sound recording mode is not turned on, the imaging is performed without performing the sound recording. Meanwhile, in a case where the sound recording mode is turned on, it is determined whether or not the normal sound recording mode is set (step S12). In a case where the normal sound recording mode is set, the imaging is performed in the normal sound recording mode. That is, the sound recording is performed simultaneously with the imaging. Meanwhile, in a case where the normal sound recording mode is not set, the imaging is performed in the after recording mode. That is, the sound is recorded after the imaging.

(1) Case where Sound Recording Mode is Turned Off

Figure 18:
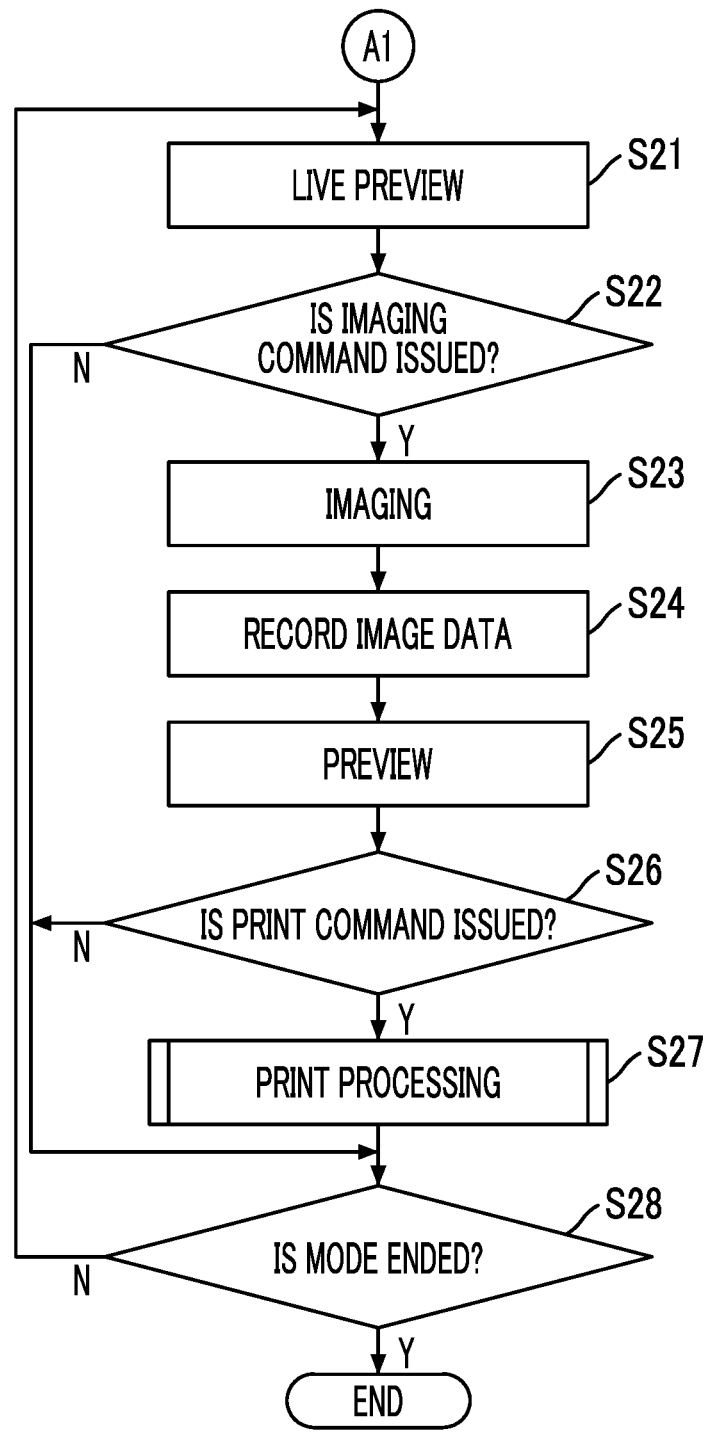
FIG. 18 is a flowchart showing an operation procedure in a case where a sound recording mode is turned off in the manual print mode.

FIG. 18 is a flowchart showing an operation procedure in a case where the sound recording mode is turned off in the manual print mode.

Initially, live preview is displayed on the display 28 (step S21). That is, the video captured by the image sensor 64 is displayed on the display 28 in real time. The user checks composition and a focusing state on the subject while viewing the display of the display 28.

Thereafter, it is determined whether or not an imaging command is issued (step S22). The imaging command is performed by pressing the release button 16.

In a case where the imaging command is issued, the imaging processing is performed (step S23). That is, the image is acquired through the image sensor 64. For example, the image data obtained through the imaging is converted into a predetermined file format such as Joint Photographic Experts Group (JPEG), RAW, Tagged Image File Format (TIFF), Graphics Interchange Format (GIF), or bitmap, and the converted image data is recorded in the memory 72 (step S24).

In a case where the imaging is performed, the image data obtained through the imaging is previewed on the display 28 (step S25). The user checks the display of the display 28, and determines whether or not it is necessary to print the image. In a case where the user prints the image, the user presses the print button 32*b*, in a case where the user does not print the image, the user presses the cancel button 32*d* or the release button 16.

It is determined whether or not a print command is issued based on an operation of the user during previewing (step S26). In a case where the print command is issued, print processing is performed (step S27). The print processing will be described below. Thereafter, it is determined whether or not the mode is ended (step S28). That is, it is determined whether or not the mode is switched to another mode. In a case where the mode is ended, the processing is ended.

As stated above, in the manual print mode, the captured image is printed after the imaging according to the print command from the user.

(2) Case where Normal Sound Recording Mode is Turned on

Figure 19:
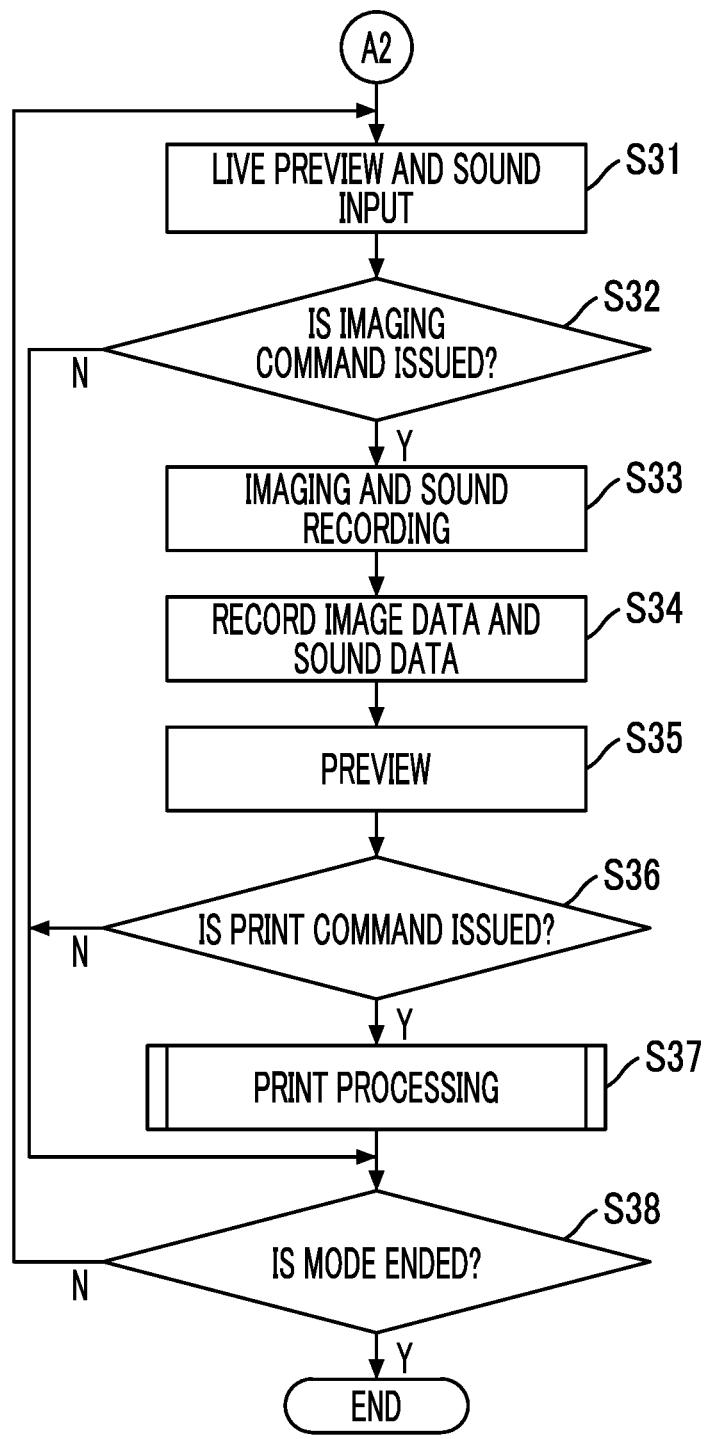
FIG. 19 is a flowchart showing an operation procedure in a case where a normal sound recording mode is turned on in the manual print mode.

FIG. 19 is a flowchart showing an operation procedure in a case where the normal sound recording mode is turned on in the manual print mode.

Initially, live preview is displayed on the display 28. The acquisition of sound from the microphone 92 is started at the same time as the live preview (step S31). The acquired sound is buffered for a predetermined time, and is then removed sequentially. That is, the sound is buffered as much as necessary for recording the sound. For example, in a case where sound for five seconds before and after the imaging is recorded, sound for at least the past five seconds is buffered.

Thereafter, it is determined whether or not an imaging command is issued (step S32). In a case where the imaging command is issued, the imaging processing is performed (step S33). That is, the acquisition of the image is performed through the image sensor 64, and the acquisition of the sound is performed through the microphone 92. The sound for the predetermined time before and after the imaging is acquired as the sound.

The image data and the sound data obtained through the imaging are converted into a predetermined file format, and are recorded in association with each other in the memory 72 (step S34). An appropriate sound file such as Moving Picture Experts Group (MPEG)-1 Audio Layer 3 (MP3), RealAudio (registered trademark), Musical Instruments digital Interface (MIDI) (registered trademark) file, or WAVE file can be used as the sound data file.

In a case where the imaging is performed, the image data obtained through the imaging is previewed on the display 28 (step S35). It is determined whether or not the print command is issued based on an operation of the user during previewing (step S36). In a case where the print command is issued, print processing is performed (step S37). The print processing will be described below. Thereafter, it is determined whether or not the mode is ended (step S38). In a case where the mode is ended, the processing is ended.

As stated above, in the normal sound recording mode, the sound for the predetermined time before and after the imaging is recorded at the same time as the imaging, and the sound and the image are recorded in the memory 72. The captured image data is printed according to the print command from the user.

(3) Case where after Recording Mode is Turned on

Figure 20:
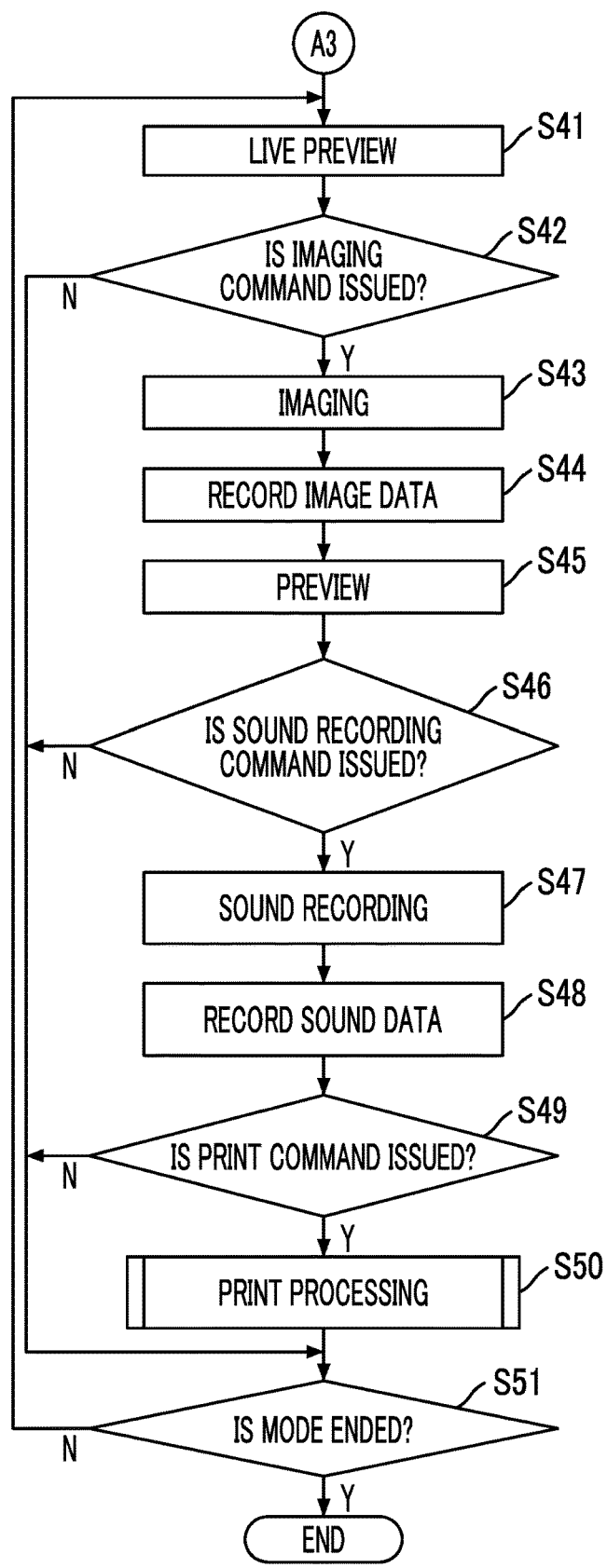
FIG. 20 is a flowchart showing an operation procedure in a case where an after recording mode is turned on in the manual print mode.

FIG. 20 is a flowchart showing an operation procedure in a case where the after recording mode is turned on in the manual print mode.

Initially, live preview is displayed on the display 28 (step S41). Thereafter, it is determined whether or not an imaging command is issued (step S42). In a case where the imaging command is issued, the imaging processing is performed (step S43), and the image data obtained through the imaging is recorded in the memory 72 (step S44). In a case where the imaging is performed, the image data obtained through the imaging is previewed on the display 28 (step S45).

Figure 21:
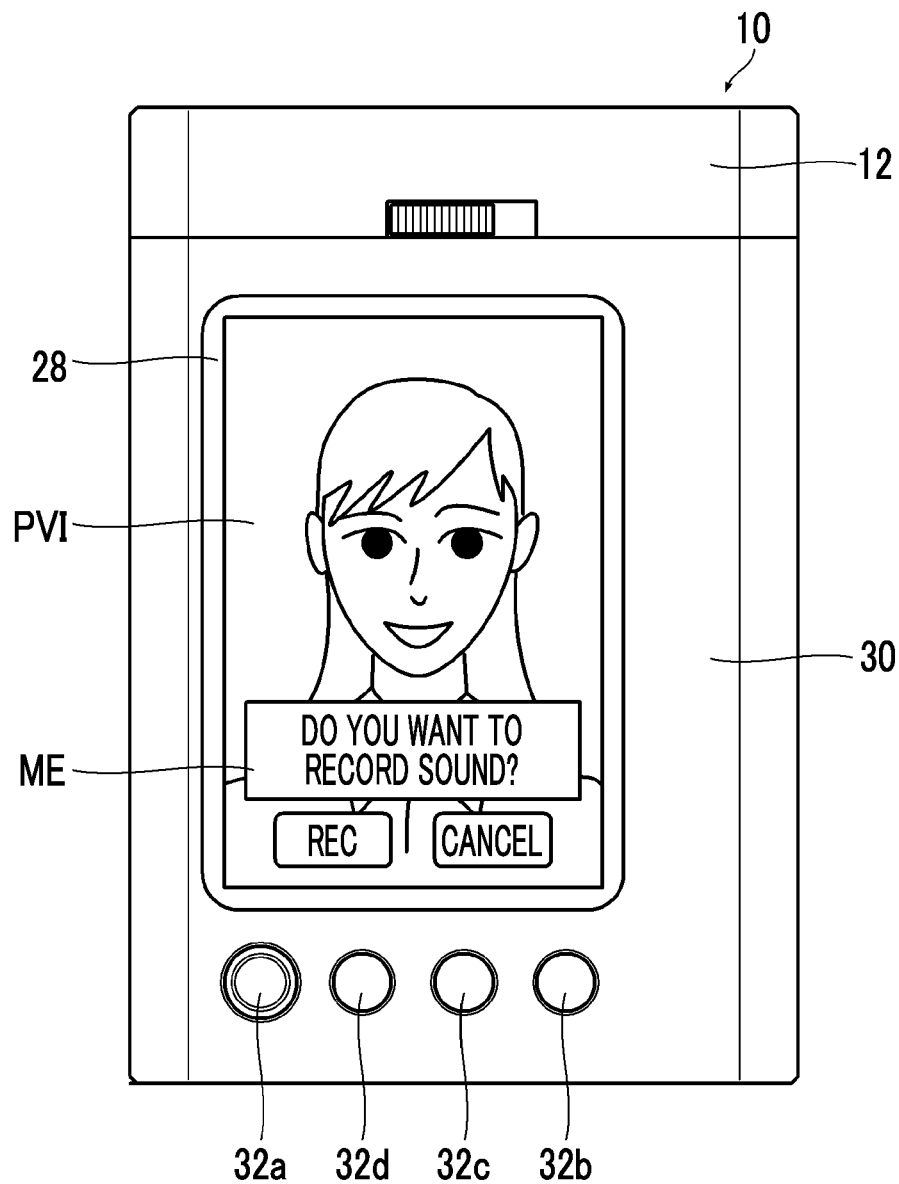
FIG. 21 is a diagram showing an example of a preview screen in the after recording mode.

FIG. 21 is a diagram showing an example of a preview screen in the after recording mode.

As shown in FIG. 21, an image PVI obtained through imaging and a message ME for checking whether or not it is necessary to record sound are displayed on a screen of the display 28. In a case where the sound recording (after recording) is performed, the sound recording button 18 (see FIG. 2) is pressed. In a case where the sound recording is not performed, the cancel button 32d is pressed. It is determined whether or not a sound recording command is issued based on an operation of the user during previewing (step S46).

In a case where a sound recording command is issued, sound recording processing is performed (step S47). That is, sound for a predetermined time (for example, ten seconds) is acquired through the microphone 92. The sound data of the acquired sound is recorded in association with the image data obtained through the imaging in the memory 72 (step S48).

Thereafter, it is determined whether or not the print command is issued (step S49). It is determined whether or not the print command is issued even in a case where the sound recording is canceled in step S46. In a case where the print command is issued, print processing is performed (step S50). The print processing will be described below. Thereafter, it is determined whether or not the mode is ended (step S51). In a case where the mode is ended, the processing is ended.

As stated above, in the after recording mode, the sound for the predetermined time is recorded after the imaging according to the command from the user. The recorded sound data is recorded in association with the image data in the memory 72. The captured image data is printed according to the print command from the user.

<Operation in Auto Print Mode>

As stated above, the auto print mode is a mode in which the captured image is automatically printed after the imaging.

Figure 22:
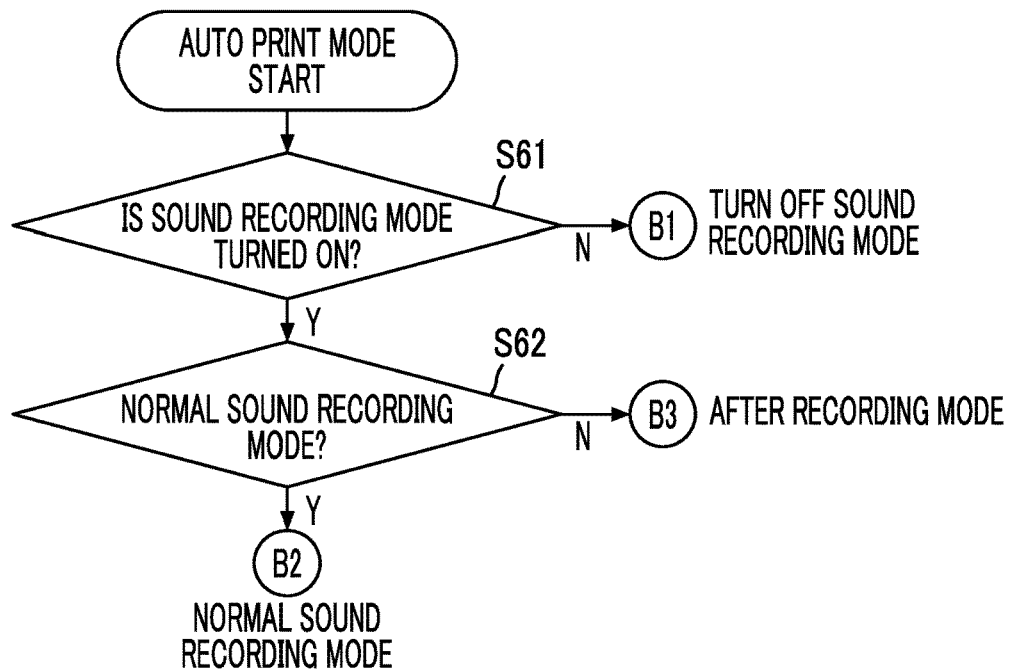
FIG. 22 is a flowchart showing an operation procedure in the auto print mode.

FIG. 22 is a flowchart showing an operation procedure in the auto print mode.

Initially, it is determined whether or not the sound recording mode is turned on (step S61). In a case where the sound recording mode is not turned on, the imaging is performed without performing the sound recording. Meanwhile, in a case where the sound recording mode is turned on, it is determined whether or not the normal sound recording mode is set (step S62). In a case where the normal sound recording mode is set, the imaging is performed in the normal sound recording mode. That is, the sound recording is performed simultaneously with the imaging. Meanwhile, in a case where the normal sound recording mode is not set, the imaging is performed in the after recording mode. That is, the sound is recorded after the imaging.

(1) Case where Sound Recording Mode is Turned Off

Figure 23:
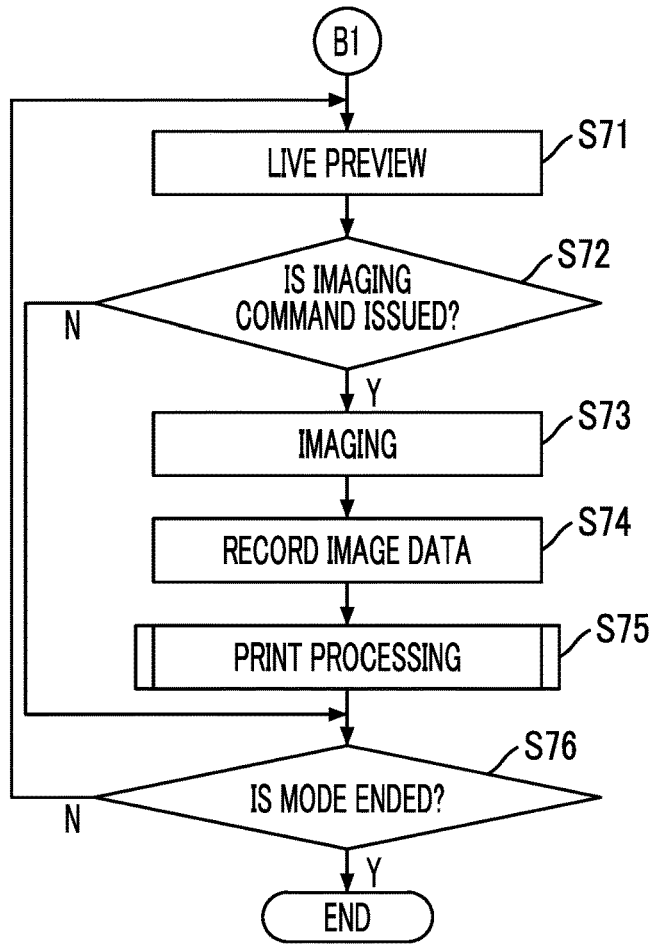
FIG. 23 is a flowchart showing an operation procedure in a case where the sound recording mode is turned off in the auto print mode.

FIG. 23 is a flowchart showing an operation procedure in a case where the sound recording mode is turned off in the auto print mode.

Initially, live preview is displayed on the display 28 (step S71). Thereafter, it is determined whether or not an imaging command is issued (step S72). In a case where the imaging command is issued, the imaging processing is performed (step S73), and the image data obtained through the imaging is recorded in the memory 72 (step S74). The captured image is printed (step S75). The print processing will be described below. Thereafter, it is determined whether or not the mode is ended (step S76). In a case where the mode is ended, the processing is ended.

As stated above, in the auto print mode, the captured image is automatically printed after the imaging.

(2) Case where Normal Sound Recording Mode is Turned on

Figure 24:
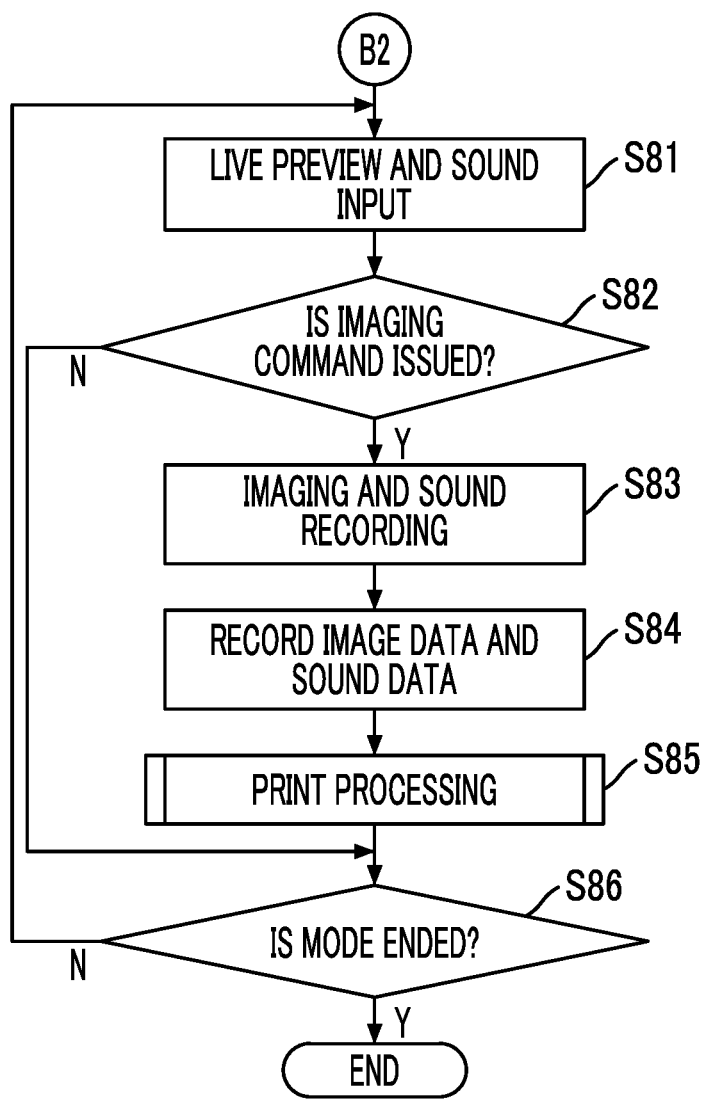
FIG. 24 is a flowchart showing an operation procedure in a case where the normal sound recording mode is turned on in the auto print mode.

FIG. 24 is a flowchart showing an operation procedure in a case where the normal sound recording mode is turned on in the manual print mode.

Initially, live preview is displayed on the display 28. The acquisition of sound from the microphone 92 is started at the same time as the live preview (step S81). The acquired sound is buffered for a predetermined time, and is then removed sequentially. Thereafter, it is determined whether or not an imaging command is issued (step S82). In a case where the imaging command is issued, the imaging processing is performed (step S83), and the image data and the sound data obtained through the imaging is recorded in the memory 72 (step S84). The captured image is printed (step S85). The print processing will be described below. Thereafter, it is determined whether or not the mode is ended (step S86). In a case where the mode is ended, the processing is ended.

As stated above, in the normal sound recording mode, the sound for the predetermined time before and after the imaging is recorded at the same time as the imaging, and the sound and the image are recorded in the memory 72. The captured image is automatically printed after the imaging.

(3) Case where after Recording Mode is Turned on

Figure 25:
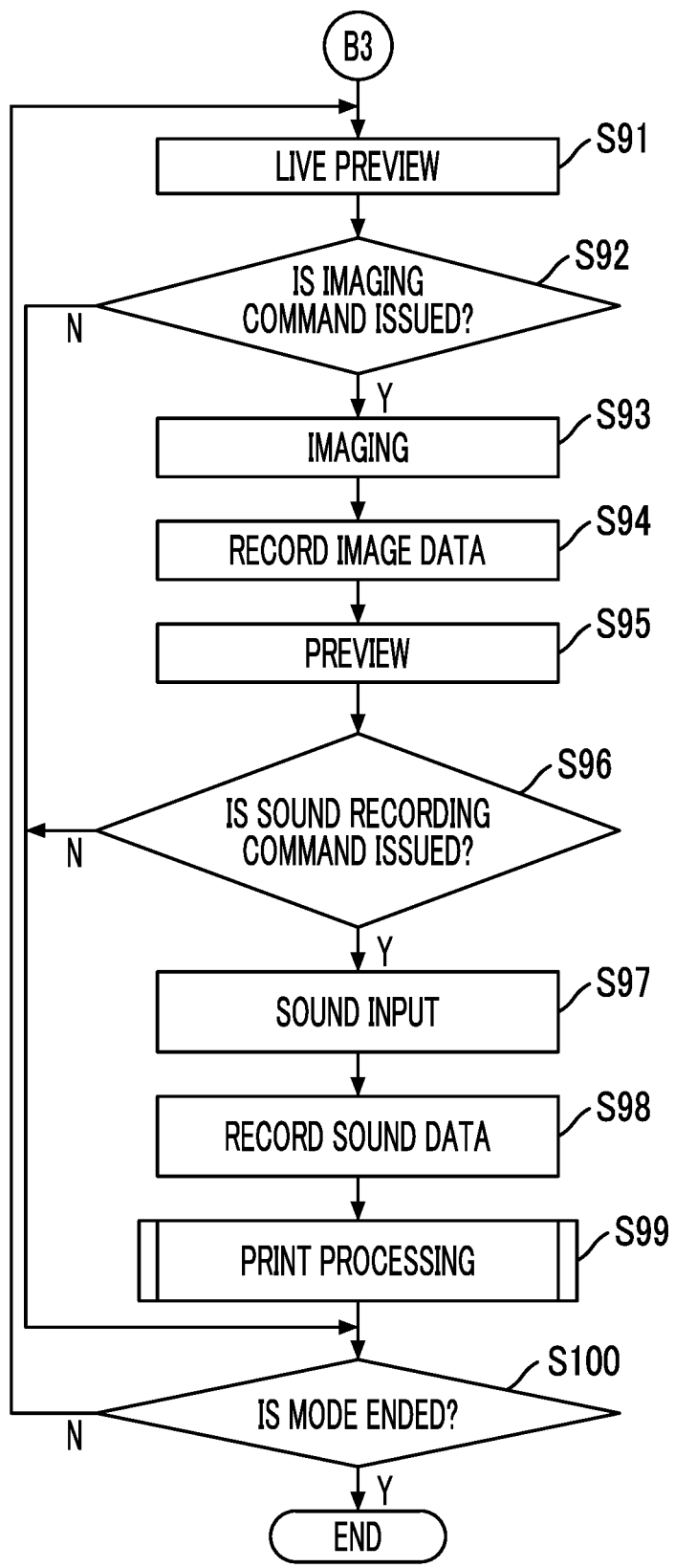
FIG. 25 is a flowchart showing an operation procedure in a case where the after recording mode is turned on in the auto print mode.

FIG. 25 is a flowchart showing an operation procedure in a case where the after recording mode is turned on in the manual print mode.

Initially, live preview is displayed on the display 28 (step S91). Thereafter, it is determined whether or not an imaging command is issued (step S92). In a case where the imaging command is issued, the imaging processing is performed (step S93), and the image data obtained through the imaging is recorded in the memory 72 (step S94). In a case where the imaging is performed, the image data obtained through the imaging is previewed on the display 28 (step S95). As shown in FIG. 21, an image PVI obtained through imaging and a message ME for checking whether or not it is necessary to record sound are displayed on a screen of the display 28. In a case where the sound recording (after recording) is performed, the sound recording button 18 is pressed. In a case where the sound recording is not performed, the cancel button 32d is pressed. It is determined whether or not the sound recording command is issued based on an operation of the user during previewing (step S96).

In a case where a sound recording command is issued, sound recording processing is performed (step S97). That is, sound for a predetermined time (for example, ten seconds) is acquired through the microphone 92. The sound data of the acquired sound is recorded in association with the image data obtained through the imaging in the memory 72 (step S98).

Thereafter, the captured image is printed (step S99). The print processing will be described below. In a case where the sound recording is canceled in step S96, the print processing is performed (step S99).

Thereafter, it is determined whether or not the mode is ended (step S100). In a case where the mode is ended, the processing is ended.

As stated above, in the after recording mode, the sound for the predetermined time is recorded after the imaging according to the command from the user. The recorded sound data is recorded in association with the image data in the memory 72. The captured image data is automatically printed after the imaging.

<Operation in Playback Mode>

Switching from the imaging mode to the playback mode is performed by pressing the playback button 32c. Switching from the playback mode to the imaging mode is performed by pressing the release button 16.

Figure 26:
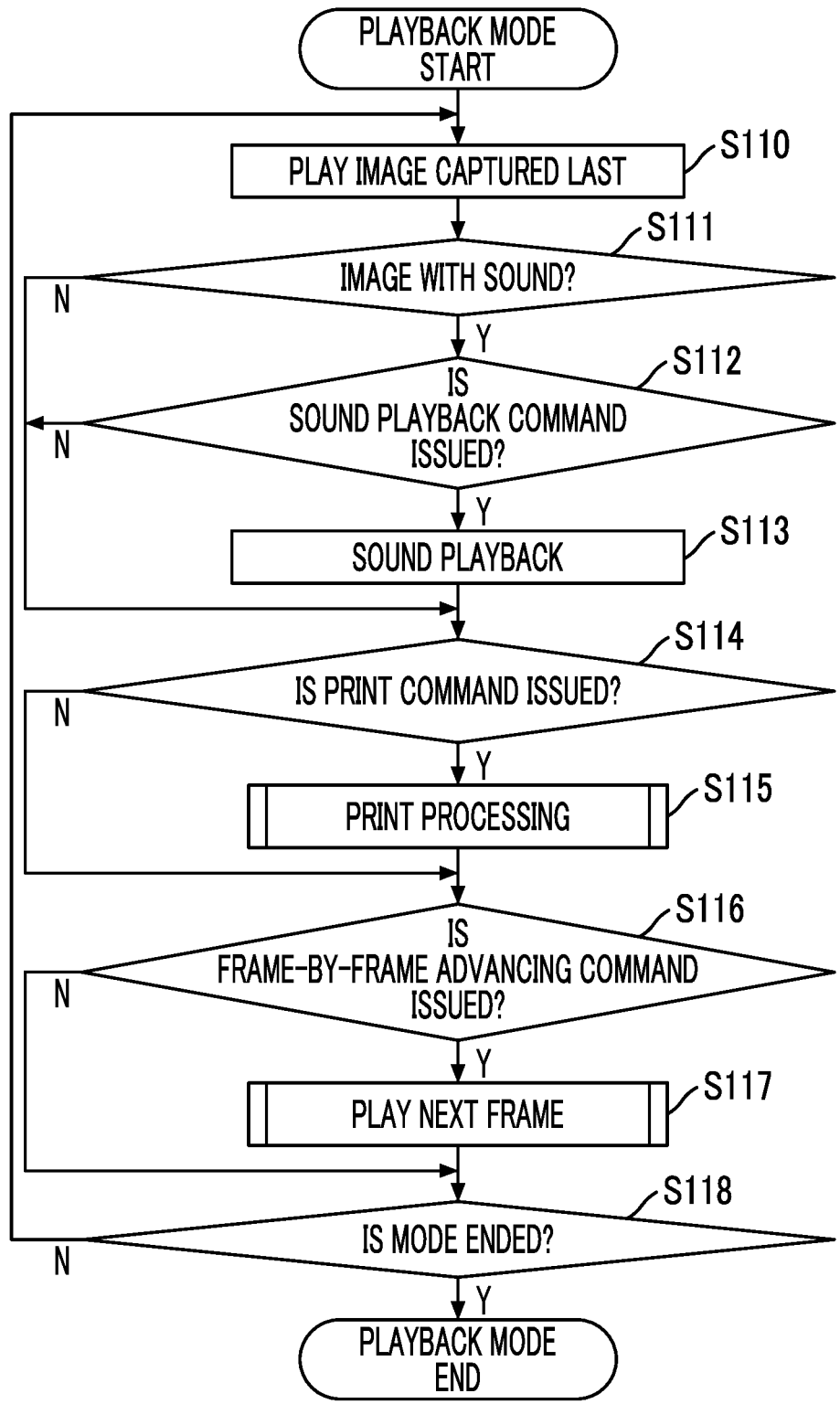
FIG. 26 is a flowchart showing an operation procedure in the playback mode.

FIG. 26 is a flowchart showing an operation procedure in the playback mode.

In a case where the digital camera with a printer is in the playback mode, the image data of the image captured last is read out from the memory 72, and is played and displayed on the display 28 (step S110).

Subsequently, it is determined whether or not the image data being played is the image data with sound (step S111). In a case where the image data being played is the image data with sound, it is determined whether or not a sound playback command is issued (step S112). The sound playback command is issued by pressing the playback button 32c.

Figure 27:
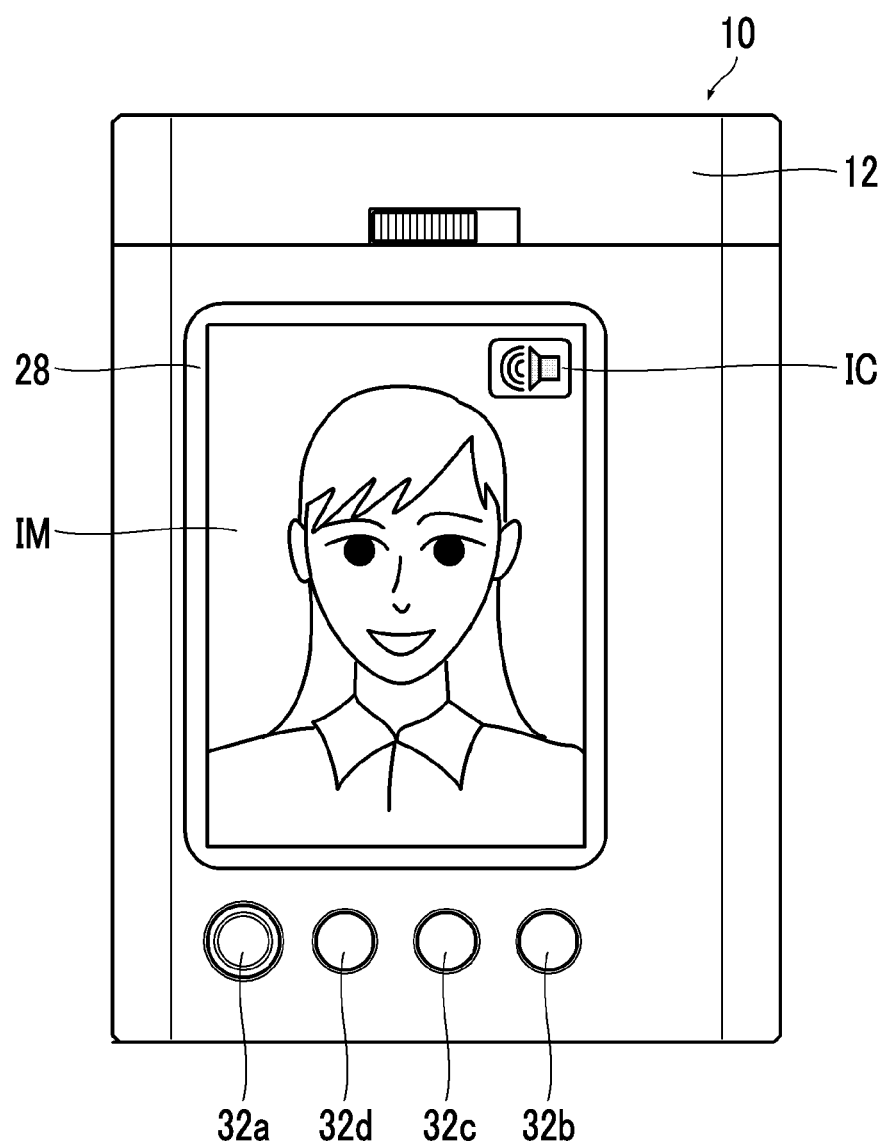
FIG. 27 is a diagram showing an example of display of a display in a case where image data with sound is displayed.

FIG. 27 is a diagram showing an example of display of the display in a case where the image data with sound is displayed.

As shown in FIG. 27, in a case where the image data being displayed is the image data with sound, an icon IC indicating that an image IM being displayed is the image with sound is displayed. Accordingly, the user can recognize that the image IM being displayed is the image with sound.

In a case where the playback button 32c is pressed during the displaying of the image data with sound on the display 28, sound playback processing is performed (step S113). That is, the sound data associated with the image data being played is read out from the memory 72, and is output from the speaker 94. Accordingly, the user can listen the sound associated with the image.

It is determined whether or not a print command is issued during playing (step S114). The print command is issued by pressing the print button 32b. In a case where the print button 32b is pressed, the image being played is printed (step S115). The print processing will be described below.

It is determined whether or not a frame-by-frame advancing command is issued during playing (step S116). A frame-by-frame advancing command is performed by the joystick 32a, and the frame-by-frame advancing is performed in a case where the joystick 32a is operated in a horizontal direction. That is, the next frame is read out from the memory 72, and is played and displayed on the display 28 (step S117). In a case where the joystick 32a is operated in an up-down direction, the image being displayed is zoomed in and zoomed out.

Thereafter, it is determined whether or not the mode is ended (step S118). In a case where the mode is ended, the processing is ended.

As stated above, in the playback mode, the image being played can be printed according to the print command from the user. In a case where the image being played is the image with sound, the sound associated with the image can be played according to the command from the user.

<Operation at the Time of Printing>

Figure 28:
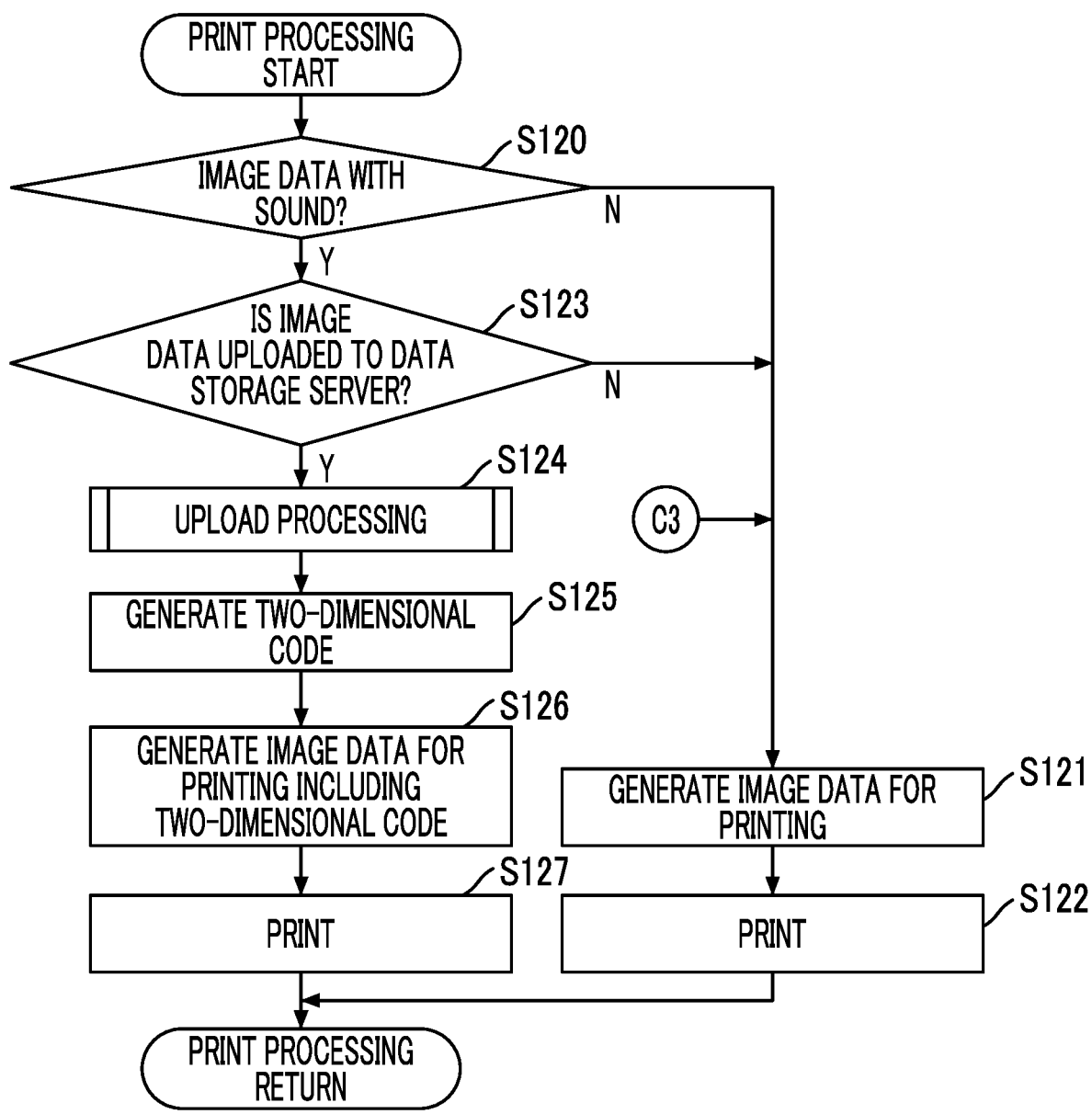
FIG. 28 is a flowchart showing a processing procedure in a case where the image is printed.

FIG. 28 is a flowchart showing a processing procedure at the time of printing the image.

Initially, it is determined whether or not image data as a processing target is the image data with sound (step S120). That is, it is determined whether or not the image data is recorded in association with the sound data.

In a case where the image data is not the image data with sound, the print processing is performed according to a normal procedure. Initially, the image data for printing is generated (step S121). That is, the image data to be printed on the instant film 42 by using the print head 56 is generated.

In the digital camera 10 with a printer of the present embodiment, since the instant film 42 of the mono-sheet type is used, the image obtained by horizontally inverting the image for displaying is generated as the image for printing. Since the instant film 42 is loaded upside down, the vertically inverted image is generated.

The printing is performed after the image data for printing is generated (step S122). Initially, one instant film 42 is delivered from the instant film pack 40. The delivered instant film 42 is transported toward the film discharge port 34 at a predetermined speed. The light is applied from the print head 56 during the transporting, and the image is recorded on the exposure surface. The exposed instant film 42 is developed by passing between the spreading roller pair 54B, and is discharged through the film discharge port 34.

Meanwhile, in a case where image data as a printing target is the image data with sound, it is initially determined whether or not to upload the image data and the sound data to the data storage server 200 (step S123).

In a case where the image data as the printing data is the image data with sound, a message for inquiring about whether or not it is necessary to upload the data to the data storage server 200 is displayed on the display 28. The user determines whether or not it is necessary to upload the data according to the message displayed on the screen. In a case where it is necessary to upload the data, the user presses the OK button 22c, and in a case where it is not necessary to upload the data, the user presses the cancel button 32d. The camera controller 100 determines whether or not it is necessary to upload the data based on the operation of the OK button 22c and the cancel button 32d.

In a case where it is not necessary to upload the data, the print processing is performed according to the normal procedure similarly to the case where the image data without sound is printed (step S121 and S122).

Meanwhile, in a case where the image data to be printed and the sound data associated with the image data are uploaded, upload processing is performed (step S124).

As will be described below, in a case where the data is uploaded, the dimensional code (recording information) obtained by encoding the access information to the uploaded data and the image are printed on the instant film 42. Accordingly, the series of operation systems until an upload command is issued are an example of a recording information print setting unit that sets whether or not to print the recording information.

Figure 29:
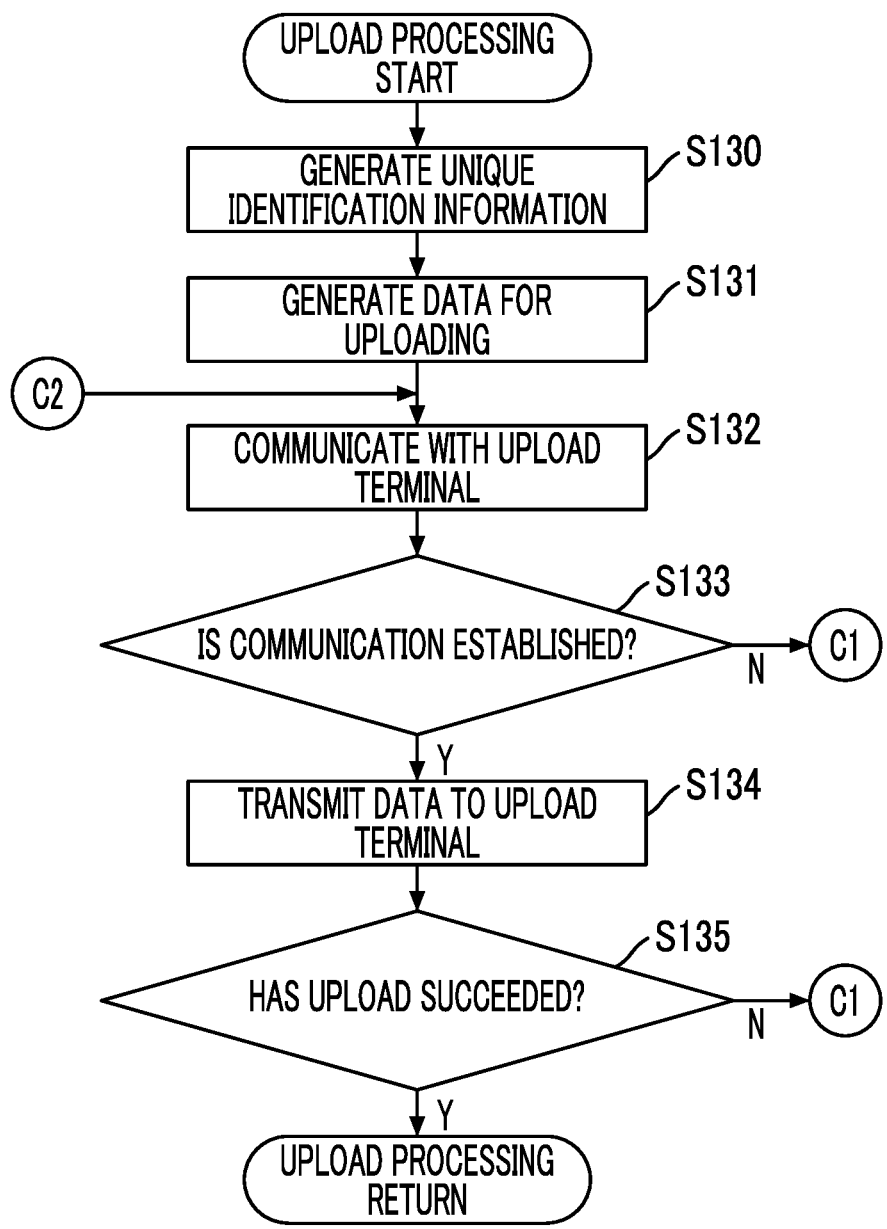
FIG. 29 is a flowchart showing a procedure of upload processing.

FIG. 29 is a flowchart showing a procedure of the upload processing.

Initially, unique identification information is generated (step S130). The identification information is generated in order to distinguish between the uploaded data and other data in a data storage destination. In the system of the present embodiment, information obtained by combining information on a device model of the digital camera 10 with a printer, information on a serial number of the digital camera 10 with a printer, information on the cumulative number of times of the printing is generated as the unique identification information.

In this case, the "information on the device model" is information for specifying the device model of the digital camera 10 with a printer, and corresponds to, for example, a product name and a product code.

The "serial number" is an identification number given to the product, particularly, is a number to which numerals and alphabetic numerals constituting the number are given based on a predetermined rule or system. The serial number is also referred to as a manufacturing number. The serial number is an example of the unique identification number assigned to the digital camera with a printer.

The "cumulative number of times of the printing is the total number of times of the printing performed until a current point of time since the digital camera 10 with a printer is shipped. Accordingly, a case where the digital camera with a printer has not printed yet since the digital camera with a printer is shipped is "0", and a case where the digital camera with a printer has printed by ten times is "10". The camera controller 100 counts the cumulative number of times of the printing, and records the counted cumulative number in the memory 72. The information on the cumulative number of times of the printing is expressed by a prescribed number of digits (for example, five digits).

In the system of the present embodiment, the identification information is generated by arranging the information items on the "device model", the "serial number", the "cumulative number of times of the printing" in this order. For example, in a case where a device model name is "instax_mini_xx", the serial number is "7T00XXX", the cumulative number of times of the printing is "00098", the identification information is "instax_mini_xx7T00XXX00098".

The data for uploading is generated after the identification information is generated (step S131). That is, the data to be uploaded to the data storage server 200 is generated. The data is generated as the data including the identification information. For example, data having a header to which the identification information is added is generated. Alternatively, data having a file name as the identification information is generated. The image data and the sound data may be individually generated as the data for uploading, or may be generated as one file.

Subsequently, the communication with the upload terminal 300 is performed (step S132). It is determined whether or not the communication is established (step S133).

In a case where the communication is established, the data for uploading is transmitted to the upload terminal 300 (step S134). The upload terminal 300 receives the data, and uploads the received data to the data storage server 200.

Thereafter, the camera controller 100 determines whether or not the upload has succeeded based on a transmission result of the data for uploading by the upload terminal 300 (step S135). In a case where the upload has succeeded, the upload processing is ended.

Figure 30:
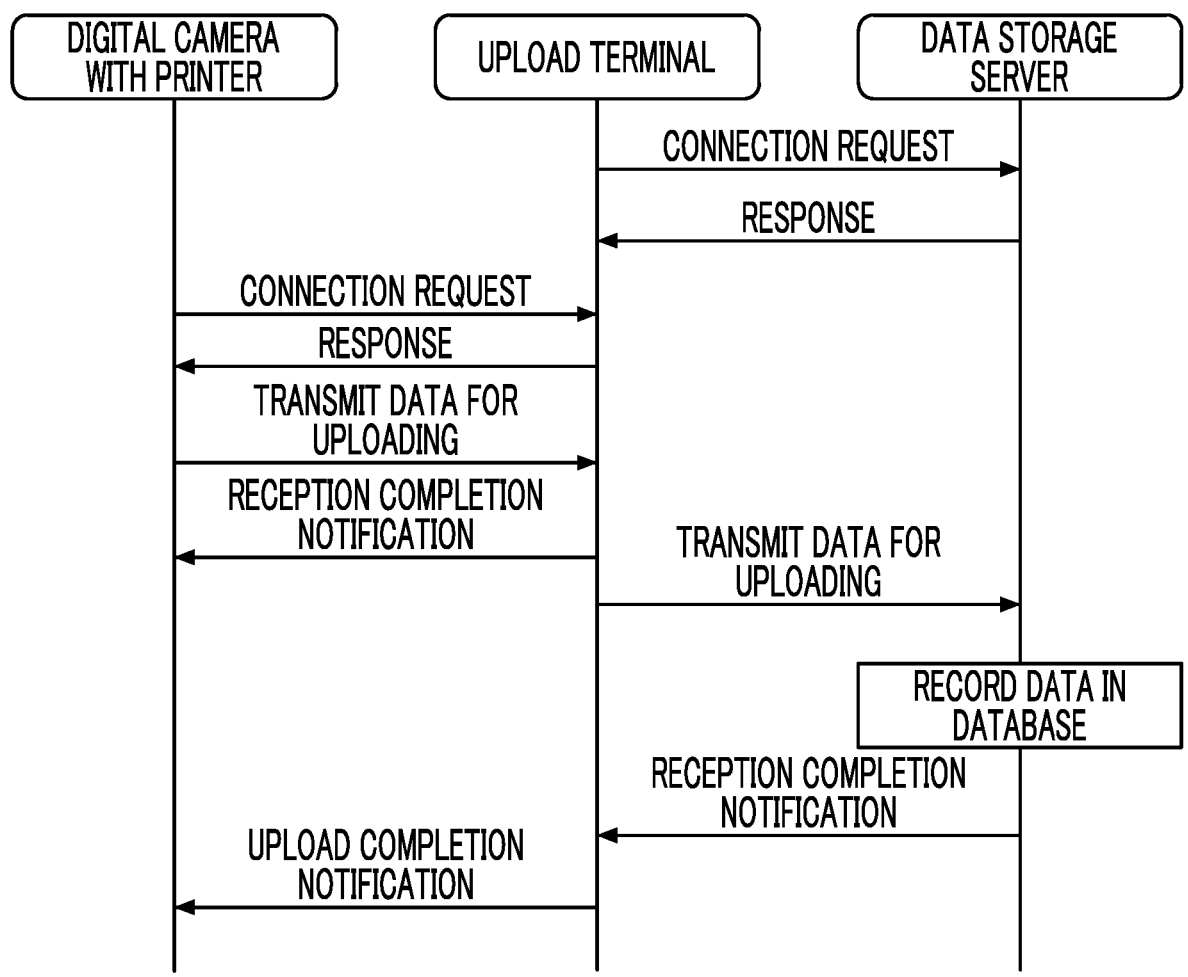
FIG. 30 is a sequence diagram of the upload processing.

FIG. 30 is a sequence diagram of the upload processing.

Initially, the upload terminal 300 transmits a connection request to the data storage server 200. In contrast, the data storage server 200 responds to the connection request, and the communication between the upload terminal 300 and the data storage server 200 is established.

Subsequently, the digital camera with a printer transmits a connection request to the upload terminal 300. In contrast, the upload terminal 300 responds to the connection request, and the communication between the digital camera 10 with a printer and the upload terminal 300 is established.

Subsequently, the data for uploading is transmitted to the upload terminal 300 from the digital camera 10 with a printer. In a case where the data for uploading is received, the upload terminal 300 notifies the digital camera 10 with a printer of reception completion. The received data for uploading is temporarily stored in the memory.

Subsequently, the upload terminal 300 transmits the received data for uploading to the data storage server 200. The data storage server 200 stores the received data. More specifically, the received image data and the sound data associated with the image data are stored in association with each other in the database. At this time, the image data and the sound data are recorded by using the identification information added to the data. Accordingly, the image data and the sound data can be specified.

In a case where the storing of the image data is completed, the data storage server 200 transmits a reception completion notification to the upload terminal 300. In a case where the reception completion notification is received, the upload terminal 300 notifies the digital camera 10 with a printer of upload completion.

Through the series of processing described above, the image data and the sound data are uploaded to the data storage server 200 from the digital camera 10 with a printer.

Figure 31:
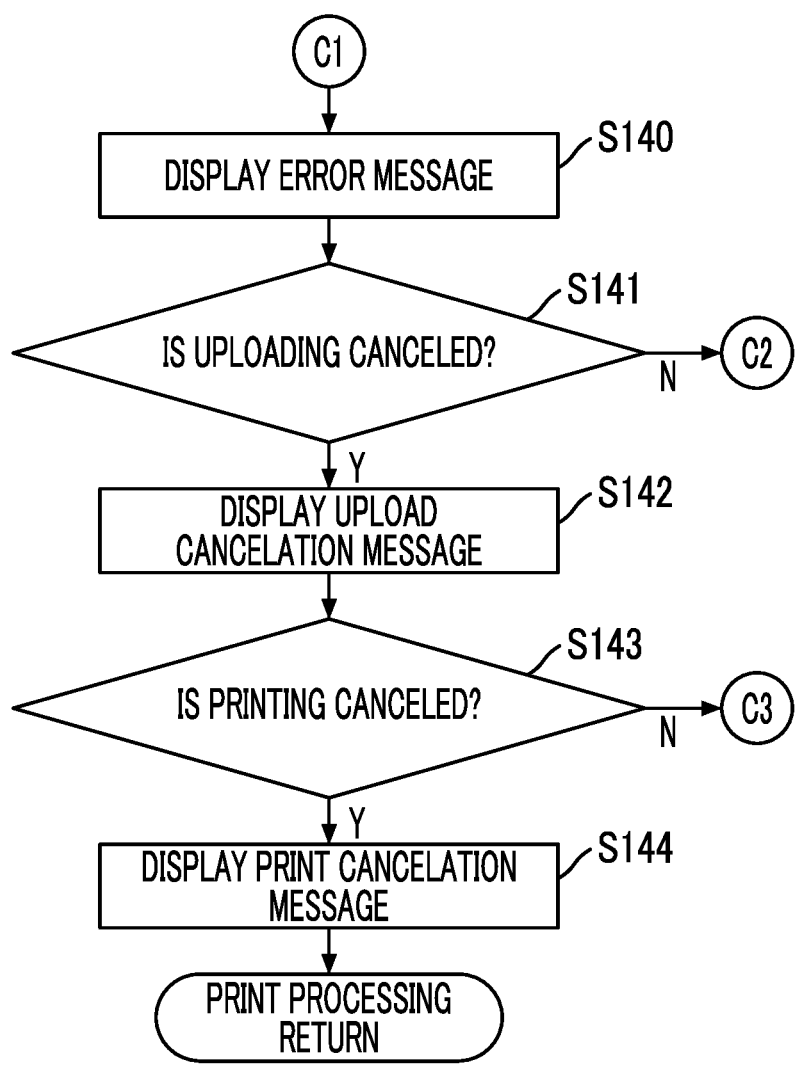
FIG. 31 is a flowchart showing a processing procedure in a case where communication is not enabled or the upload processing has failed.

FIG. 31 is a flowchart showing a processing procedure in a case where the communication is not enabled or the upload processing has failed.

In a case where the communication with the upload terminal 300 is not enabled (in the case of NO in step S133 of FIG. 29), the camera controller 100 of the digital camera 10 with a printer displays a predetermined error message (for example, a "communication error") on the display 28 (step S140). A message for inquiring about whether or not to continue to upload the data (for example, "do you want to continue to upload") is displayed at the same time as the communication error.

The camera controller 100 determines whether or not to cancel the upload processing based on an operation input from the user (step S141). In a case where the user cancels the upload processing, the user presses the cancel button 32*d*, and in a case where the user does not cancel the upload processing, the user presses the OK button 22*c*. In a case where the user does not cancel the upload processing, the processing returns to step S132, and the digital camera attempts to communicate with the upload terminal 300 again (S132 of FIG. 29).

Meanwhile, in a case where the user cancels the upload processing, the camera controller 100 displays an error message of uploading cancelation (for example, "upload is canceled") on the display 28 (step S142). A message for inquiring about whether or not to cancel the printing (for example, "do you want to print image?") is displayed at the same time of the error message of uploading cancelation.

The camera controller 100 determines whether or not to cancel the printing based on an operation input from the user (step S143). In a case where the user cancels the upload processing, the user presses the cancel button 32*d*, and in a case where the user does not cancel the upload processing, the user presses the OK button 22*c*. In a case where the user does not cancel the printing, the print processing is performed. In this case, the print processing is performed according to the normal procedure similarly to the case where the image data without sound is printed. That is, as shown in FIG. 28, the image data for printing is generated (step S121), and the printing is performed based on the generated image data (step S122).

Meanwhile, in a case where the user does not print the image, the message of the print cancelation is displayed on the display 28 (step S144), and the print processing is ended.

Similarly to the case where the upload terminal 300 has failed the upload, the camera controller inquires about whether or not to cancel the upload processing and the print processing, and the processing corresponding to a command from the user is performed.

As stated above, in a case where the communication is not enabled or the upload processing has failed, the camera controller inquires about whether or not to cancel the upload processing and the print processing, and the processing corresponding to a command from the user is performed.

In a case where the image data with sound is printed and the upload processing is completed, the two-dimensional code is generated as shown in FIG. 29 (step S125). The two-dimensional code is obtained by encoding the access information for accessing the uploaded image data and sound data. More specifically, the two-dimensional code is obtained by encoding the information for accessing the image data and the sound data stored in the data storage server 200 over the network, and is obtained by encoding the Universal Resource Locator (URL) of the data. The uploaded image data and sound data are assigned the unique identification information, and are stored in the prescribed data storage server 200 by using the unique identification information. Accordingly, the storage location can be specified in the individual digital camera 10 with a printer. In the camera controller 100 of the digital camera 10 with a printer, a certain URL which is the access information is generated based on the identification information assigned to the uploaded image data and sound data and information on the storage location (information on the data storage server 200), and the generated URL is encoded as the two-dimensional code. In the present embodiment, a QR code (registered trademark) is generated as the two-dimensional code.

In a case where the two-dimensional code is generated, the image data for printing is generated (step S126). The two-dimensional code is included in the image data for printing.

Figure 32:
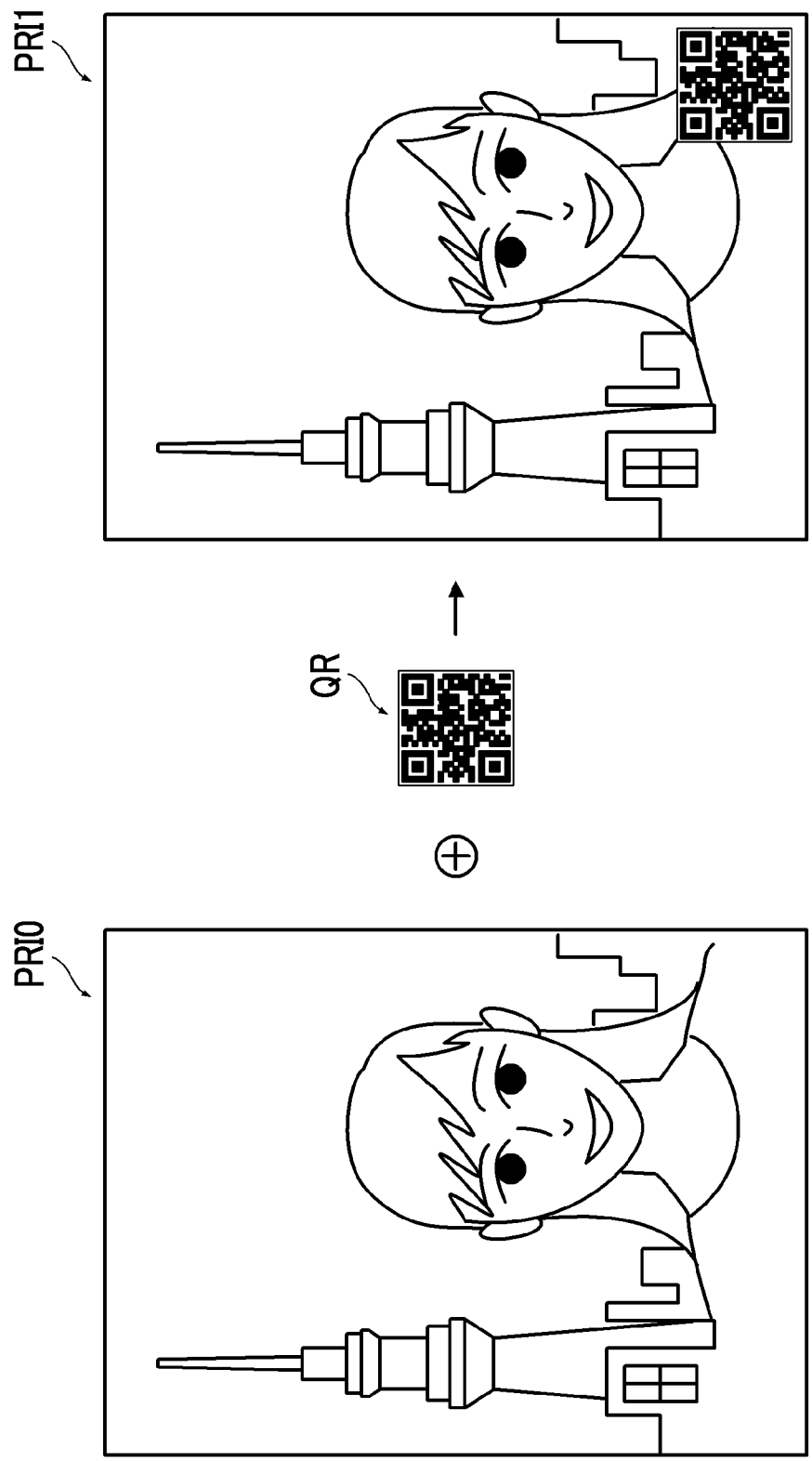
FIG. 32 is a conceptual diagram of generation of image data for printing in a case where the image data with sound is printed.

FIG. 32 is a conceptual diagram of the generation of the image data for printing in a case where the image data with sound is printed.

As shown in FIG. 32, image data PRI1 for printing is generated by combining a two-dimensional code QR with an image PRI0 to be printed. The two-dimensional code QR is combined so as to be overlapped with a part of the image PRI0 to be printed. That is, the two-dimensional code is overlaid with a part of the image. Accordingly, a portion of the image PRI0 to be printed with which the two-dimensional code QR is overlaid cannot be viewed. The two-dimensional code QR is combined at a position determined in advance. In the present embodiment, the two-dimensional code is combined in a lower right corner of the image PRI0 to be printed.

In the digital camera 10 with a printer of the present embodiment, since the instant film 42 of the mono-sheet type is used, the processing for horizontally inverting the image is performed. In the digital camera 10 with a printer of the present embodiment, since the instant film 42 is loaded upside down, the processing for vertically inverting the image is performed.

The printing is performed after the image data for printing is generated (step S127). That is, the instant film 42 is delivered from the instant film pack 40, the light is applied from the print head 56 during the transporting, and the image is recorded on the exposure surface of the instant film 42. The exposed instant film 42 is developed by passing between the spreading roller pair 54B, and is then discharged through the film discharge port 34.

Figure 33:
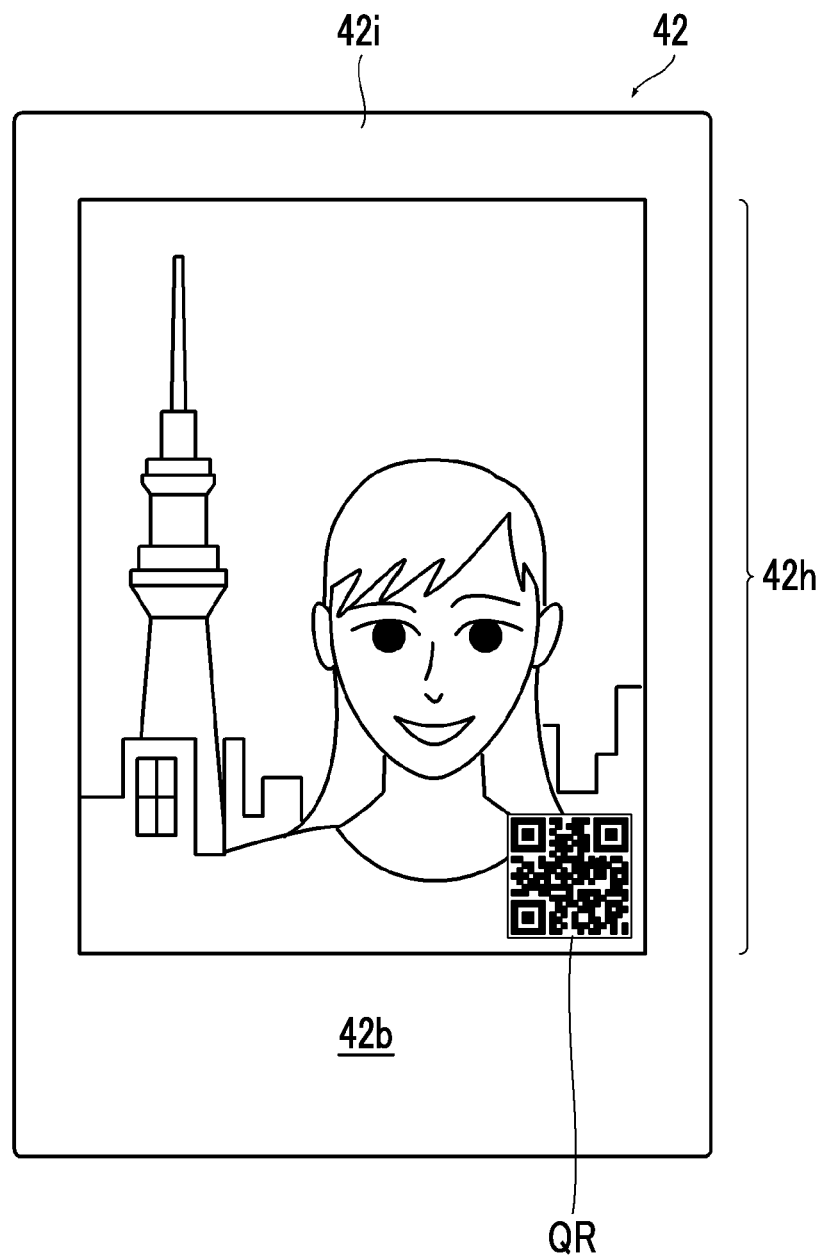
FIG. 33 is a diagram showing an example of a printing result of the image data with sound.

FIG. 33 is a diagram showing an example of a printing result of the image data with sound.

As shown in FIG. 33, the image and the two-dimensional code QR are printed on the instant film 42 which is a printout. As stated above, the image is displayed on the observation surface 42b on the opposite side of the exposure surface, and is displayed on the observation region 42h inside the frame 42i. Since the observation region 42h is slightly narrower than the exposure region, the substantially trimmed image is displayed.

The two-dimensional code QR printed on the instant film 42 is read by the data playback terminal 400, and thus, the image printed on the instant film 42 and the sound associated with the image can be viewed on the data playback terminal 400.

<<Operation of Data Playback Terminal>>

As stated above, the image and the two-dimensional code QR printed on the instant film 42 are read by the data playback terminal 400, and thus, the image printed on the instant film 42 and the sound associated with the image can be played on the data playback terminal 400. The data playback terminal 400 obtains the access information to the image data and the sound data from the two-dimensional code QR, accesses the storage location of the data based on the obtained access information, and downloads and plays the data.

Figure 34:
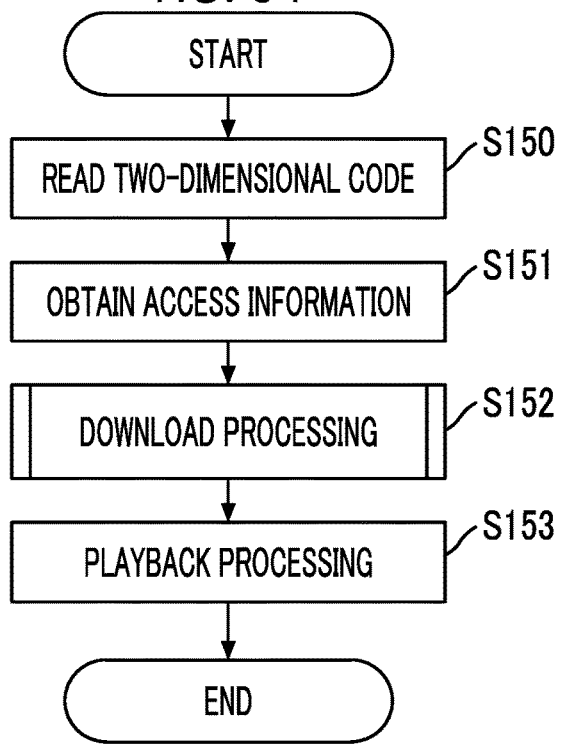
FIG. 34 is a flowchart showing a procedure of processing for downloading and playing the image data and the sound data.

FIG. 34 is a flowchart showing a procedure of processing for downloading and playing the image data and the sound data.

The user who obtains the instant film 42 with the two-dimensional code reads the two-dimensional code QR printed on the instant film 42 on the data playback terminal 400 (step S150).

The data playback terminal 400 obtains the access information from the read two-dimensional code QR (step S151). That is, the data playback terminal obtains the information (URL) for accessing the image data of the image printed on the instant film 42 and the sound data associated with the image data. The data playback terminal accesses the storage location of the data based on the obtained access information, and downloads the data (step S152).

Figure 35:
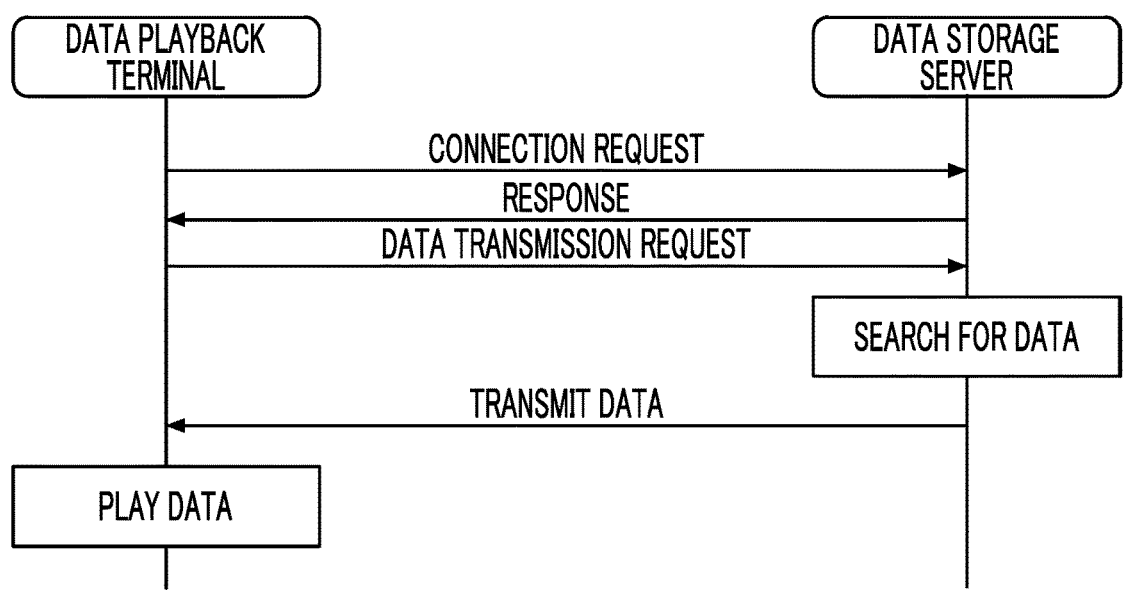
FIG. 35 is a sequence diagram of download processing.

FIG. 35 is a sequence diagram of download processing.

The data playback terminal 400 transmits a connection request to the data storage server 200. In contrast, the data storage server 200 responds to the connection request, and the communication between the data playback terminal 400 and the data storage server 200 is established.

Subsequently, the data playback terminal 400 requests the data storage server 200 to transmit the data. That is, the data playback terminal requests the data storage server to transmit the image data of the image printed on the instant film 42 and the sound data associated with the image data. The data storage server 200 responds to the request, searches for the data from the database, and reads outs the data. The data storage server transmits the readout data to the data playback terminal 400. The data playback terminal 400 receives the data transmitted from the data storage server 200. Thus, the download processing is completed.

The data playback terminal 400 plays the image data and the sound data downloaded from the data storage server 200 (step S153). Specifically, the downloaded image data is displayed on a display 405. The downloaded sound data is output from a speaker unit 410.

FIG. 36 is a diagram showing comparison of the image printed on the instant film with the image played on the data playback terminal.

As shown in FIG. 36, the two-dimensional code QR is displayed so as to be overlapped with the image printed on the instant film 42. Meanwhile, the image without the two-dimensional code is displayed on the display 405 of the data playback terminal 400. Accordingly, it is possible to browse a complete image. As stated above, the image of which the peripheral portion is trimmed is printed on the instant film 42, but the original image of which the peripheral portion is not trimmed is displayed on the display 405. Accordingly, it is possible to view a portion that cannot be printed can on the instant film 42.

In general, since the smartphone has a function of enlarging the image, it is possible to check the details of the image by using the enlarging function. Accordingly, it is possible to improve convenience of viewing the image.

In a case where the user enlarges the image being displayed, the user performs a pinch-out operation on the screen of the display 405. The pinch-out operation is an operation for widening a distance between two fingers while touching the screen with the two fingers. In a case where the user reduces the image being displayed, the user performs a pinch-in operation on the screen of the display 405. The pinch-in operation is an operation for narrowing a distance between two fingers while touching the screen with the two fingers. The data playback terminal 400 enlarges or reduces the image being played based on a screen operation by the user, and displays the enlarged or reduced image.

The image and a sound playback button VPB are displayed on the display 405 of the data playback terminal 400. The user can repeatedly play the sound by touching the sound playback button VPB. The data playback terminal 400 performs play processing of the sound data based on a screen operation by the user.

As stated above, the data playback terminal 400 can play the image printed on the instant film 42 and the sound associated with the image by reading the two-dimensional code QR printed on the instant film 42.

[Modification Examples]

<<Modification Example of Digital Camera with Printer>>

<Printing Method>

Although it has been described in the aforementioned embodiment that the image is printed on the instant film, the printing method performed by the digital camera 10 with a printer is not particularly limited. For example, the image may be printed by a thermosensitive method by using thermosensitive paper or an ink ribbon. In addition, the image may be printed by an inkjet method.

<Recording of Sound>

Although it has been described in the aforementioned embodiment that the image data with sound is generated by obtaining the sound data at the time of imaging and recording the sound data in association with the image data obtained through the imaging, the method of generating the image data with sound is not limited thereto. For example, the image data with sound may be generated by inputting sound at any timing after the imaging and recording the sound in association with any image data.

Figure 37:
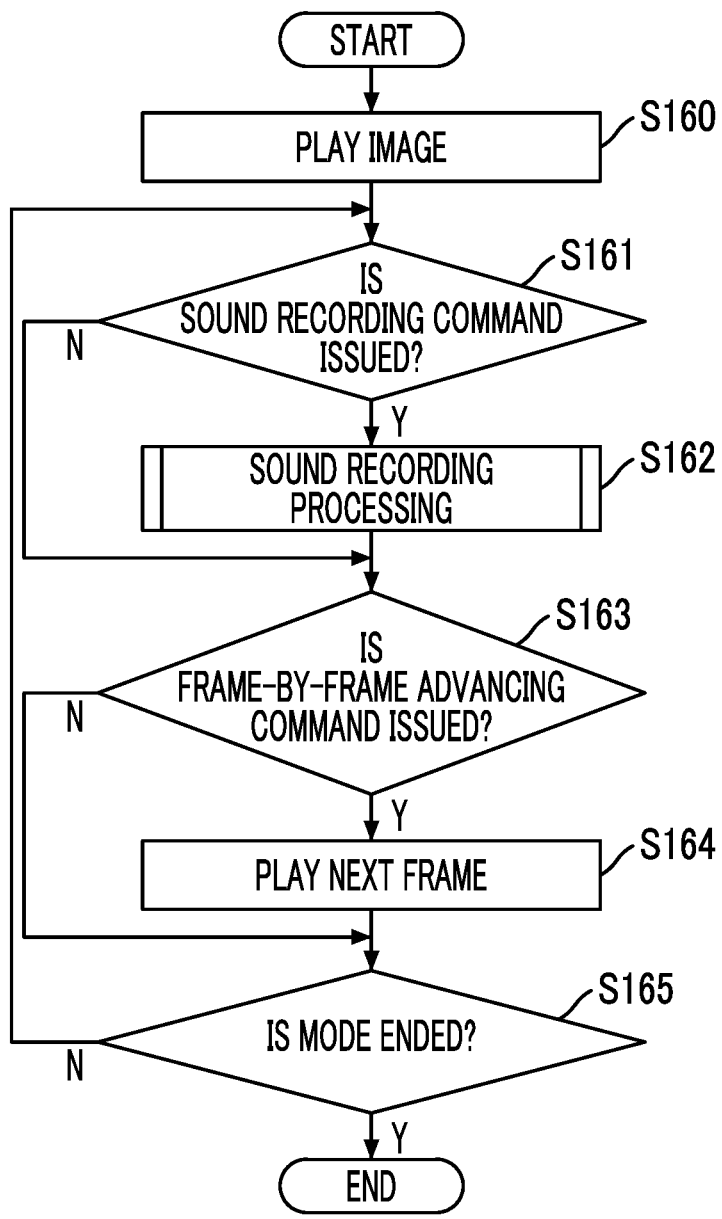
FIG. 37 is a flowchart showing a processing procedure in a case where the image data with sound is generated after the imaging in the digital camera with a printer.

FIG. 37 is a flowchart showing a processing procedure in a case where the image data with sound is generated after the imaging in the digital camera with a printer.

The present processing is performed in the playback mode. That is, the captured image is played in the playback mode, any image is selected, and the sound is input. The input of the sound is performed according to the sound recording command. The sound recording command is issued by pressing the sound recording button 18. The sound recording button 18 is an example of an after recording instructing unit.

Initially, the captured image is played (step S160). That is, one image (for example, the image captured last) recorded in the memory 72 is read out, and is displayed on the display 28. The camera controller 100 determines whether or not the sound recording command is issued based on operation information of the sound recording button 18 during the playing of the image (step S161).

In a case where the sound recording for the image being played is instructed, the camera controller 100 performs the sound recording processing (step S162).

Figure 38:
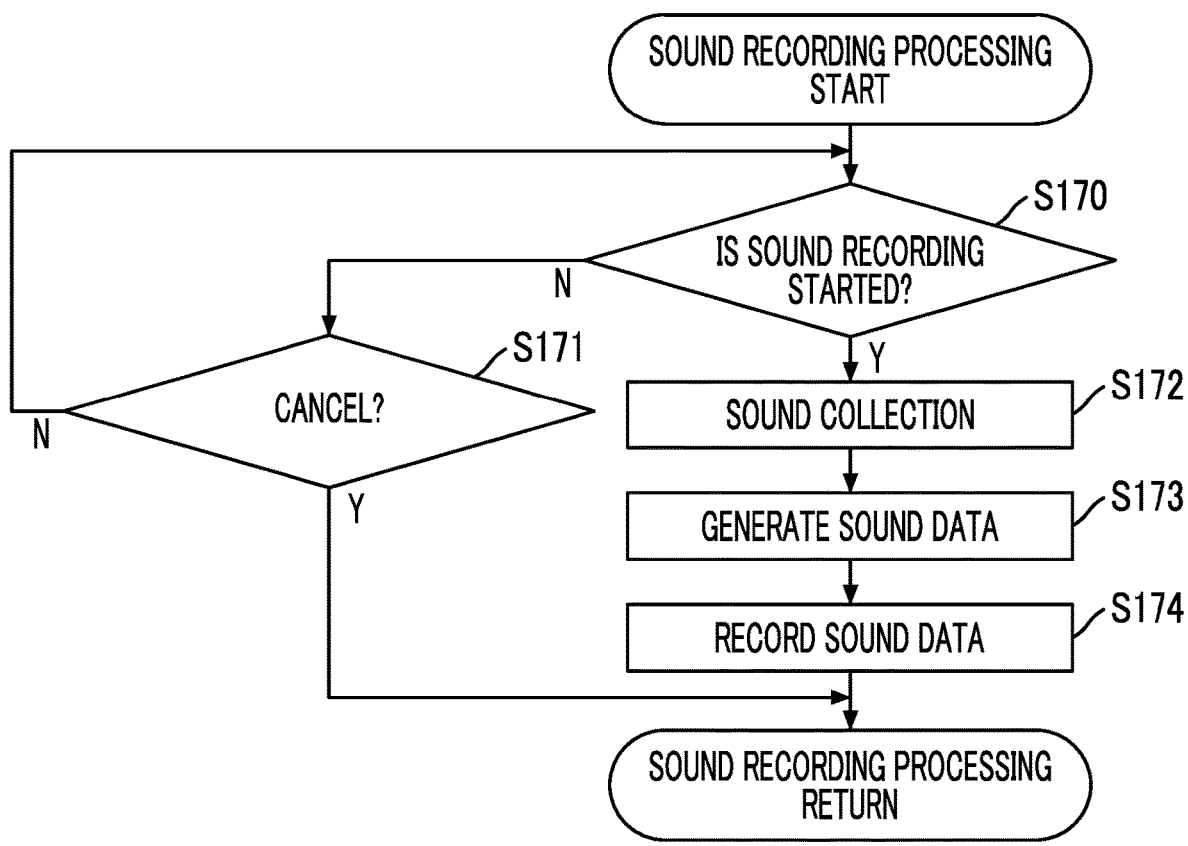
FIG. 38 is a flowchart showing a procedure of sound recording processing.

FIG. 38 is a flowchart showing a procedure of the sound recording processing.

The camera controller 100 determines whether or not a command to start the sound recording is issued based on an operation input from the user (step S170). For example, the command to start the sound recording is issued by pressing the sound recording button 18. In a case where the cancel button 32*d* is pressed, the sound recording processing is canceled. In a case where the command to start the sound recording is not issued, the camera controller 100 determines whether or not a cancel command is issued (step S171). In a case where the cancel command is issued, the sound recording processing is ended.

In a case where the sound recording button 18 is pressed and the sound recording command is issued, the sound for the predetermined time is collected through the microphone 92 (step S172). For example, the sound for ten seconds is collected. The sound data is generated from the collected sound (step S173), and the generated sound data is recorded in association with the image data of the image being played in the memory 72 (step S174).

The sound recording processing is ended through the aforementioned steps. Thereafter, as shown in FIG. 37, it is determined whether or not a frame-by-frame advancing command is issued (step S163). In a case where the frame-by-frame advancing command is issued, the next frame is read out from the memory 72, and is played and displayed on the display 28 (step S164). It is determined whether or not the playback mode is ended (step S165), and the processing is ended in a case where the playback mode is ended.

As stated above, it is preferable that the sound data can be freely added later. Accordingly, it is possible to improve convenience.

Although the sound for the predetermined time before and after the imaging is recorded in the normal sound recording mode, in a case where the sound is automatically recorded in conjunction with the imaging, the timing of the sound recording is not limited to the example of the aforementioned embodiment. The sound for the predetermined time after the imaging may be recorded, or sound for a predetermined time before the imaging may be recorded. In a case where the sound for a predetermined time before and after the imaging with the imaging timing interposed therebetween is recorded, a sound recording time before the imaging and a sound recording time after the imaging may be different. The timing of the sound recording may be optionally set by the user. Similarly, the sound recording time may be optionally set by the user. For example, the setting can be performed by calling a recording setting item from the menu screen.

<Rewriting of Sound Data>

It is preferable that the sound data associated with the image data is rewritten.

Figure 39:
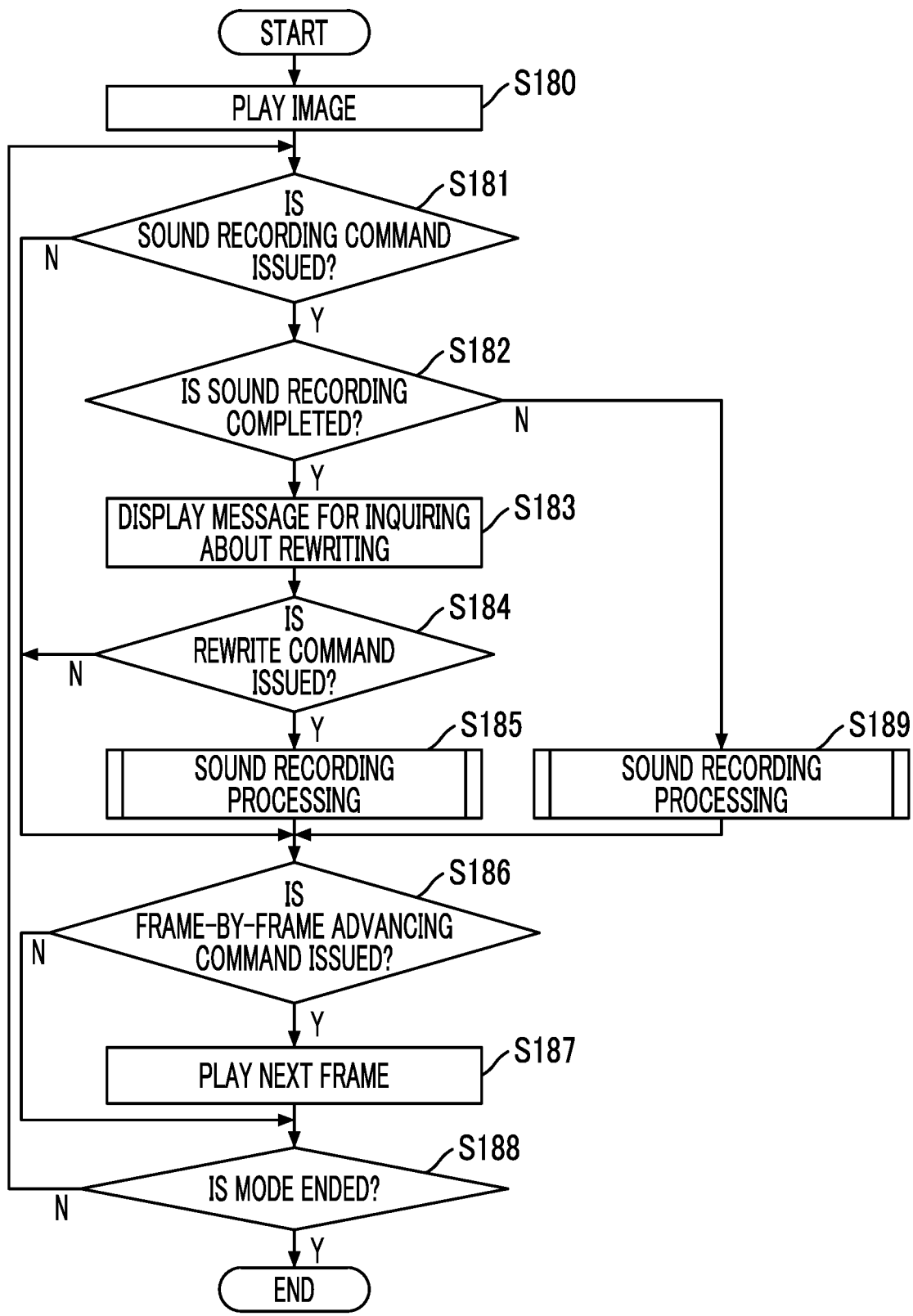
FIG. 39 is a flowchart showing a processing procedure in a case where the sound data is rewritten in the digital camera with a printer.

FIG. 39 is a flowchart showing a processing procedure in a case where the sound data is rewritten in the digital camera with a printer.

The present processing is performed in the playback mode. Initially, the captured image is played (step S180). That is, one image (for example, the image captured last) recorded in the memory 72 is read out, and is displayed on the display 28. The camera controller 100 determines whether or not the sound recording command is issued based on the operation information of the sound recording button 18 during the playing of the image (step S181). In a case where the sound recording command for the image being played is issued, the camera controller 100 determines whether or not the sound recording for the image is completed (step s182). That is, it is determined whether or not the image data for which the sound recording command is issued is the image data with sound.

In a case the image data for which the sound recording command is issued is not the image data with sound, the sound recording processing is performed according to the procedure shown in FIG. 38 (step S189).

Meanwhile, in a case where the image data for which the sound recording command is issued is the image data with sound, a message indicating that the sound recording for the image is completed (for example, "sound has been recorded") and a message for inquiring about rewriting (for example, "do you want to rewrite sound?") are displayed on the display 28 (step S183).

The user instructs the canceling of the rewriting of the sound or the sound recording based on the display of the display 28. A rewrite command is issued by pressing the OK button 22*c*. The canceling of the sound recording is performed by pressing the cancel button 32*d*. The series of operation systems until the rewrite command is issued is an example of a sound data rewrite instructing unit.

The camera controller 100 determines whether or not a command to rewrite the sound data is issued based on an operation input from the user (step S184). In a case where the rewrite command is issued, the camera controller 100 performs the sound recording processing (step S185).

Figure 40:
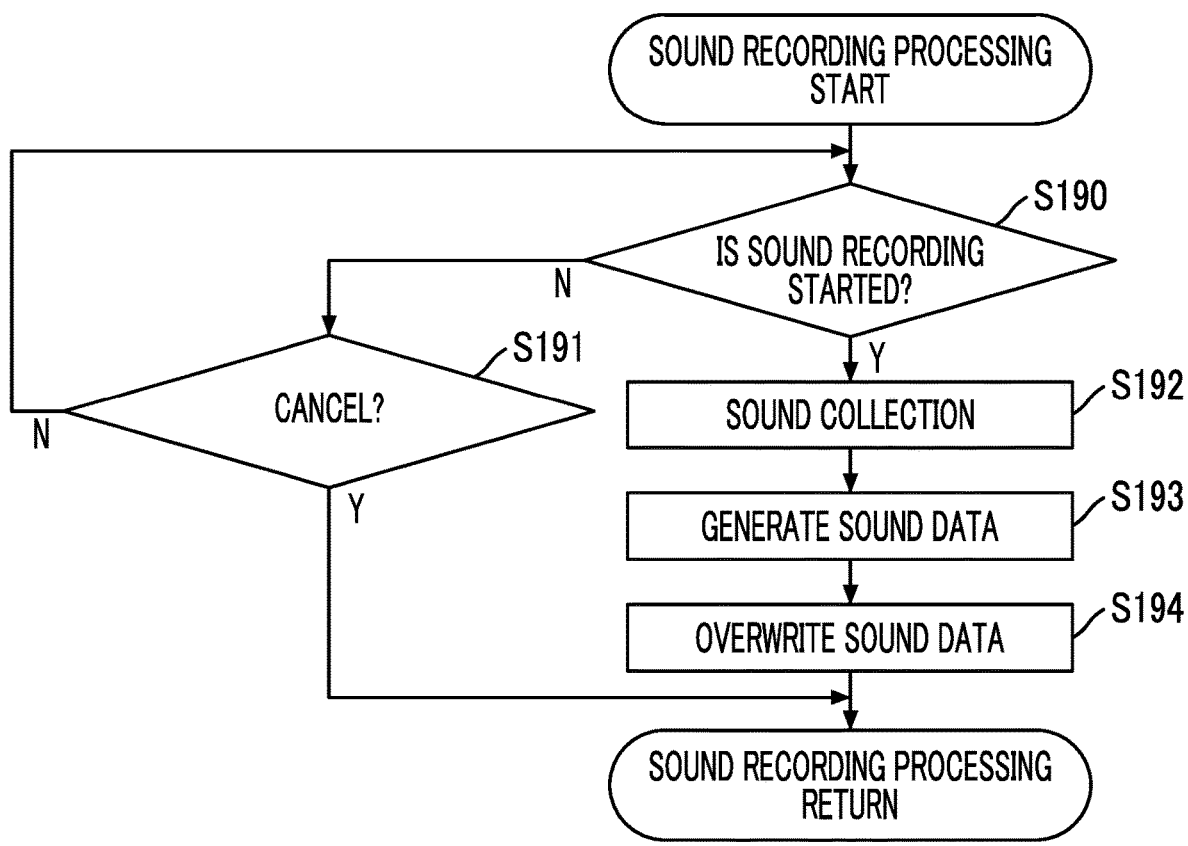
FIG. 40 is a flowchart showing a procedure of the sound recording processing in a case where the sound data is rewritten.

FIG. 40 is a flowchart showing a procedure of the sound recording processing in a case where the sound data is rewritten.

The camera controller 100 determines whether or not the command to start the sound recording is issued based on an operation input from the user (step S190). For example, the command to start the sound recording is issued by pressing the sound recording button 18. In a case where the cancel button 32*d* is pressed, the sound recording processing is canceled. In a case where it is determined that the command to start the sound recording is not issued, the camera controller 100 determines whether or not the cancel command is issued (step S191). In a case where the cancel command is issued, the sound recording processing is ended.

In a case where the sound recording button 18 is pressed and the sound recording command is issued, the sound for the predetermined time is collected through the microphone 92 (step S192). For example, the sound for ten seconds is collected. The sound data is generated from the collected sound (step S193), and the generated sound data is overwritten and recorded (step S194). That is, the sound data recorded in association with the image data being played is rewritten with the newly generated sound data.

The rewriting processing of the sound data is ended through the aforementioned steps. Thereafter, as shown in FIG. 39, it is determined whether or not a frame-by-frame advancing command is issued (step S186). In a case where the frame-by-frame advancing command is issued, the next frame is read out from the memory 72, and is played and displayed on the display 28 (step S187). It is determined whether or not the playback mode is ended (step S188), and the processing is ended in a case where the playback mode is ended.

As stated above, it is preferable that the sound data associated with the image data is optionally rewritten in the digital camera with a printer. Accordingly, it is possible to improve convenience.

<Recording Formats of Image Data and Sound Data>

As the image data and the sound data associated with each other, the other data may be specified by using one data. The method of associating the image data with the sound data is not particularly limited. For example, a management file may be prepared, and the association of the image data with the sound data may be managed by using the file. The information of the associated data may be recorded in the header portion, and the associated data may be specified.

In a case where the data is uploaded, the identification information or the information such as the two-dimensional code may be added to the uploaded data, and the uploaded data may be recorded.

Figure 41:
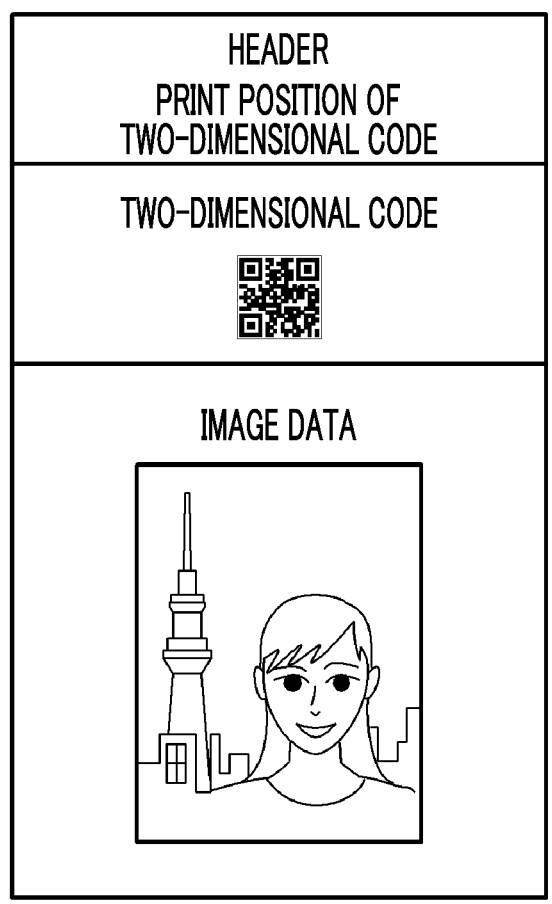
FIG. 41 is a diagram showing an example of a file structure of the image data in a case where the data is uploaded.

FIG. 41 is a diagram showing an example of a file structure of the image data in a case where the data is uploaded.

As shown in FIG. 41, in a case where the data is uploaded, the information such as the two-dimensional code generated at the time of uploading is added to the file of the image data. Information on a position at which the two-dimensional code is printed is recorded in the header. Accordingly, it is possible to easily print the image to which the two-dimensional code is added at the time of printing the image again.

The sound data may be added to the file of the image data. Accordingly, it is possible to manage the image data and the sound data by using one file.

The file structure is the file structure of the data recorded in the memory 72, but may be adopted as a file structure of the data to be uploaded. That is, one file may be generated by adding the information on the two-dimensional code, information on a position at which the two-dimensional code is printed, and the identification information to the image data, and the file may be uploaded. The sound data may be added to the file, and the file may be uploaded.

<Identification Information>

Although it has been described in the aforementioned embodiment that the information obtained by combining the information on the device model of the digital camera with a printer, the information on the serial number of the digital camera with a printer, and the information on the cumulative number of times of the printing is generated as the identification information, the information generated as the identification information is not limited thereto. Any information may be used as long as the information can uniquely identify the data uploaded to the server.

It is possible to uniquely specify the individually uploaded data by adding at least the information on the device model of the digital camera with a printer, the information on the serial number of the digital camera with a printer, and the information on the cumulative number of times of the printing to the identification information in the system that stores image data items and sound data items captured by a plurality of cameras with a printer of which device models are different.

It is possible to uniquely specify the uploaded data by adding at least the information on the serial number of the digital camera with a printer, and the information on the cumulative number of times of the printing to the identification information in a system that stores image data items and sound data items captured by a plurality of digital cameras with a printer of which the device models are the same.

It is possible to uniquely specify the uploaded data by adding at least the information on the cumulative number of times of the printing to the identification information in a system that stores image data items and sound data items captured by the same digital camera with a printer of which the device models are the same.

<Recording Information>

Although it has been described in the aforementioned embodiment that the two-dimensional code is used as the recording information, a form such as a barcode or a radio tag read by known reading means can be used as the recording information.

Although it has been described in the aforementioned embodiment that only the access information is recorded in the recording information, another information may be added to the recording information. For example, in a case where the digital camera with a printer has a function of converting sound into text, the sound recorded at the time of imaging may be converted into the text, the text data may be added, and the recording information may be generated.

<Upload>

In a case where the image data is uploaded, the image data in which the two-dimensional code (recording information) is displayed may be uploaded. That is, the same image data as the printed image may be uploaded.

Although it has been described in the aforementioned embodiment that the upload is canceled in a case where the digital camera 10 with a printer cannot communicate with the upload terminal 300, the data for uploading may be temporarily stored in the memory 72, and may be automatically uploaded at the time when the communication is established later. In this case, it is preferable that the user can select automatic upload. The upload terminal 300 may automatically upload the data similarly to the case the uploading has failed. For example, processing for uploading the data again after a predetermined time has elapsed is performed.

<Printing of Recording Information>

Although it has been described in the aforementioned embodiment that the two-dimensional code (recording information) is overlapped with a part of the image, the printing form of the recording information is not limited thereto. The image and the recording information may be exclusively printed such that the image and the recording information are not overlapped with each other.

Figure 42:
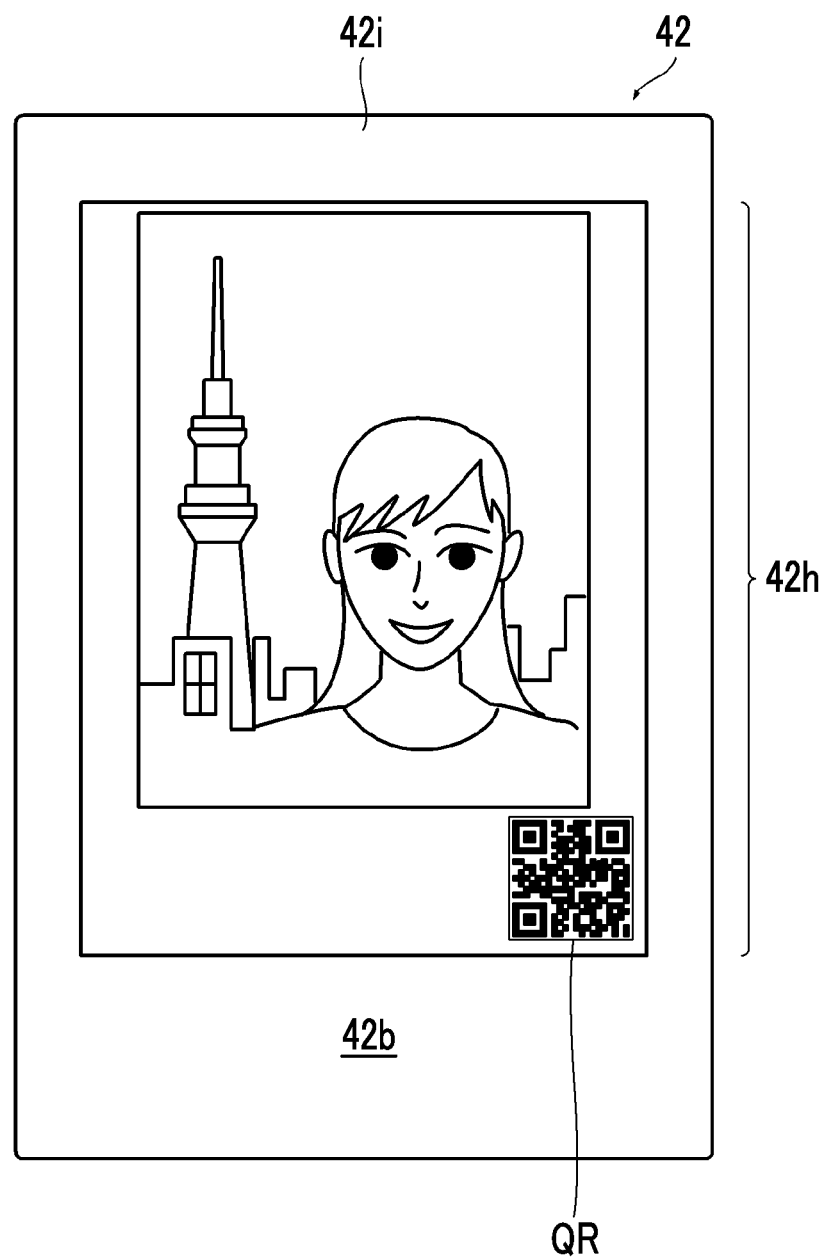
FIG. 42 is a diagram showing another example of the printing in a case where the two-dimensional code is printed.

FIG. 42 is a diagram showing an example in a case where the image and the two-dimensional code are exclusively printed.

In the example shown in FIG. 42, the image is reduced and printed in the observation region 42h, and the two-dimensional code QR is printed in a margin region formed through the reducing. Accordingly, the two-dimensional code QR and the image can be printed so as not to be overlapped with each other.

In a case where the two-dimensional code (recording information) is printed so as to be overlapped with a part of the image as in the aforementioned embodiment, it is preferable that the position at which the two-dimensional code is printed can be select by the user. For example, the user may select one from a plurality of print candidate positions prepared in advance at the time of printing. For example, four positions such as a lower right corner, an upper right corner, an upper left corner, and a lower left corner may be prepared as the print candidate positions. The user may select any one, and may print the two-dimensional code at the selected position. It is preferable that the image to be printed is displayed on the display 28 and the position at which the two-dimensional code is printed can be adjusted.

Figure 43:
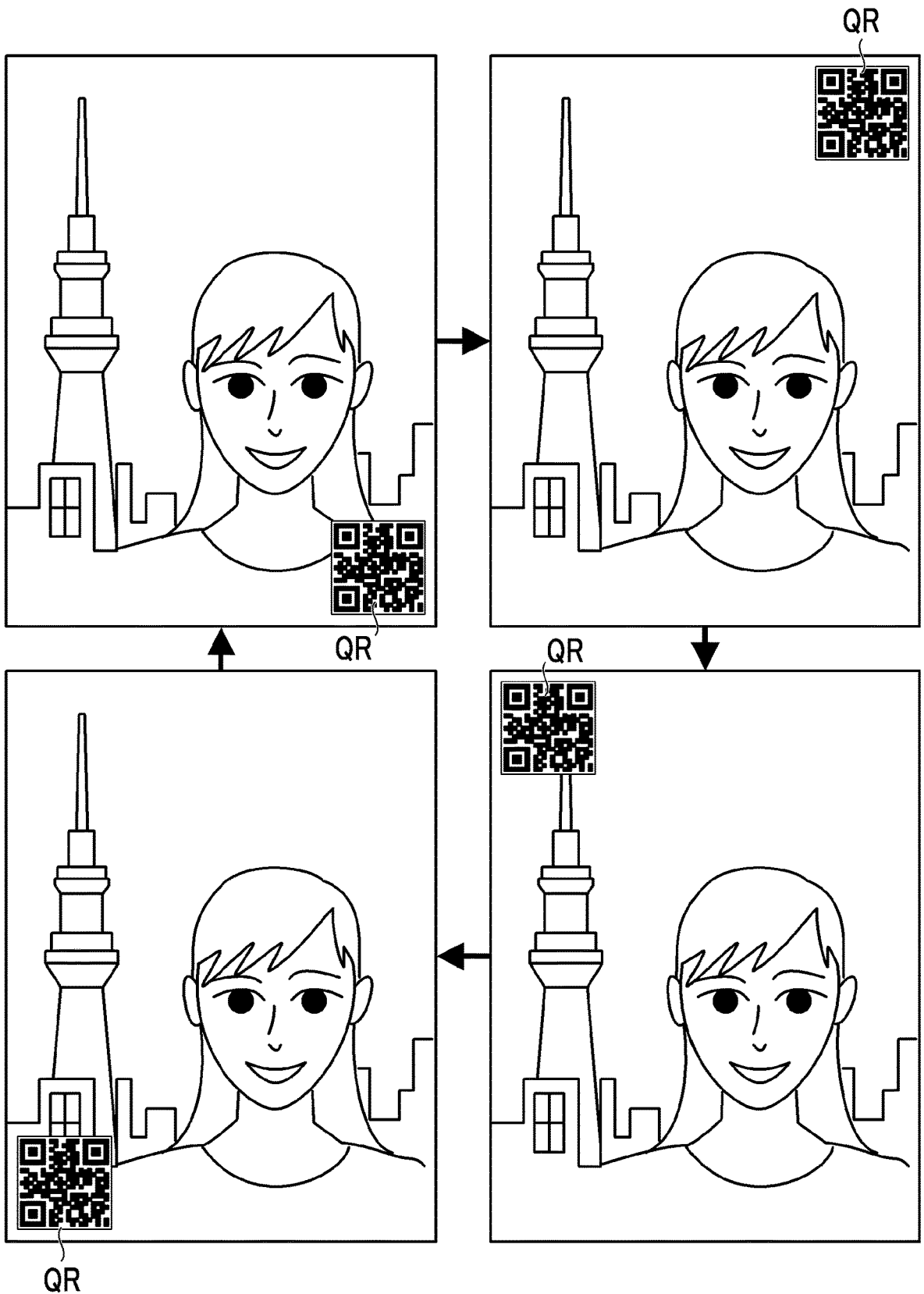
FIG. 43 is a transition diagram of print images to be displayed on the display of the digital camera with a printer.

FIG. 43 is a transition diagram of print images to be displayed on the display of the digital camera with a printer.

In the example shown in FIG. 43, a case where the positions at which the two-dimensional code QR is printed are sequentially switched the lower right corner, the upper right corner, the upper left corner, and the lower left corner of the image in this order is shown. For example, the switching is performed by an operation of the joystick 32a, and the position at which the two-dimensional code is printed is determined by pressing the OK button 22c. Accordingly, it is possible to check the print image in advance.

<<Data Storage Server>>

Although it has been described that the data storage server 200 is connected to the upload terminal 300 and the data playback terminal 400 via the communication network 2, the form of the communication network 2 is not limited thereto. For example, a local area network (LAN) may be used. The communication may be a wired manner.

<<Upload Terminal>>

It is preferable that the upload terminal is a portable computer such as a smartphone, but may be a stationary type computer as long as the computer has the communication function.

Although it has been described in the aforementioned embodiment that the data for uploading is generated by the digital camera with a printer, the data for printing may be generated by the upload terminal.

The data to be uploaded may also be stored in the upload terminal. Accordingly, in the upload terminal, it is possible to browse and view the uploaded image and sound even though the user does not access the data storage server.

Although it has been described in the system of the aforementioned embodiment that the image data and the sound data are uploaded through the upload terminal 300 at the time of uploading the image data and the sound data to the data storage server 200 from the digital camera 10 with a printer, the image data and the sound data may be directly uploaded to the data storage server 200 from the digital camera 10 with a printer. In this case, the digital camera 10 with a printer has the communication function through the communication network 2.

It is possible to simplify the configuration of the digital camera 10 with a printer by uploading the data through the upload terminal 300 as in the system of the aforementioned embodiment. That is, since the digital camera 10 with a printer needs to have only the function of the short-range wireless communication, it is possible to simplify the function for communication.

<<Data Playback Terminal>>
<Apparatus Configuration>

It is preferable that the data playback terminal is the portable computer such as the smartphone, the data playback terminal may be a stationary-type computer as long as the data playback terminal has the communication function and the function of reading the two-dimensional code (recording information).

<Rewriting of Sound Data Using Data Playback Terminal>

The sound data stored in the data storage server may be rewritten by an operation from the data playback terminal.

Figure 44:
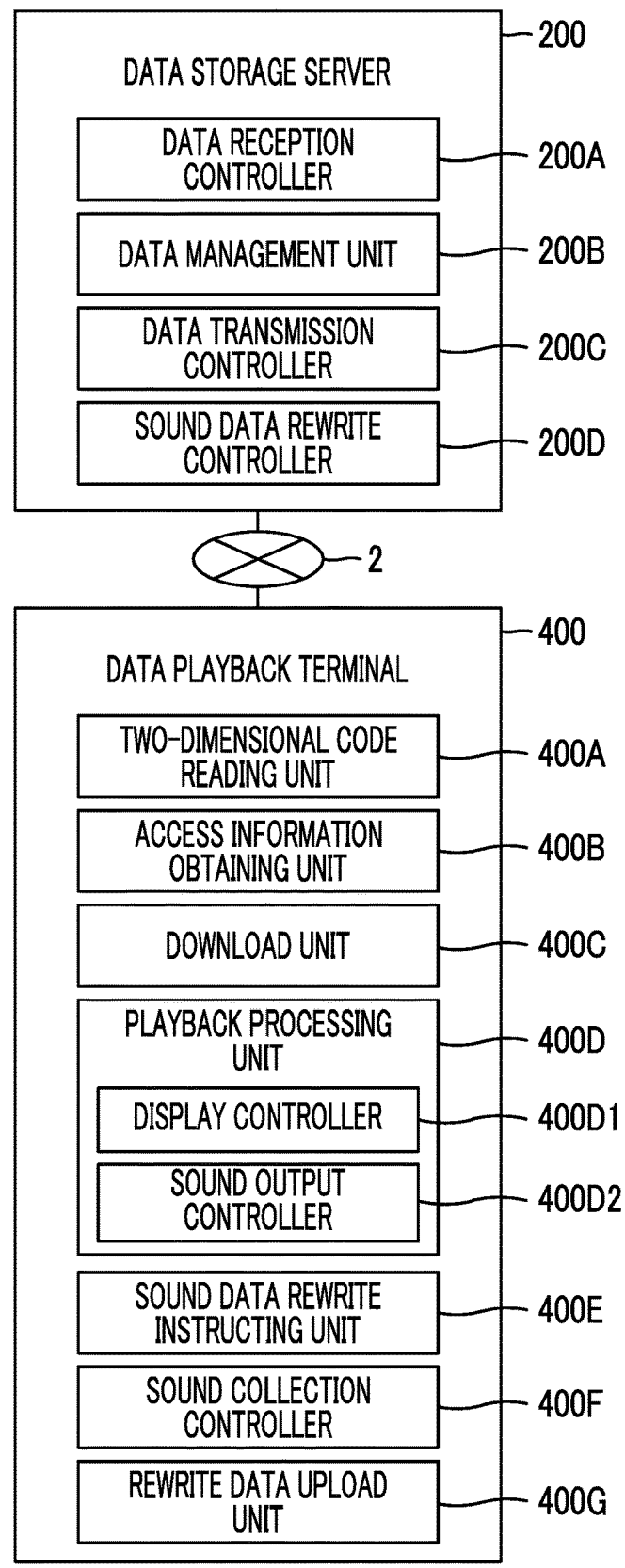
FIG. 44 is a system configuration diagram showing an example of a system that enables the rewriting of the sound data stored in the data storage server.

FIG. 44 is a system configuration diagram showing an example of a system that enables the rewriting of the sound data stored in the data storage server.

As shown in FIG. 44, the data playback terminal 400 further has functions of a sound data rewrite instructing unit 400E that instructs the rewriting of the sound data for the image data played and displayed on the display 405 which is the display unit, a sound collection controller 400F that obtains sound data for rewriting according to the command to rewrite the sound data, and a rewrite data upload unit 400G that uploads the sound data for rewriting to the data storage server 200. The functions are realized by the CPU 401 of the data playback terminal 400 executing a predetermined control program.

For example, the sound data rewrite instructing unit 400E displays the image and a button for instructing the rewriting of the sound data on the display 405, detects a touch operation for this button, and receives the command to rewrite the sound data. In addition, the sound data rewrite instructing unit 400E receives the command to rewrite the sound data from a predetermined menu screen.

The sound collection controller 400F controls the microphone unit 409 which is a sound collection unit to obtain the sound data for rewriting. A time for which the sound data for rewriting is obtained is a predetermined time (for example, ten seconds) predetermined in advance.

The rewrite data upload unit 400G adds the information on the image data for which the rewriting of the sound data is instructed, and uploads the sound data for rewriting to the data storage server 200.

Meanwhile, in a case where the sound data for rewriting is received from the data playback terminal 400, the data storage server 200 further has a function of a sound data rewrite controller 200D that rewrites target data with the received data. The functions are realized by the CPU 201 of the data storage server 200 executing a predetermined control program.

Figure 45:
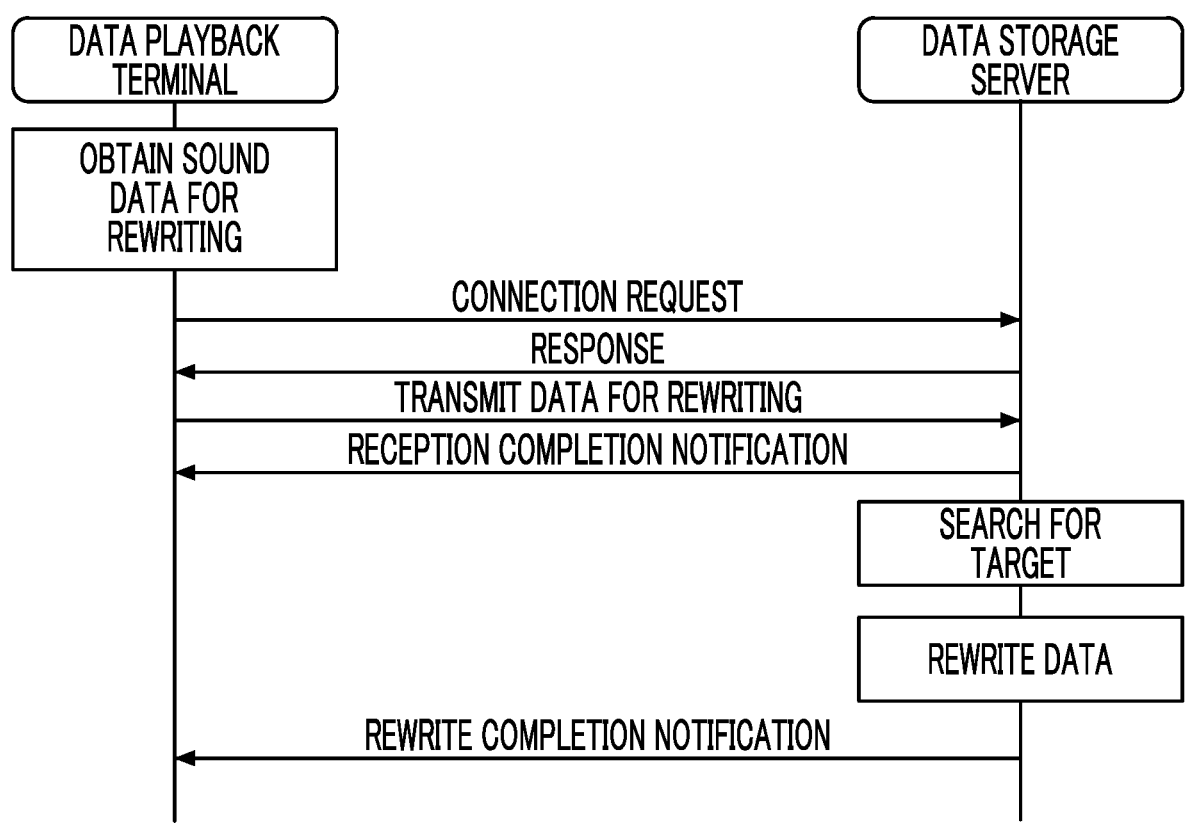
FIG. 45 is a sequence diagram showing a procedure for rewriting the sound data.

FIG. 45 is a sequence diagram showing a procedure for rewriting the sound data.

Initially, the sound data for rewriting is obtained in the data playback terminal 400. Subsequently, the data playback terminal 400 transmits a connection request to the data storage server 200. In contrast, the data storage server 200 responds to the connection request, and the communication between the data playback terminal 400 and the data storage server 200 is established.

Subsequently, the sound data for rewriting is uploaded to the data storage server 200 from the data playback terminal 400. In a case where the reception of the data has succeeded, the reception completion is notified to the data playback terminal 400 from the data storage server 200.

In a case where the sound data for rewriting is received, the data storage server 200 searches for the image data as the rewriting target. The sound data associated with the searched image data is rewritten with the received sound data for rewriting. In a case where the rewriting is completed, the rewriting completion is notified to the data playback terminal 400.

The rewriting of the sound data is completed through the series of steps. Thereafter, the newly rewritten sound data is downloaded, and is played.

<Play Processing of Image Data>

The image data (the image data having no recording information) in which the two-dimensional code is not displayed on the image is uploaded in the system of the aforementioned embodiment. In this case, in the data playback terminal 400, the image having no two-dimensional code is played.

The image to be uploaded to the data storage server 200 may be the image data including the two-dimensional code (recording information) in the image. In this case, the image data is downloaded, and the image and the two-dimensional code are displayed in a case where the downloaded image data is played. At the time of playing the image data on the data playback terminal 400, the display of the two-dimensional code may be a hindrance to viewing. Accordingly, in a case where the image data including the two-dimensional code in the image is played, the data playback terminal 400 plays the image while masking the portion of the two-dimensional code. For example, in a case where the two-dimensional code is overlaid, the data playback terminal may mask the portion of the two-dimensional code in white so as not to display the two-dimensional code. For example, as shown in FIG. 42, in a case where the two-dimensional code QR is displayed in a white portion, only the image region may be trimmed and played.

<Other Embodiments>

Although it has been described in the aforementioned embodiments that the digital camera with a printer is used, the printer constituting the system according to the embodiment of the present invention may be a printer which does not include an imaging unit and a sound collection unit. In this case, the printer is not limited to the portable type, and may be a printer of a so-called stationary type.

(1) There is provided a data playback system comprising: a server that stores image data of an image printed on a medium and sound data associated with the image data; and a data playback terminal that downloads the image data and the sound data associated with the image data from the server and plays the downloaded image data and sound data. The data playback terminal comprises a display unit that displays an image, a sound output unit that outputs sound, a recording information reading unit that reads recording information, an access information obtaining unit that obtains access information to the image data of the image printed on the medium by reading the recording information printed with the image on the medium by the recording information reading unit, the access information to the image data of the image printed on the medium being recorded in the recording information, a download unit that downloads the image data of the image printed on the medium and the sound data associated with the image data from the server based on the access information obtained by the access information obtaining unit, a display controller that displays the image data downloaded by the download unit on the display unit, and a sound output controller that outputs and plays the sound data downloaded by the download unit through the sound output unit.

According to the present aspect, in a case where the recording information printed with the image on the medium is read by the data playback terminal, it is possible to obtain the access information to the image data of the image printed on the medium and the sound data associated with the image data, and it is possible to download and play the image data and the sound data from the server as a storage destination.

(2) In the data playback system according to (1), image data without including the recording information in the image is stored in the server.

According to the present aspect, the image data without including the recording information in the image is stored in the server. Accordingly, it is possible to play the image without including the recording information at the time of paying the image data on the data playback terminal.

(3) In the data playback system according to (1), image data including the recording information in the image is stored in the server, and the display controller masks the recording information, and displays the image data on the display unit.

According to the present aspect, the image data including the recording information in the image is stored in the server. It is possible to play the image data with the masked recording information at the time of playing the image data on the data playback terminal. Accordingly, it is possible to prevent the recording information from being a hindrance to viewing.

(4) The data playback system according to any one of (1) to (3) further comprises: a printer that comprises an upload unit that uploads image data to be printed and sound data associated with the image data to the server in a case where the image data associated with the sound data is printed, a recording information generation unit that generates recording information in which access information to the image data uploaded to the server is recorded, and a print controller that prints the recording information generated by the recording information generation unit and the image in a case where the image data associated with the sound data is printed.

According to the present aspect, in the printer, the image data and the sound data are uploaded to the server in response to the printing.

(5) In the data playback system according to (4), the printer further comprises an imaging unit that electronically captures an image to be printed, and a sound collection unit that collects sound associated with the image to be printed.

According to the present aspect, the printer has an imaging function.

(6) The data playback system according to (4) or (5) further comprises: an upload terminal that uploads received data to the server. The upload unit uploads image data to be printed and the sound data associated with the image data to the server through the upload terminal.

According to the present aspect, the image data and the sound data are uploaded to the server from the printer through the upload terminal.

(7) In the data playback system according to any one of (1) to (6), the data playback terminal further comprises a sound collection unit that collects sound, a sound data rewrite instructing unit that instructs rewriting of the sound data associated with the image data displayed on the display unit, a sound collection controller that controls the sound collection unit to obtain sound data for rewriting in a case where the rewriting of the sound data is instructed by the sound data rewrite instructing unit, and a rewrite data upload unit that adds information on the image data for which the rewriting is instructed, and uploads the sound data for rewriting to the server, and the server further comprises a sound data rewrite controller that rewrites the sound data of the image data for which the rewriting is instructed with received sound data in a case where the sound data for rewriting is received.

According to the present aspect, it is possible to rewrite the sound data stored in the server later.

(8) In the data playback system according to any one of (1) to (7), information to be specified at the time of printing is added, as unique identification information, to the image data stored in the server.

According to the present aspect, the information to be specified at the time of printing is added, as the unique identification information, to the image data stored in the server.

(9) In the data playback system according to (8), the identification information includes information on the cumulative number of times of printing in a printer that prints the image data.

According to the present aspect, the information on the cumulative number of times of printing the image data in the printer is included in the identification information.

(10) In the data playback system according to (9), the identification information further includes information on a unique identification number of the printer that prints the image data.

According to the present aspect, the information on the unique identification number of the printer that prints the image data is included in the identification information.

(11) In the data playback system according to (9) or (10), the identification information further includes information on a device model of the printer at the time of printing the image data.

According to the present aspect, the information on the device model of the printer at the time of printing the image data is included in the identification information.

(12) In the data playback system according to any one of (1) to (11), a trimmed image is printed on the medium.

According to the present aspect, the trimmed image is printed on the medium.

(13) In the data playback system according to any one of (1) to (12), the medium is an instant film.

According to the present aspect, the instant film is used as the medium for printing.

(14) In the data playback system according to any one of (1) to (13), the recording information is a two-dimensional code, a barcode, or a radio tag.

According to the present aspect, the recording information is the two-dimensional code, the barcode, or the radio tag.

EXPLANATION OF REFERENCES

1: playback system
2: communication network
2a: base station
10: digital camera with printer
12: camera body
14: imaging lens
16: release button
18: recording button
20: strobe emitting window
22a: power button
22b: menu button
22c: OK button
22d: mode switching button
24: microphone holes
26: speaker holes
28: display 30: film lid cover
32a: joystick
32b: print button
32c: playback button
32d: cancel button
34: film discharge port
40: instant film pack
42: instant film
42a: exposure surface of instant film
42b: observation surface of instant film
42c: exposure region of instant film
42d: pod portion of instant film
42e: developing solution pod of instant film
42f: trap unit of instant film
42g: absorbent of instant film
42h: observation region of instant film
42i: frame of instant film
44: case of instant film pack
44a: exposure opening of instant film pack
44b: discharge port of instant film pack
44c: claw opening portion of instant film pack
50: film loading chamber
52: film delivery mechanism
52a: claw
54: film transport mechanism
54A: transport roller pair
54B: spreading roller pair
56: print head
62: lens drive unit
64: image sensor
66: image sensor drive unit
68: analog signal processing unit
70: digital signal processing unit
72: memory
74: memory controller
76: display controller
78: short-range wireless communication unit
80: antenna
82: film delivery drive unit
84: film transport drive unit
86: head drive unit
88: strobe
90: strobe emitting controller
92: microphone
94: speaker
96: sound signal processing unit
98: operation unit
100: camera controller
100A: imaging controller
100B: recording controller
100C: identification information generation unit
100D: upload unit
100E: communication management unit
100F: two-dimensional code generation unit
100G: print controller
100H: playback controller
200: data storage server
200A: data reception controller
200B: data management unit
200C: data transmission controller
200D: sound data rewrite controller
201: CPU
202: ROM
203: RAM
204: HDD
205: display
206: network I/F
207: keyboard
208: mouse
210: optical drive
300: upload terminal
300A: upload data obtaining unit
300B: data transmission unit
301: CPU
302: ROM
303: RAM
304: EEPROM
305: display
306: touch panel
307: GPS reception unit
308: camera unit
309: microphone unit
310: speaker unit
311: communication unit
311A: antenna
312: short-range wireless communication unit
312A: antenna
313: sensor unit
314: medium drive
315: memory card
400: data playback terminal
400A: two-dimensional code reading unit
400B: access information obtaining unit
400C: download unit
400D: playback processing unit
400D1: display controller
400D2: sound output controller
400E: sound data rewrite instructing unit
400F: sound collection controller
400G: write data upload unit
401: CPU
402: ROM
403: RAM
404: EEPROM
405: display
406: touch panel
407: GPS reception unit
408: camera unit
409: microphone unit
410: speaker unit
411: communication unit
411A: antenna
412: short-range wireless communication unit
412A: antenna
413: sensor unit
414: medium drive
415: memory card
IM: image
ME: message
PRI0: image
PRI1: image data
PVI: image
QR: two-dimensional code
VPB: sound playback button
S1 to S5: procedure of setting for each mode
S11 to S12: operation procedure in manual print mode
S21 to S28: operation procedure in case sound recording mode is turned off in manual print mode
S31 to S38: operation procedure in case normal sound recording mode is turned on in manual print mode
S41 to S51: operation procedure in case after recording mode is turned on in manual print mode
S61 to S62: operation procedure in auto print mode S71 to S76: operation procedure in case sound recording mode is turned off in auto print mode
S81 to S86: operation procedure in case normal sound recording mode is turned on in auto print mode
S91 to S100: operation procedure in case after recording mode is turned on in auto print mode
S110 to S118: operation procedure in playback mode
S120 to S127: processing procedure at the time of printing image
S130 to S135: procedure of upload processing
S140 to S144: processing procedure in case communication is not enabled or upload processing has failed
S150 to S153: procedure of processing for downloading and playing image data and sound data
S160 to S165: processing procedure in case image data with sound is generated after imaging in digital camera with printer
S170 to S174: procedure of sound recording processing
S180 to S188: processing procedure in case sound data is written in digital camera with printer
S190 to S194: procedure of sound recording processing in case sound data is written

What is claimed is:

1. A data playback system comprising:
a server that includes a memory and receives image data and sound data associated with the image data in the memory, wherein the image data includes a recording information having an access information, the image data corresponding to an image printed on a medium, the image being the image data with peripheral portions trimmed and the recording information overlapped with a part of the image on the medium; and
a data playback terminal that downloads the image data and the sound data associated with the image data from the server and plays the downloaded image data and sound data,
wherein the data playback terminal comprises:
a display that displays an image data;
a sound output device that outputs sound;
a recording information reading device that reads the recording information; and
a first processor that:
obtains the access information to the image data of the image printed on the medium by reading the recording information printed on the medium by the recording information reading device, the access information to the image data of the image printed on the medium being recorded in the recording information;
downloads the image data of the image printed on the medium and the sound data associated with the image data from the server based on the access information;
displays the downloaded image data including the peripheral portions trimmed in the image printed on the medium and without displaying the recording information on the display; and
controls the sound output device to play the downloaded sound data.

2. The data playback system according to claim 1, wherein the first processor masks the recording information having the access information and display the image data on the display.

3. The data playback system according to claim 2, further comprising a second processor that:
uploads image data to be printed and sound data associated with the image data to the server in a case where the image data associated with the sound data is printed;
generates recording information in which access information to the image data uploaded to the server is recorded; and
prints the recording information and the image in a case where the image data associated with the sound data is printed.

4. The data playback system according to claim 1, further comprising:
a printer that includes a second processor that:
uploads image data to be printed and sound data associated with the image data to the server in a case where the image data associated with the sound data is printed;
generates recording information in which access information to the image data uploaded to the server is recorded; and
prints the recording information and the image in a case where the image data associated with the sound data is printed.

5. The data playback system according to claim 4, wherein the printer further comprises:
an imaging sensor that electronically captures an image to be printed; and
a sound collection device that collects sound associated with the image to be printed.

6. The data playback system according to claim 4, further comprising:
a portable computer that uploads received data to the server,
wherein the second processor uploads the image data to be printed and the sound data associated with the image data to the server through the portable computer.

7. The data playback system according to claim 1, wherein the data playback terminal further comprises a sound collection device that collects sound,
the first processor:
instructs rewriting of the sound data associated with the image data displayed on the display;
controls the sound collection device to obtain sound data for rewriting;
adds information on the image data for which the rewriting is instructed; and
uploads the sound data for rewriting to the server, and
the server rewrites the sound data of the image data for which the rewriting is instructed with received sound data in a case where the sound data for rewriting is received.

8. The data playback system according to claim 1, wherein information to be specified at the time of printing is added, as unique identification information, to the image data stored in the server.

9. The data playback system according to claim 8, wherein the identification information includes information on the cumulative number of times of printing in a printer that prints the image data.

10. The data playback system according to claim 9, wherein the identification information further includes information on a unique identification number of the printer that prints the image data.

11. The data playback system according to claim 9, wherein the identification information further includes information on a device model of the printer at the time of printing the image data.

12. The data playback system according to claim 1, wherein the medium is an instant film.

13. The data playback system according to claim 1, wherein the recording information is a two-dimensional code, a barcode, or a radio tag.

14. A data playback terminal comprising:
- a display that displays an image data;
- a sound output device that outputs sound;
- a recording information reading device that reads recording information; and
- a processor that:
  - obtains access information to image data of an image printed on a medium by reading the recording information printed on the medium by the recording information reading device, the access information to the image data of the image printed on the medium being recorded in the recording information, wherein the recording information printed is overlapped with a part of the image printed on the medium, and the image printed being the image data with peripheral portions trimmed;
  - downloads the image data of the image printed on the medium and the sound data associated with the image data from a storage destination based on the access information;
  - displays the downloaded image data including the peripheral portions trimmed in the image printed on the medium and without displaying the recording information; and
  - outputs and plays the downloaded sound data.

15. A data playback method comprising:
- capturing image data to be printed and capturing sound data associated with the image data;
- uploading the captured image data and the captured sound data associated with the image data to a server;
- generating recording information in which access information to the captured image data uploaded to the server is recorded;
- printing an image on a medium with the generated recording information overlapped with a part of the image on the medium, the image being the captured image data with peripheral portions trimmed;
- obtaining the access information to the captured image data by reading the recording information printed on the medium;
- downloading the captured image data of the image printed on the medium and the sound data associated with the image data from the server based on the obtained access information;
- displaying the downloaded captured image data including the peripheral portions trimmed in the image printed on the medium and without displaying the recording information; and
- playing the downloaded sound data.

* * * * *